United States Patent [19]

Kikuchi et al.

[11] 4,439,865

[45] Mar. 27, 1984

[54] COPIER SORTER WITH MEMORY AND COUNTER CONTROLLED INLET GATE FOR MANUALLY INSERTED COVERS OR PARTITION SHEETS

[75] Inventors: Hideo Kikuchi, Yokohama; Tamaki Kaneko, Fujisawa; Kunio Hibi, Yokohama; Sunao Ikeda, Yokohama; Yohtaro Kakitani, Yokohama, all of Japan

[73] Assignee: Ricoh Company, Ltd., Japan

[21] Appl. No.: 223,168

[22] Filed: Jan. 7, 1981

[30] Foreign Application Priority Data

Sep. 30, 1980 [JP] Japan ................................ 55-136472

[51] Int. Cl.[3] ........................ G06F 7/02; B65H 43/00; B65H 31/24; G06M 3/02

[52] U.S. Cl. .................................... 377/8; 355/14 SH; 271/288; 271/296; 270/95; 270/58; 364/900

[58] Field of Search ......... 235/92 SB, 92 PE, 92 MS, 235/92 R; 355/14 CU, 97, 112, 3 SH, 14 SH; 198/503; 209/551, 548, 534; 271/287, 288, 295, 296; 270/58, 95; 377/8; 364/900

[56] References Cited

U.S. PATENT DOCUMENTS

| | | | |
|---|---|---|---|
| 3,555,978 | 1/1971 | McCool | 270/95 |
| 3,886,329 | 5/1975 | Kamiyama | 235/92 SB |
| 3,924,846 | 12/1975 | Reed | 270/56 |
| 3,930,581 | 1/1976 | Gray | 209/534 |
| 3,979,112 | 9/1976 | Munn et al. | 270/58 |
| 4,105,914 | 8/1978 | Murata et al. | 235/92 SB |
| 4,128,756 | 12/1978 | Nagand et al. | 235/92 SB |
| 4,146,216 | 3/1979 | Brown | 270/58 |
| 4,201,464 | 5/1980 | Botte et al. | 355/14 R |
| 4,211,483 | 7/1980 | Hannigan et al. | 355/14 R |
| 4,227,074 | 10/1980 | Miyagawa | 235/92 SB |
| 4,229,100 | 10/1980 | Travis | 355/77 |
| 4,285,591 | 8/1981 | Botte et al. | 355/14 C |
| 4,286,865 | 9/1981 | Satomi et al. | 355/14 CU |
| 4,341,462 | 7/1982 | Ogura | 355/14 SH |

FOREIGN PATENT DOCUMENTS

| | | | |
|---|---|---|---|
| 54-17093 | 2/1979 | Japan | 209/548 |
| 2059396 | 4/1981 | United Kingdom | 271/296 |
| 2084964 | 4/1982 | United Kingdom | 271/288 |

*Primary Examiner*—James D. Thomas
*Assistant Examiner*—Archie E. Williams, Jr.
*Attorney, Agent, or Firm*—Guy W. Shoup; Gerard F. Dunne

[57] ABSTRACT

A sorter for a copy machine is equipped with a portion adapted to receive sheets inserted manually for use as covers or partitions of the copies in the sorter. The sorter may be formed of one or more sorter portions arranged serially and is provided with a memory register for memorizing information corresponding to the number of sheets to be inserted manually, a count register for counting the number of sheets for manual insertion, and a circuit for inhibiting the manual insert operation for a predetermined period of time after the contents in the memory register becomes equal to the contents in the count register, thereby attaining the precise and reliable collation and sorting of the sheets to be inserted as covers and partitions.

1 Claim, 53 Drawing Figures

FIG. 16 (a)

PORT 1 INSTRUCTION CODE

| BIT 7 | BIT 6 | BIT 5 | BIT 4 | BIT 3 | BIT 2 | BIT 1 | BIT 0 | HEXA | CODE NAME | |
|---|---|---|---|---|---|---|---|---|---|---|
| 0 | 0 | 0 | 0 | 0 | 0 | 0 | 1 | Ø1H | READ | |
| 0 | 0 | 0 | 0 | 0 | 0 | 1 | 1 | Ø3H | SORTER START | |
| 0 | 0 | 1 | 0 | 0 | 0 | 1 | 1 | 23H | JAM MOTOR REST | |
| 0 | 1 | 0 | 0 | 0 | 0 | 1 | 1 | 43H | JAM COPY | |
| 0 | 1 | 1 | 0 | 0 | 0 | 1 | 1 | 63H | MOTOR STOP | |
| 0 | 0 | 0 | 1 | 0 | 0 | 0 | 1 | 11H | COPY MODE | |
| 0 | 0 | 1 | 1 | 0 | 0 | 0 | 1 | 31H | SORT MODE | |
| 0 | 1 | 0 | 1 | 0 | 0 | 0 | 1 | 51H | COLLATE MODE | |
| 0 | 1 | 1 | 1 | 0 | 0 | 0 | 1 | 71H | INTERRUPT | |
| 1 | 0 | 0 | 0 | 0 | 0 | 1 | 1 | 83H | END SENSOR | |
| 1 | 0 | 0 | 1 | 0 | 0 | 0 | 1 | 91H | ØSTART | |
| 0 | 0 | 0 | 0 | 0 | 1 | 0 | 1 | Ø5H | DATA FIRST DIGIT (0) | DATA LOWER ORDER |
| 0 | 0 | 0 | 1 | 0 | 1 | 0 | 1 | 15H | DATA FIRST DIGIT (1) | |
| ∫ | ∫ | ∫ | ∫ | 0 | 1 | 0 | 1 | ∫ | ∫ | |
| 1 | 0 | 0 | 1 | 0 | 1 | 0 | 1 | 95H | 〃 (9) | |
| 0 | 0 | 0 | 0 | 1 | 0 | 0 | 1 | Ø9H | DATA SECOND DIGIT (0) | DATA UPPER ORDER |
| 0 | 0 | 0 | 1 | 1 | 0 | 0 | 1 | 19H | DATA SECOND DIGIT (1) | |
| | | | | 1 | 0 | 0 | 1 | ∫ | ∫ | |
| 1 | 0 | 0 | 1 | 1 | 0 | 0 | 1 | 99H | 〃 (9) | |
| 0 | 0 | 0 | 0 | 1 | 1 | 0 | 1 | ØDH | DATA THIRD DIGIT (0) | DATA:MSB |
| 0 | 0 | 0 | 1 | 1 | 1 | 0 | 1 | 1DH | DATA THIRD DIGIT (1) | |
| | | | | 1 | 1 | 0 | 1 | ∫ | ∫ | |
| 1 | 0 | 0 | 1 | 1 | 1 | 0 | 1 | 9DH | 〃 (9) | |
| 1 | 0 | 1 | 1 | 0 | 0 | 0 | 1 | B1H | MODE SHUT OFF | |
| 1 | 1 | 1 | 1 | 0 | 0 | 0 | 1 | F1H | INTERRUPT RESET | |
| 1 | 1 | 0 | 1 | 0 | 0 | 0 | 1 | D1H | MODE STOP | |

(a)

PORT 20 INSTRUCTION CODE

| BIT 7 | BIT 6 | BIT 5 | BIT 4 | BIT 3 | BIT 2 | BIT 1 | BIT 0 | HEXA | CORD NAME |
|---|---|---|---|---|---|---|---|---|---|
| 0 | 0 | 0 | 0 | 0 | 0 | 0 | 1 | Ø1H | READ |
| 0 | 0 | 0 | 0 | 0 | 0 | 1 | 1 | Ø3H | TRAY SENSOR |
| 0 | 0 | 0 | 1 | 0 | 0 | 0 | 1 | 11H | SORTER READY |
| 1 | 0 | 0 | 0 | 0 | 0 | 0 | 1 | 81H | SORTER JAM-1 |
| 1 | 1 | 0 | 0 | 0 | 0 | 0 | 1 | C1H | BIN COPY OVER |
| 1 | 0 | 1 | 0 | 0 | 0 | 0 | 1 | A1H | BIN COPY |
| 1 | 1 | 1 | 0 | 0 | 0 | 0 | 1 | E1H | SORTER JAM-2 |
| 1 | 1 | 1 | 1 | 0 | 0 | 0 | 1 | F1H | DOOR SW |
| 1 | 0 | 0 | 1 | 0 | 0 | 0 | 1 | 91H | MANUAL INSERT |
| 1 | 1 | 0 | 1 | 0 | 0 | 0 | 1 | D1H | SET NUMBER OVER |
| 0 | 0 | 0 | 1 | 0 | 0 | 1 | 1 | 13H | MODE CYCLE END |
| 0 | 0 | 0 | 0 | 1 | 0 | 1 | 1 | ØBH | DISABLE SHUT OFF |
| 0 | 0 | 0 | 0 | 0 | 1 | 1 | 1 | Ø7H | ENABLE SHUT OFF |
| 1 | 0 | 1 | 1 | 0 | 0 | 0 | 1 | B1H | JAM RESET |
| | | | | | | | | | |
| | | | | | | | | | |

(b)

PORT 20

FIG. 20
(a)

PORT 30

| BIT 7 | BIT 6 | BIT 5 | BIT 4 | BIT 3 | BIT 2 | BIT 1 | BIT 0 | HEXA | |
|---|---|---|---|---|---|---|---|---|---|
| 0 | 0 | 0 | 0 | 0 | 0 | 0 | 1 | Ø1H | |
| 0 | 0 | 0 | 0 | 0 | 0 | 1 | 1 | Ø3H | MOTOR START |
| 0 | 0 | 1 | 0 | 0 | 0 | 1 | 1 | 23H | MASTER SORT END |
| 0 | 1 | 0 | 0 | 0 | 0 | 1 | 1 | 43H | JAM RESET |
| 0 | 1 | 1 | 0 | 0 | 0 | 1 | 1 | 63H | MOTOR STOP |
| 1 | 0 | 0 | 0 | 0 | 0 | 1 | 1 | 83H | END SENSOR |
| 0 | 0 | 0 | 1 | 0 | 0 | 0 | 1 | 11H | COPY MODE |
| 0 | 0 | 1 | 1 | 0 | 0 | 0 | 1 | 31H | SORT MODE |
| 0 | 1 | 0 | 1 | 0 | 0 | 0 | 1 | 51H | COLLATE MODE |
| 0 | 1 | 1 | 1 | 0 | 0 | 0 | 1 | 71H | JAM RECOVER MANUAL INSERT |
| 1 | 0 | 0 | 1 | 0 | 1 | 0 | 1 | 91H | SLAVE SORTER COMMAND INDICATION |
| | | | | 0 | 1 | 0 | 1 | | DATA: LOWER 4 BITS |
| | | | | 0 | 1 | 0 | 1 | | DATA: LOWER 4 BITS |
| | | | | 0 | 1 | 0 | 1 | | |
| | | | | 0 | 1 | 0 | 1 | | |
| | | | | 1 | 0 | 0 | 1 | | DATA: UPPER 4 BITS |
| | | | | 1 | 0 | 0 | 1 | | DATA: UPPER 4 BITS |
| | | | | 1 | 0 | 0 | 1 | | |
| | | | | 1 | 0 | 0 | 1 | | |
| | | | | 1 | 1 | 0 | 1 | | DATA: MSB 4 BITS |
| 1 | 0 | 1 | 1 | 0 | 0 | 0 | 1 | B1H | SUBSLAVE SORTER |
| 1 | 1 | 1 | 1 | 0 | 0 | 0 | 1 | F1H | MANUAL INSERT |
| 1 | 1 | 0 | 0 | 0 | 0 | 1 | 1 | C3H | MODE CLEAR |
| 1 | 1 | 1 | 0 | 0 | 0 | 1 | 1 | E3H | Ø START |

FIG. 20
(b)

PORT 40

| BIT 7 | BIT 6 | BIT 5 | BIT 4 | BIT 3 | BIT 2 | BIT 1 | BIT 0 | HEXA | |
|---|---|---|---|---|---|---|---|---|---|
| | | | | | | | 1 | Ø1H | READ |
| | | | | | | 1 | | Ø2 | TWO MODULE |
| | | | | | 1 | | | Ø4 | THREE MODULE |
| | | | | 1 | | | | Ø8 | SORT END |
| | | | 1 | | | | | 1Ø | SORTER JAM |
| | | 1 | | | | | | 2Ø | SLAVE SORTER BIN COPY |
| | 1 | | | | | | | 4Ø | SLAVE SORTER DOOR |
| 1 | | | | | | | | 8Ø | END SENSOR |
| | | | | | | | | | |
| | | | | | 1 | | | Ø4H | BIN COPY OVER |
| | | | | | | | | | |
| | | | | | | | | | |
| | | | | | | | | | |

(a)

(b)

COPIER SORTER WITH MEMORY AND COUNTER CONTROLLED INLET GATE FOR MANUALLY INSERTED COVERS OR PARTITION SHEETS

BACKGROUND OF THE INVENTION

This invention relates to a sorting device receiving copy sheets from a copy machine and more particularly to a sorting device wherein one or more pages may be manually inserted into the sorter and placed in proper sequence with the copy sheets from the copy machine.

In general, the number of the copy sheets which can be sorted by a sorting device is limited by the number of the sheet storing bins provided in the sorting device. The number of copy sheets required to be sorted is, however, different depending on the requirements of the user, and, therefore, sorting devices are normally so constructed that they may be connected serially to one another in any number of sorters as required.

On the other hand, when collation of the copy sheets for each page of the original manuscript has been completed and piles or bundles of copy sheets comprising the collated sheets are provided in a required quantity, it may often be desired that for each pile or bundle, covers be applied or blank or colored pages may be inserted as partitions. In the past, the operator of the copy machine has typically been manually inserting said covers or partitions one by one directly into each bin of the sorting device before or after collation of the copy sheets by the sorting device. Since this work is manual, it has been rather troublesome. Besides, a wrong distribution may easily be caused as a cover or partition might be distributed to the wrong bin by, for example, skipping over the correct bin, or two covers may be placed inadvertently into one bin. Also the above manual work has been time consuming. Particularly in such cases that collation of a large number of copy sheets is required, in other words, when a number of sorting devices are connected serially together, the operator has to move away from the copy machine from time to time for this manual distribution of covers or partitions in the appropriate sorter, which can increase the possibility of error. Therefore, the operator often had to count the number of covers or partitions in advance before inserting them in each bin, or ascertain the number of covers which have been distributed in the bins.

SUMMARY OF THE INVENTION

It is, therefore, an object of the present invention to provide a sorting device for a copy machine which eliminates the above-mentioned drawbacks and is capable of rapidly distributing cover or partition sheets to the required bins without error and without requiring the operator to move far away from the copy machine.

According to the present invention, a sorting device for a copy machine is provided which includes a detector provided at the inlet of the sorting device for indicating reception of a sheet. A manual insert portion of the sorter has an opening for insertion of covers or partition sheets, a channel for passage of these inserted sheets extending from the insert opening to the inlet of the sorting device, and an insert gate which can close these channels. A transfer roller is provided for transferring the sheets fed into the channel through the manual insert gate to said inlet of the sorting device, and a driving means is provided for actuating the manual insert gate.

A counting device counts the actual number of the manually inserted sheets detected at the detector for sheet reception, and a memory retains a signal corresponding to the numner of sheets to be collated. A comparison means is provided to provide an identity signal when the number of sheets counted reaches a number corresponding to that retained in the memory. Timers are provided which are set when the identity signal is produced, and will be reset after a predetemined period of time.

These timers close the manual insert gate by means of said driving means when the timers are being set.

If the manual insert portion is provided at the sorting device and the covers or partitions are automatically distributed to the collation bins by the sorting device one by one in a conventional sorter, the operator must still count the number of covers manually inserted to the insert portion. However, according to the sorting device of the present invention, there is no need for the operator to manually insert the covers or partitions, and counting them. He need only feed the cover or partitions in succession to the manual insert portion as a normal work and to stop manual insertion when no more feed of the covers or partitions is possible due to the manual insert gate having been closed. After that, the covers or partitions may be distributed without fail to the collation bins, one cover for each bin.

Accordingly, even when a multiplicity of the sorting devices are connected serially together, it is not necessary for the operator to move to each sorting device to ascertain whether or not there my be any wrong distribution. Also in such a case that a cover or partition is desired to be distributed for a predetermined number of the copied sheets, for example two covers for each bin, by using the same manual insertion portion, this kind of distribution can be made in such a way that after lapse of time set by the timers, the distribution is repeated until the predetermined distributions is reached.

BRIEF DESCRIPTION OF THE DRAWINGS

The other objects and features of the present invention will become more apparent from the detailed descriptions in conjunction with the: accompanying drawings which are illustrating some of the preferred embodiments of the present invention, in which:

FIG. 20(*a*) shows a list of instruction codes provided from the master sorter to a slave sorter;

FIG. 20(*b*) shows a list of instruction codes provided from the slave sorter to the master sorter;

DESCRIPTION OF THE PREFERRED EMBODIMENTS

Figure 1:
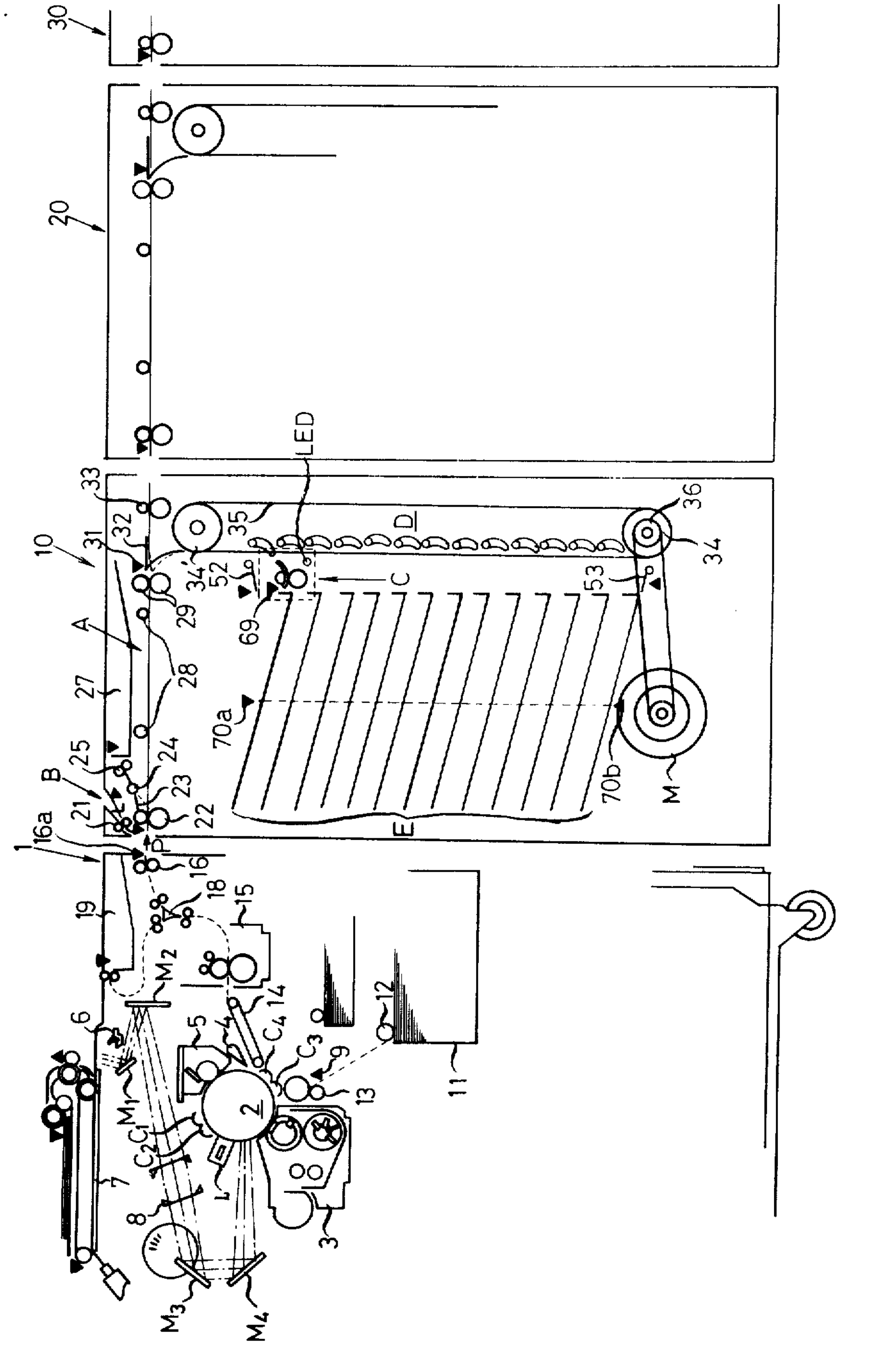
FIG. 1 shows schematic diagram of a copy machine controlled by the method in accordance with the present invention.

The present invention will be explained in detail by reference to the embodiments illustrated in the drawings.

Referring now to FIG. 1, the machine according to the subject invention is shown composed of a copier 1, a first sorter 10 installed adjacent to the copier 1, a second sorter 20 and a third sorter 30 disposed in the order shown.

The copier 1 comprises a photosensitive drum 2 having arranged thereabout a charge eraser C1, a charger C2, a charge erasing lamp L, a developing unit 3, a transfer charger C3, a separation charger C4, a separation pawl 4 and a cleaning unit 5. A halogen lamp 6 is used as scanner in a slit exposure device. The surface of the photosensitive drum 2 is first charged. An original on a contact glass 7 is illuminated by the halogen lamps running thereunder, and the light reflected by a first mirror M1 and a second mirror M2 passes though a lens 8 and is again reflected by a third mirror M3 and a fourth mirror M4 onto the surface of the photosensitive drum 2. The photosensitive drum carrying a latent image resulting from the exposure treatment is then developed with toner in the developing unit 3. A sheet of paper, which has been fed from a paper feed portion 11 through a paper feed roller 12 and has been placed under a wait-and-see condition at a register roller 13, is supplied by the register roller 13 in synchronism with the aforesaid exposure treatment and placed in contact with the toner image. The toner image on the surface of the photosensitive drum is transferred to the sheet by a transfer charger C3, and the sheet is separated from the drum surface by means of the separation charger C4 and the separation pawl 4, and then delivered to a fixing unit 15 by a suction transfer belt 14. The fixed sheet may then be ejected outside the copier through an ejection roller 16 and directed to the first sorter 10. The photosensitive body drum is cleaned by the cleaning unit 5 for re-use.

A sheet detector 9 is provided near the sheet holding side of register roller 13 to monitor the feeding of the sheet. In addition, another sheet detector or final sensor 16*a* is provided at the exit side of ejection roller 16 in the copy delivery path. Reference numeral 18 shows an ejection path change-over plate which may be switched to direct the copy sheet to a copier tray 19 when the sorter is not in use.

The first sorter 10 comprises a blank aligning portion A, a manual insert portion B, a deflection device C which is movable up and down in order to direct the copies into the desired bins, a transfer portion D carrying the deflection device C and for transporting the copies from the blank aligning portion A or the manual insert portion B to the deflection device mentioned above, a bin row E, and a motor M.

The copies ejected from the copier main body 1 are entered into the first sorter 10 in the direction indicated by an arrow P, seized by reception roller pair 22 while having been monitored by a sheet reception detector 21 (first sheet sensor). A reception guide plate or first gate 23 is controlled by a first gate solenoid 24 and functions to eject the copies to a proof tray 27 via ejection roller pair 25 when the first gate 23 is in its position shown by dotted lines; or to advance the copies horizontally and send them to inclined rollers 28 for performing collation or sorting when the first gate is in its position shown by the solid line.

The copies conveyed by the inclined rollers 28 are brought near a reference plate (not shown) by the action of the inclined rollers 28, placed in correct position and proper attitude by means of the reference plate and then sent to intermediate roller pair 29. In the next step, the copies are delivered to the transfer portion D when a branching plate or second gate 32 is positioned at the solid line position shown in the drawing, or directed to the second sorter 20 by way of send-out roller pair 33 when the second gate 32 is in its dotted-line position shown in the drawing. A second gate sheet detector (second sheet sensor) 31 is arranged behind the intermediate roller pair 29. In the event that there occurs a jamming of copy or any other troubles in the portions upstream of the inclined rollers 28, all the rollers except the reception roller pair 22 and the ejection roller pair 25 are stopped, the first gate 23 is switched to the position indicated by the dotted line and any following copies supplied by the copier are sent into the proof tray 27.

In the transfer portion D, a driving roller 34 and a driven roller 34' are coupled by a set of transfer belts 35 and the driving roller 34 is driven by the motor M through an electromagnetic clutch 36.

Figure 2:
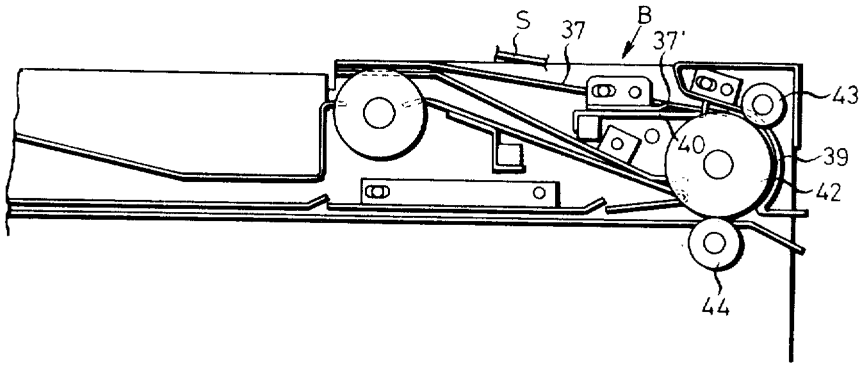
FIG. 2 shows a side view of one example of a manual insert portion.
Figure 3:
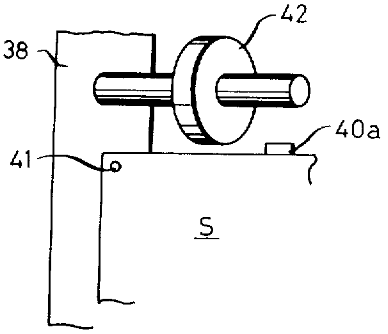
FIGS. 3 and 4 show views useful for explaining the operation of the manual insert portion.
Figure 4:
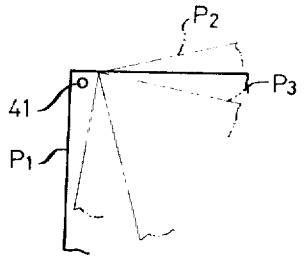

Referring to FIGS. 2 and 3, a manual insert guide 37 in the manual insert portion B is disposed so as to be opened when the manual insert portion B is used. A sheet S can be manually inserted along the path formed by the manual insert guide 37, a reference guide 38, a guide 37' and a curved plate 39, and a stopper or manual insert gate 40 is disposed midway along its route. The manual insert gate 40 can be withdrawn from the manual sheet path as desired. The reference guide 38 is used to place the sheet S in a correct position. Thus, the sheet S will be inserted in the correct position because it abuts on the reference guide 38 at its left end and is inserted until the forward end thereof reaches the forward end portion 40*a* of the stopper 40. A manual insert sheet detector 41 including a light emitting diode and a photo transistor is arranged to detect the forward left end portion of the sheet S when it is inserted into the correct position P1 determined by the reference guide 38 and the stopper 40 as shown in FIG. 4, but it does not detect the sheet S when the sheet S is inserted in the incorrect directions such as P2 and P3 shown in FIG. 4. A manual insert solenoid is driven in response to signals from the detector 41 and the stopper 40 is retracted from the sheet insertion route. The sheet S can then be inserted as it is along the reference guide 38 up to the nip formed by a transfer roller 42 and a driven roller 43 which further carry it along the curved plate 39, and finally deliver it to the blank aligning portion A through a roller 44.

Figure 5:
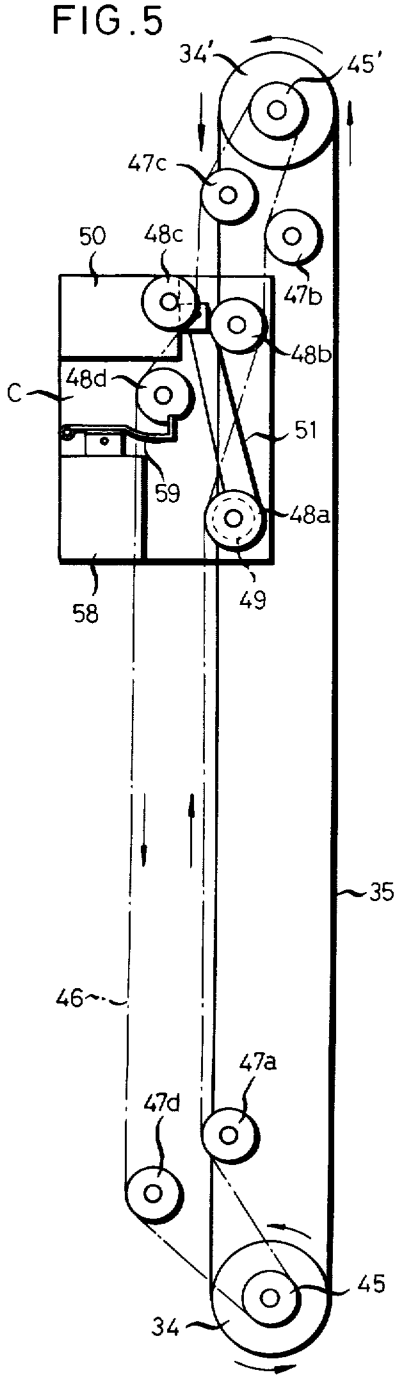
FIG. 5 shows an explanatory diagram illustrating cooperative action of a transfer portion and a deflection device in a sorter.

As clearly seen from FIG. 5, the set of transfer belts 35 are provided on the driving roller 34 and the driven roller 34', and a first chain 46 is set to a sprocket 45 secured to the shaft of the driving roller 34 and a sprocket 45' loosely mounted on the shaft of the driven roller 34'. In this case, the diameter of sprocket 45 is smaller than that of the driving roller 34, so that the speed of chain 46 is slower than that of the transfer belt. In addition, all the sprockets 47*a*, 47*b*, 47*c* and 47*d* disposed in the transfer portion and the sprockets 48*a*, 48*b*, 48*c* and 48*d* disposed in the deflection device C are associatively operated by the chain 46.

The deflection device C is designed so as to ascend when the sprocket 5 thereof engage portions of the chain 46 moving upward and to descend when they engage portions of the chain moving downward. For these purposes, the sprocket 48*a* mounted on a fixed shaft of the deflection device is provided with a spring clutch 49 which is to be controlled by an ascending solenoid 50 through a lever 51. When the solenoid 50 is energized, the clutch 49 is released to cause the sprocket 48*a* to be free, so that the chain 46 continues to rotate but the deflection device C does not move. When the ascending solenoid 50 is deenergized, the lever 51 is returned by the action of spring and the sprocket 48*a* is locked to the fixed shaft by way of the clutch 49. As a result, the sprocket 48*a* and thus the deflection device C is carried by the upwardly moving portions of chain 46. The deflection device C actuates a home position switch 52 (FIG. 8) at its highest position at which it must be stopped, so that the solenoid 50 is thereby energized to release the clutch 49 to cause the deflection device C to be freed from the chain 46.

Figure 6:
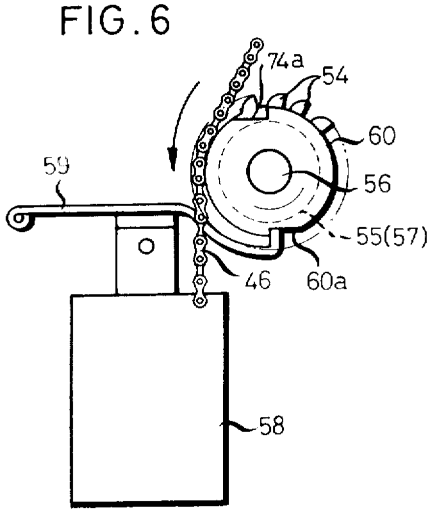
FIG. 6 shows a schematic diagram illustrating clutch control mechanisms.
Figure 7:
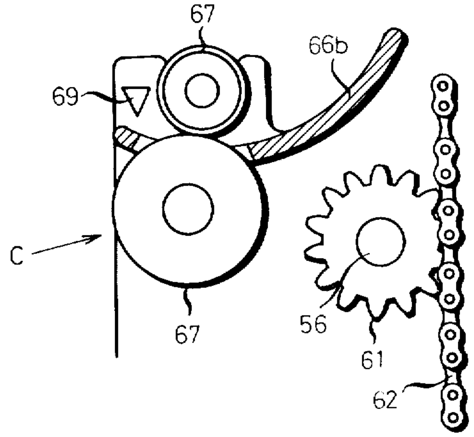
FIG. 7 shows a block diagram useful for explaining a stepwise feed of the deflection device.

Descending motion of the deflection device C is fundamentarily similar to the aforesaid ascending motion, but more importantly it must descend precisely by a predetermined amount. For this reason, as shown in FIG. 6, the control mechanism associated with the chain 46 includes a sprocket 54 meshed with the chain 46, a spring clutch 55 provided on the sprocket, an electromagnetic clutch 57 disposed between the spring clutch 55 and a shaft 56, a descending solenoid 58 for controlling actuation of the spring clutch, a lever 59 coupled to the solenoid plunger, and a cam sleeve 60 equipped with a cutout portion 60*a* which engages or disengages the free end of lever 59 and for performing the on-off control of the spring clutch 55. As clearly illustrated in FIG. 7, another sprocket 61 is secured to the shaft 56 and thus fixed to the transfer or conveying portion, and therefore meshes with an immovalbe or second chain 62.

With the descending solenoid 58 being deenergized, the free end of lever 59 engages the cutout 60*a* in the cam sleeve 60 to disengage the spring clutch 55. Accordingly, even if the sprocket 54 is rotated by means of the chain 46, the shaft 56 does not rotate, and the deflection device C is held stationary. When the descending solenoid 58 is energized, the free end of lever 59 disengages from the cutout 60*a* in the cam sleeve, the spring clutch 55 is placed under active state to transmit the rotation of sprocket 54 due to the chain 46 to the shaft 56 through the electromagnetic clutch 57 which is energized normally. Thus, the sprocket 61 will rotate together with the shaft 56 and be moved along the second immovable chain 62 to descend the deflection device. The descending solenoid 58 is deenergized again immediately after the free end of lever 59 is released from the cutout 60*a* in the cam sleeve, and thus the free end of lever 59 slides along the peripheral surface of cam sleeve 60 while maintaining its engaged condition, and engages another cutout 60*a* after one-half of rotation to stop the cam sleeve 60. Therefore, since the spring clutch 55 is disconnected again, the deflection device C is also stopped in accordance with the operation of the shaft 56 and the sprocket 61 fixed thereto. By these structures, the deflection device C will descend precisely by a distance corresponding to the peripheral distance of the cam sleeve 60 between the two cutouts 60*a* at the time of descending, and this distance corresponds precisely to the intervals between bins.

Figure 8:
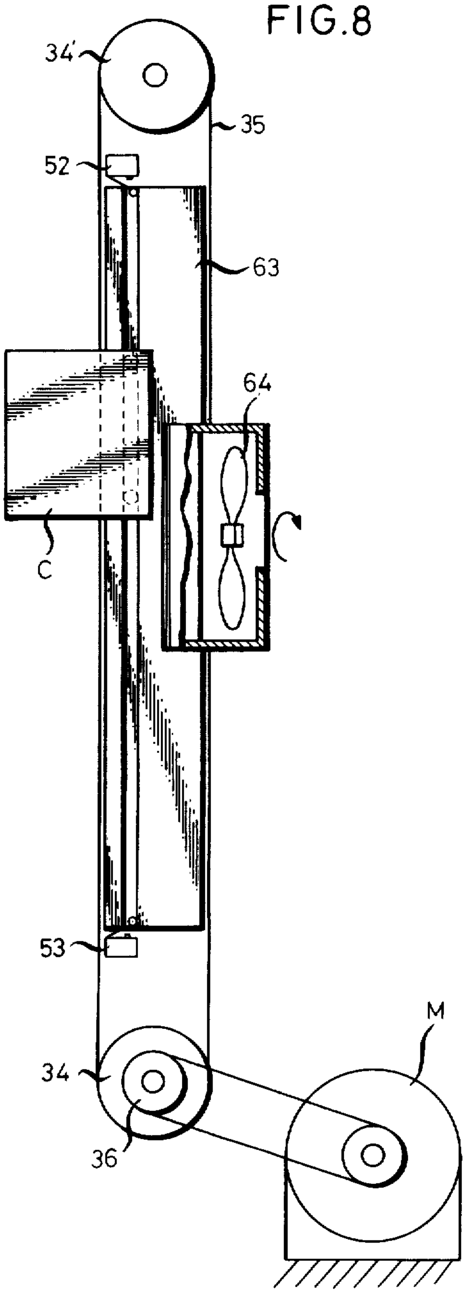
FIG. 8 shows an explanatory diagram for a transfer portion.

As shown in FIG. 8, disposed between both travelling sides of the transfer belts 35 suspended on the driving roller 34 and the driven roller 34' is a vacuum chamber 63 which is always maintained at a negative pressure by use of a blower 64. A large number of suction holes are provided in line on the wall portion of the vacuum chamber located oppositely to the bins and in the contact position of the transfer belt, whereas numerous holes are also provided on the transfer belts 35. A switch 53 is used to detect the end of descending motion of the deflection device. When the copy comes to a position where the suction holes of the vacuum chamber coincide with those of the transfer belts, it is attracted to the transfer belts and transported to the deflection device C where it will be sent into the predetermined bin after having been deflected by a deflection cam shown in FIG. 9.

Figure 9:
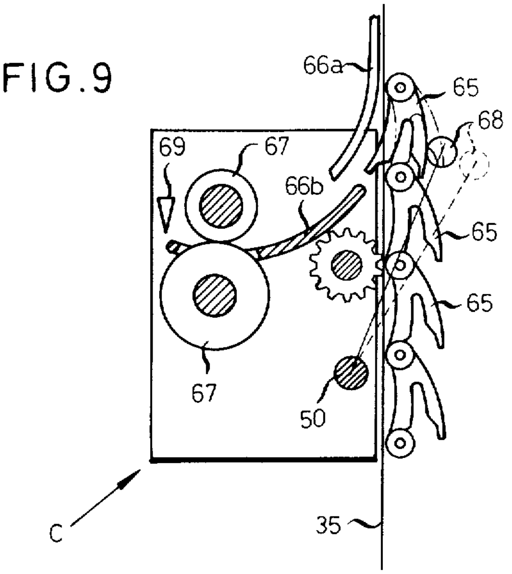
FIG. 9 shows an explanatory diagram illustrating associative action between the deflection device and driving cams.

Referring to FIG. 9 in detail, the copy arriving at the deflection device C by means of the set of transfer belts 35 is separated from the surface of the transfer belts 35 by the curved surface of a deflection cam 65 positioned into the path of movement of the copy. This deflection cam positioned into the path of movement of the copy may be any one of the deflection cams 65 belonging to the respective bins or only one deflection cam corresponding to the bin in the deflection device which is at a standstill to deliver the copy. The deflected copy is further transported through guide plates 66$a$ and 66$b$ carried by the deflection device C and finally ejected into the bin via ejection roller pair 67.

The deflection cam 65 will be placed into its deflecting position by the deflection cam driving lever 68 mounted on the deflection device C. The deflecting cam driving lever 68 is projected behind the surfaces of the transfer belts 35 and can be locked in the positions indicated by the solid line. This deflection cam driving lever 68 will be placed at the solid line position when the deflection device is moving downward in order to cause the required guide cam 65 to be projected from the surface of transfer belt towards the guide plates 66$a$ and 66$b$, but moved to the position indicated by the dotted line to cause it not to be contacted with the guide cams when the deflection device is moving upward. The control of this lever 68 is carried out by the ascending solenoid 50. In short, with the ascending solenoid 50 deenergized, the lever 68 occupies the solid line position in FIG. 9 and the deflection device C ascends, whereas with the solenoid energized, the lever 68 occupies the dotted line position in FIG. 9 and the deflection device C is placed under the wait-and-see condition for the descending solenoid 58 to be energized subsequently.

The sheet delivered from the ejection roller pair 67 in the deflection device C to the desired bin will be checked by a sheet detector (third sheet sensor) 69 disposed immediately behind the ejection roller pairs 67. In addition, light emitting-receiving element pairs 70$a$ and 70$b$ are used as a set of bin sheet detectors 70 for optically sensing the presence of a sheet at any one of the bins, and generating an output signal corresponding to the presence thereof.

The second and third sorters 20 and 30 are similar to the first sorter 10 in its construction except that only the first sorter 10 includes the manual insert portion B and the proof tray and other structures associated therewith, and can thus functions as a "master". In this sense, the first, second and third sorters 10, 20 and 30 are hereinafter referred to as "master", "slave" and "subslave" sorters, respectively. The fact that the master sorter 10 has a manual insert portion B is one of the characteristics of the present invention.

Figure 10:
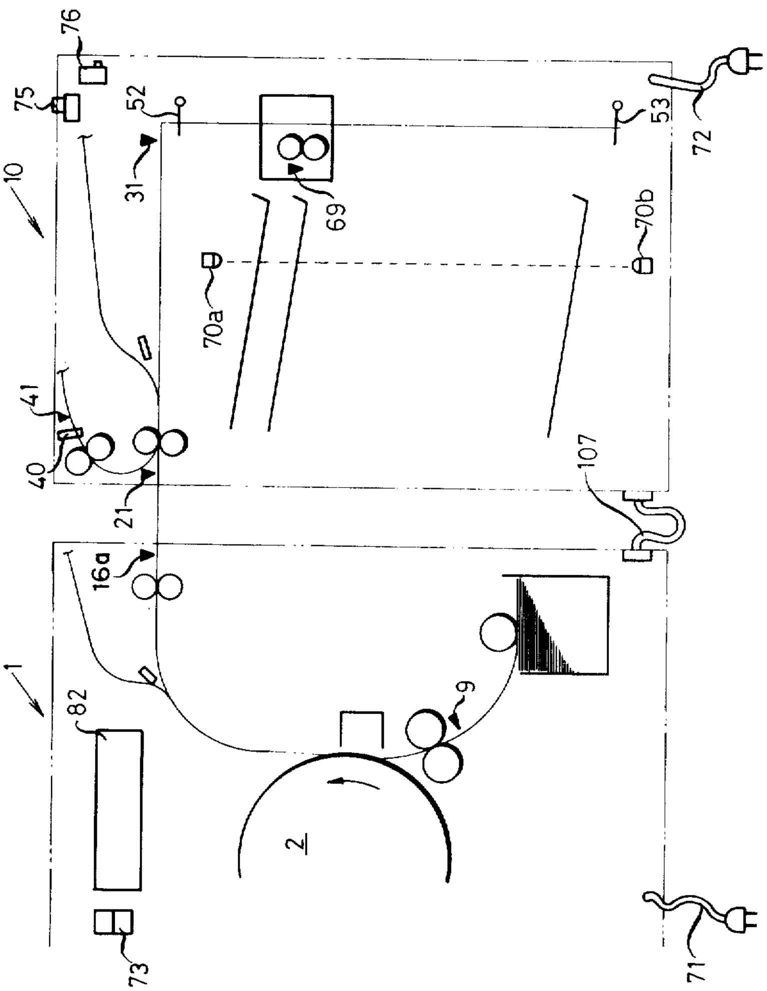
FIG. 10 shows a schematic view illustrating arrangement of electrical elements in a master sorter with respect to a copier.
Figure 11:
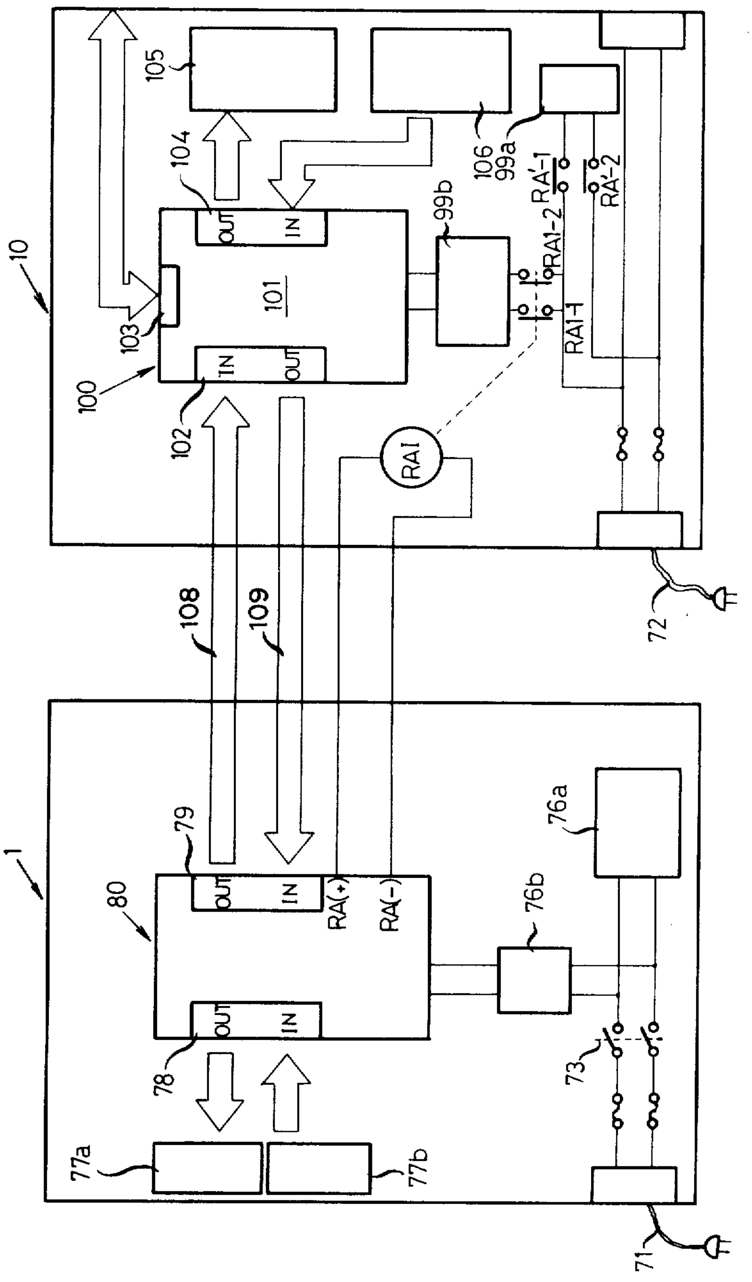
FIG. 11 shows an electrical connection block diagram between the copier and a master sorter.

In FIG. 10, there is illustrated a typical positional relationship between electrical control elements in the copier 1 and the master sorter 10, and in FIG. 11, its electrical connections are schematically illustrated. As the master sorter 10 is provided with a power supply cord 72 independently, a power supply cord 71 in the copier is not required to bear an excessively large power burden. In addition, a main switch 73 and a control unit 82 are provided in the copier only, whereas a door switch 76 and a sorter jam reset switch 75 shown in FIG. 10 are provided only in the master sorter 10.

In FIG. 11, a control unit 80 in the copier is provided with a CPU and supplied with power through a main switch 73 and a power transformer 76$b$. The control unit 80 includes I/O devices 78 and 79 which incorporate a program memory and an address latch circuit, respectively. The I/O device 78 is connected to an output device 77$a$ and an input device 77$b$ used for carrying out a copying operation. Similarly, the sorter 10 is also provided with a control unit 100 having a CPU 101 and comprises I/O devices 102, 103 and 104 controlled by the CPU 101. The I/O device 104 is connected to an output device 105 and an input device 106 required for the operation of the sorter. In addition, the master sorter 10 includes a power relay RA1 which turns on or off the power for the control unit 100 in the sorter, and an energization signal to the power relay RA1 is supplied from the control unit 80 in the copier 1. Electric power to the sorter 10 will be applied in synchronism with the operation of the copier, that is, in response to the relay RA1 which will be energized when the power is applied to the copier or the sorter is designated by the control unit in the copier and others. A power supply unit 99$a$ and a power transformer 99$b$ are connected to the power supply cord 72 through the relay RA1 contacts. The CPU in the copier 1 and the sorter 10 not only perform the control and decision functions for the operation of the individual unit itself, but also exchange instruction data required by each other. To this end, the control units in the copier 1 and the sorter 10 are connected through two buses 108 and 109 referred herein to as input bus of eight channels (8 bits) and output bus of eight channels (8 bits), respectively, and in actual circuits the data in both units are exchanged through an interface circuit (for example, 110 of FIGS. 13 and 19). The copier and the master sorter communicate with each other by use of a signal exchange line 107 including these buses as shown in FIG. 10. Like these, the copier 1 and the master sorter 10 are constructed so that they are electrically separated, but the sorter 10 is designed to be operated as part of the entire system of the copy machine in accordance with operational modes instructed by an operating unit 82 of the copies in the copier.

Figure 12:
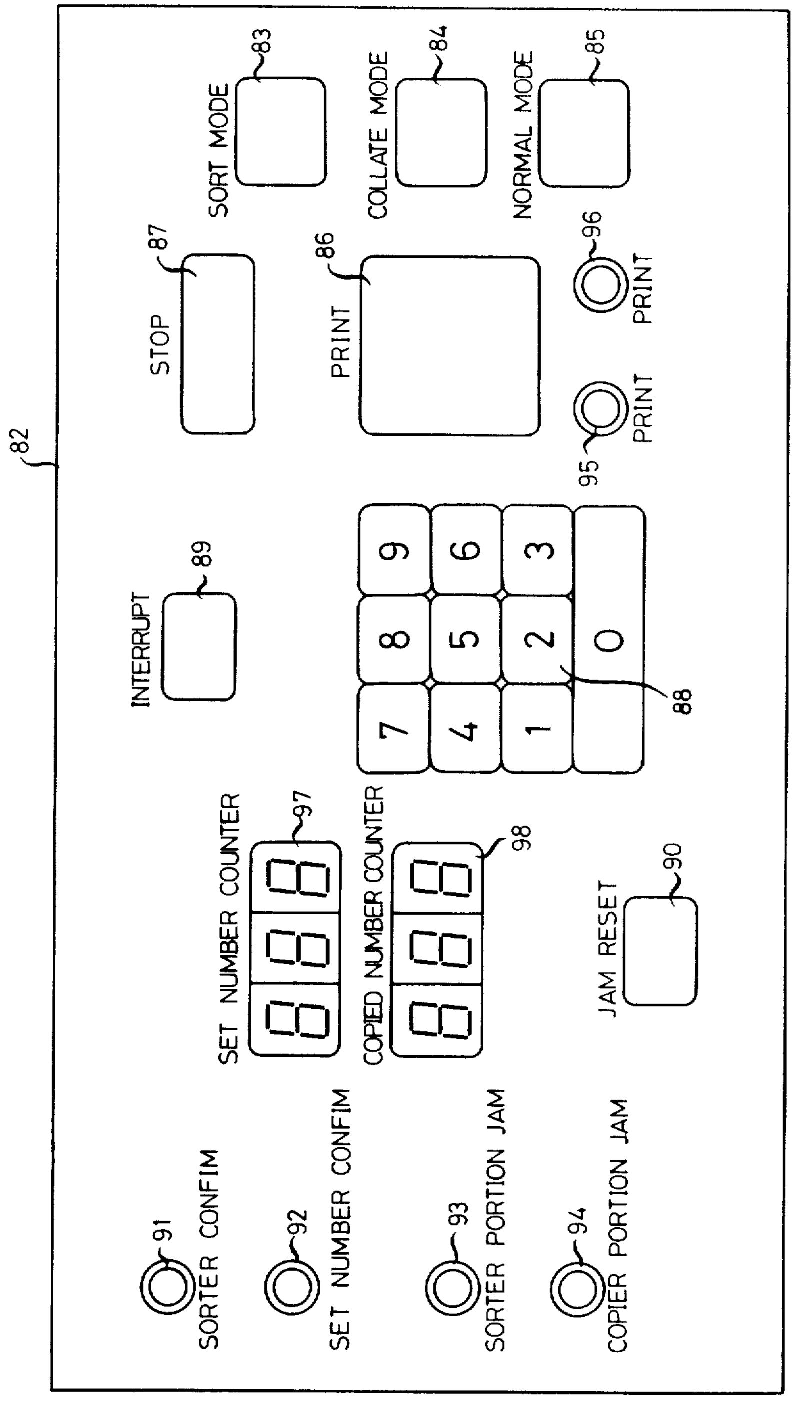
FIG. 12 shows a plan view of a control panel in the copier.

As illustrated in FIG. 12, the operating unit 82 includes various switches 83–90 and lamps 91–96 as follows.

Sort mode SW 83: switch used for permitting the sort mode operation by the sorter (sort key).

Collate mode SW 84: switch used for permitting the collate mode operation by the sorter (collate key).

Normal mode SW 85: switch used for placing only the copier under operative condition.

Print SW 86: switch used to start copy cycle operation under the state where the copier is ready or print green lamp 96 is ON (copy start key).

Stop SW 87: switch used to stop copy cycle during operation.

Ten key SW 88: entry key switch used for setting the set number counter 97.

Interrupt SW 89: switch used for entering into or returning from interrupt mode (interrupt key).

Jam reset SW 90: switch used for resetting jam condition sensed in the copier portion.

Sorter confirm lamp 91: lamp for indicating that the sorter portion is in an abnormal state, such as: bin copy is over, sorter door is open, or sheet is present in the sorter bin, Set number confirm lamp 92: lamp for indicating that entry of a set number exceeds sorting capacity determined by the number of sorters connected, at the time of sort mode.

Sorter portion jam lamp 93: lamp for indicating that a jamming condition is detected in the sorter portion.

Copier portion jam lamp 94: lamp for indicating that a jamming condition is detected in the copier portion.

Print red lamp 95: lamp for indicating that the copier is unable to copy for some reason.

Print green lamp 96: lamp for indicating that the copier is under ready condition.

In addition, the operating unit 82 has two display counters 97 and 98 as follows.

Set number counter 97: counter for displaying inputted figure or figures corresponding to the number of copies for collation or sorting, or the number of sheets to be copied.

Copied number counter 98: counter for displaying the number of sheets detected by the detector 9 for normal operation, the number of sheets stored in the proof tray 27 or the bins E at the time of jamming, and the number of sheets manually inserted at the time of manual insert.

The master sorter 10, slave sorter 20 and subslave sorter 30 have the control units 100, 100' and 100" of the same circuit arrangement, respectively, and each of these sorter control units includes one CPU, independently. As is later described, although the master sorter uses an exclusive program, the slave and subslave sorters use the same program and are automatically distinguished on the basis of the program in each sorter. Since additional sorters can be installed in a cascade fashion and will operate similarly, when explanation of a system consisting of an optional number of sorters more than one is made, it will be sufficient to explain only the functional relationship between the copier and the master sorter. However, for convenience of description, the description on the subject invention will be continued for three sets of sorters. However, as previously described, since the control units in the slave sorter 20 and the subslave sorter 30 are similar to that of the master sorter in its construction, like reference numerals used in the master sorter refer to like or similar elements used in the slave and subslave sorters. In case it is necessary to distinguish from the master sorter, reference numerals with single dash (') and double dashes (") are used for the slave sorter and the subslave sorter, respectively.

Figure 13:
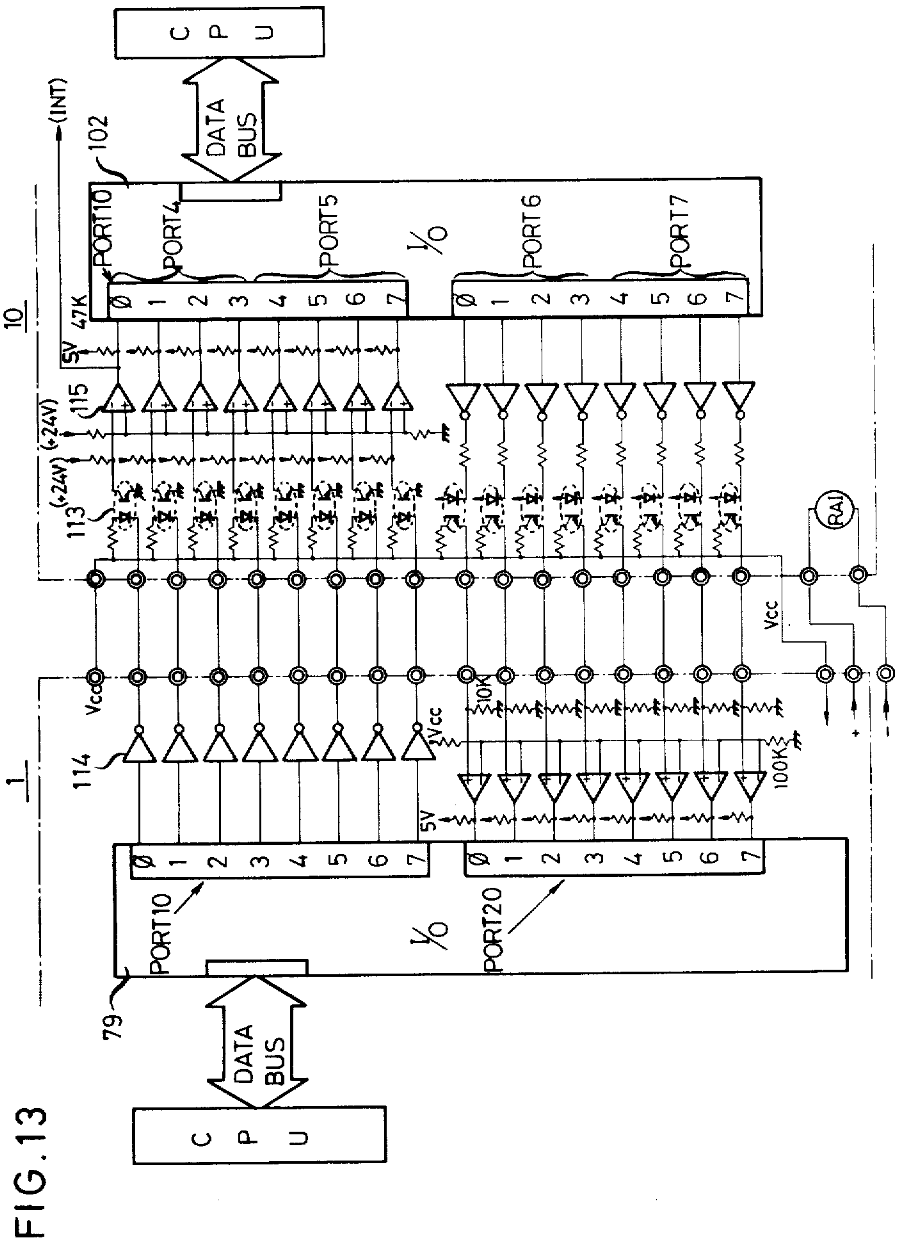
FIG. 13 shows a connection diagram for an interface circuit.

Referring now to FIG. 13 illustrating in detail an interface circuit 110, the respective eight bits for the input PORT 10 and the output PORT 20 of the I/O device 102 in the master sorter are connected to the respective eight bits for the output PORT 10 and the input PORT 20 of the I/O device 79 in the copier by way of respective photo couplers 113. Thus, electrical levels between the control units are separated so as to become independent to each other by means of the photo couplers 113. In addition, 114 shows an inverter and 115 shows a comparator.

In the copier having such data-interface arrangements as explained above, the same sorter can be used with different types of copiers if the meaning of information data which are to be exchanged between the copier and the sorter are appropriately defined and standardized. Such advantage may result in the standardization of design and mass production.

Exchange of the required data between the sorter and the copier will be made possible by providing a CPU control program represented by the flow chart shown in FIG. 14 to the interface circuit of such hardware arrangements as mentioned above.

Figure 14:
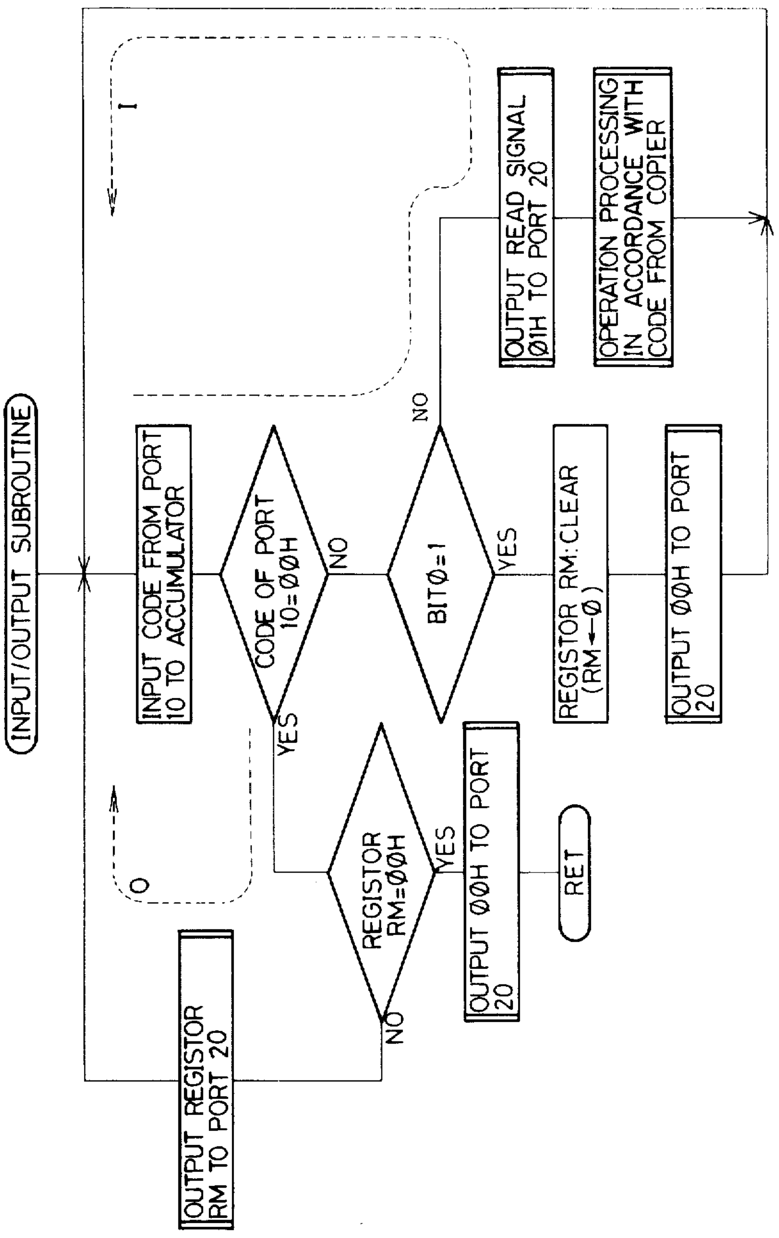
FIG. 14 shows a flow chart for the inputs and outputs in the sorter.

In the input/output flow chart of FIG. 14, "o" shows an output flow and "I" shows an input flow. "RM" is a register which stores data to be outputted, and "RM←$\phi$" implies "Enter zero into RM". The absence of signal data, when expressed in terms of a hexadecimal notation with 8 bits divided every 4 bits, is assumed to be $\phi\phi$H, and the presence of signal data is defined to be that the bit having a weight "0" of 8 bits is a one or 1. In short, Bit O is used as strobe signal to judge the presence or absence of data.

Figure 15:
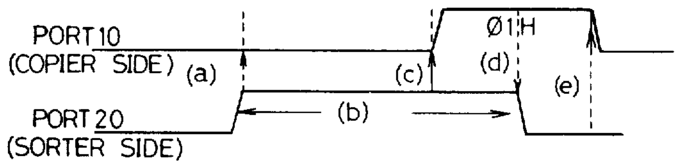
FIG. 15 shows a time chart of providing codes to the copier from the sorter side.

Referring to FIG. 15 illustrating a time chart for the case where the data (code) is supplied from the sorter side to the copier, (a)-(e) show the following conditions.

(a) The sorter outputs CODE provided that PORT 10 is $\phi\phi$H.

(b) The sorter continues to hold the condition (a) until READ signal $\phi$1H is provided.

(c) The copier reads CODE and outputs READ signal $\phi$1H.

(d) The sorter resets PORT 20 to $\phi\phi$H when the copier generates READ signal.

(e) The copier resets PORT 10 to $\phi\phi$H provided that PORT 20 becomes $\phi\phi$H.

Although FIG. 14 represents the input/output flow chart for the sorter, a flow chart for the copier side can also be indicated by quite similar arrangements.

Figure 16:
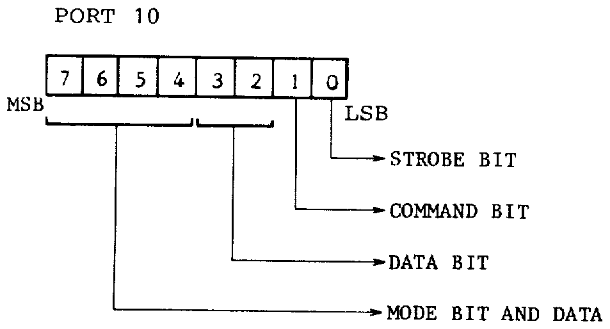
FIGS. 16(A) and 16(B) show a list of instruction codes from the copier to the sorter.
Figure 17:
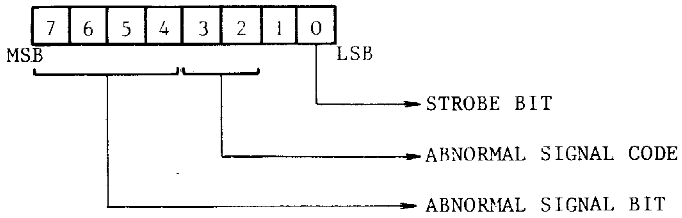
FIGS. 17(A) and 17(B) show a list of instruction codes from the sorter to the copier.
Figure 18A:
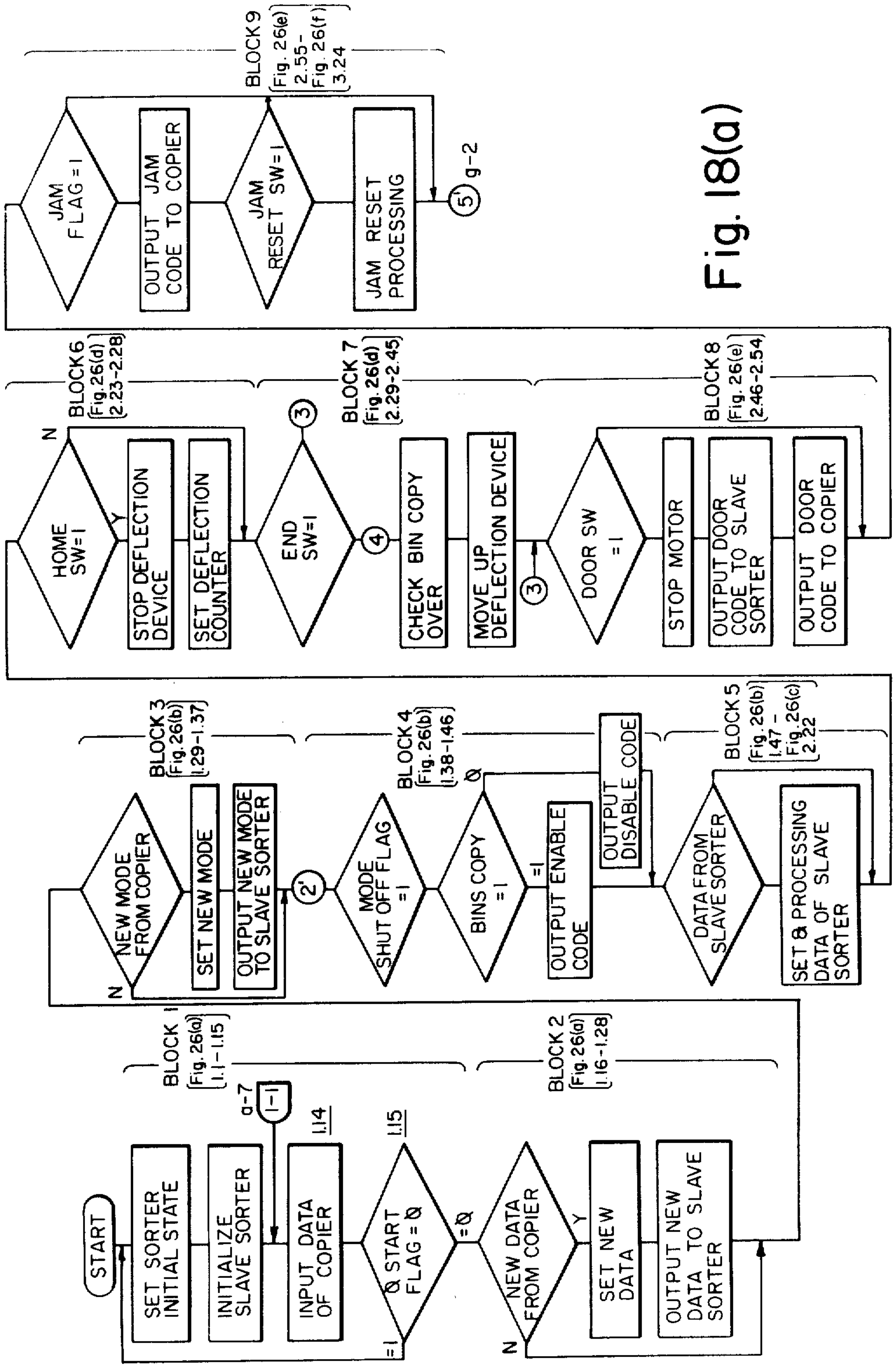
FIG. 18(*a*) through FIG. 18(*d*) are flowcharts indicating generally the main program routine of the master sorter.
Figure 18B:
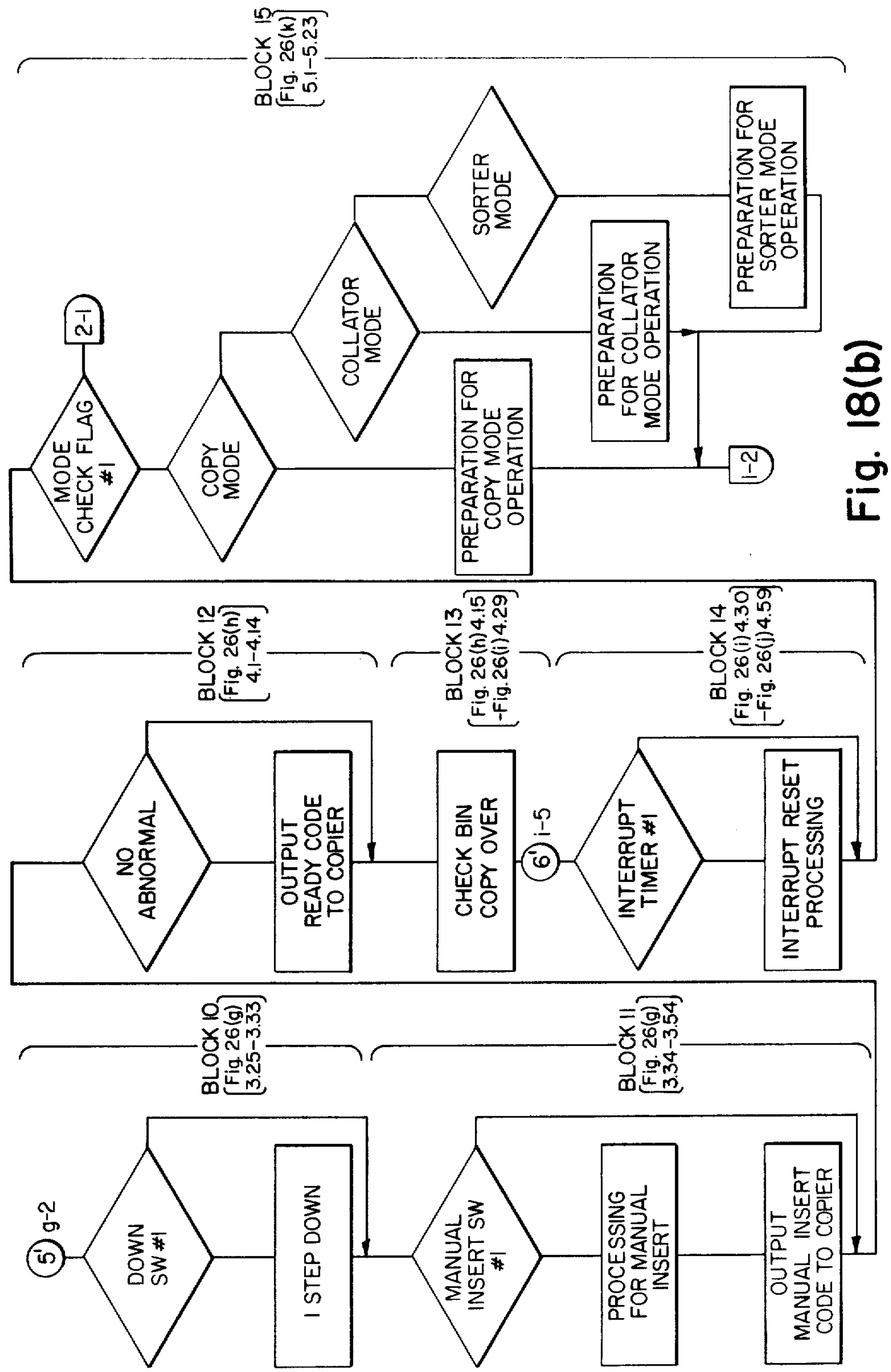
Figure 18C:
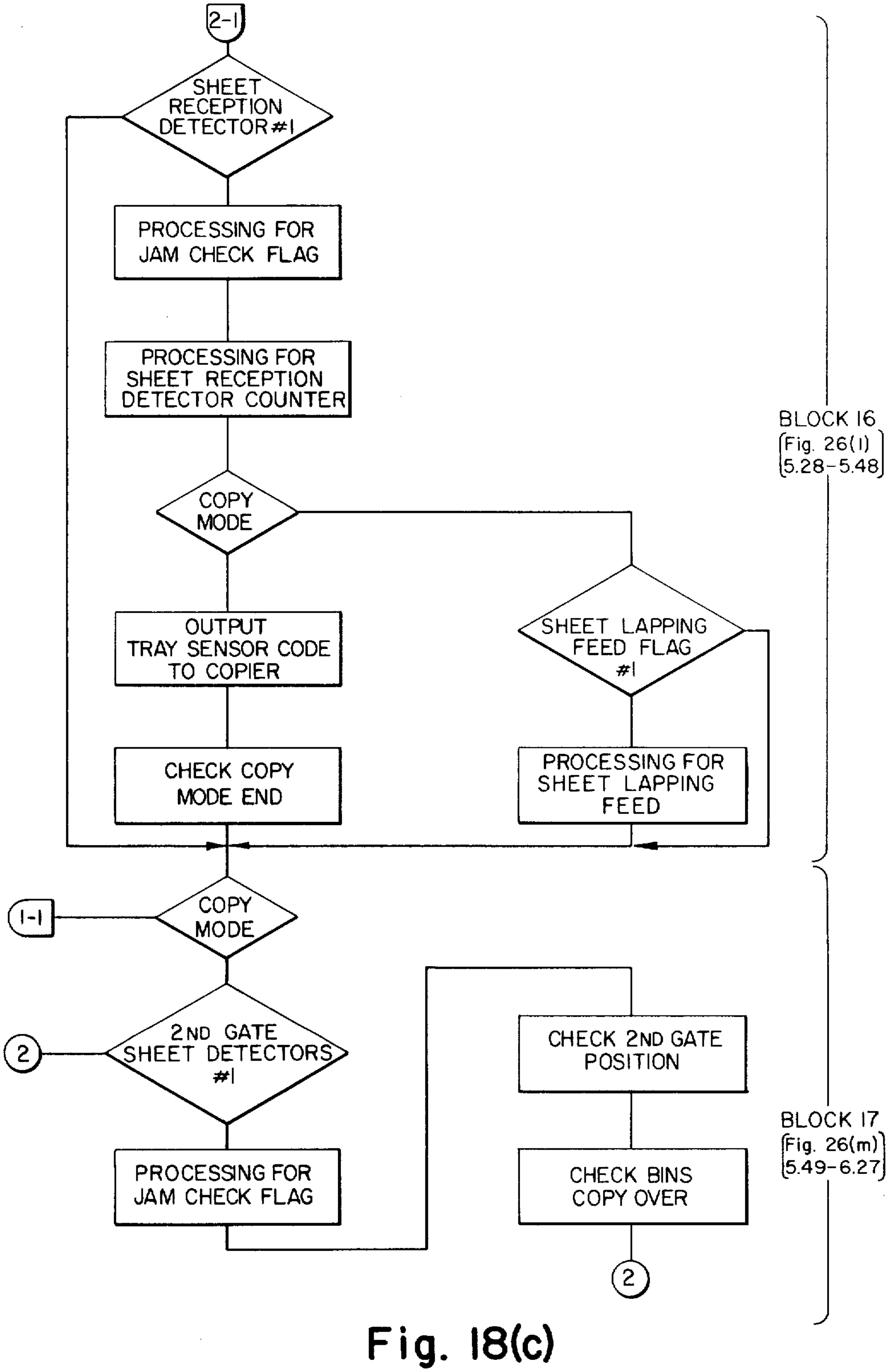
Figure 18D:
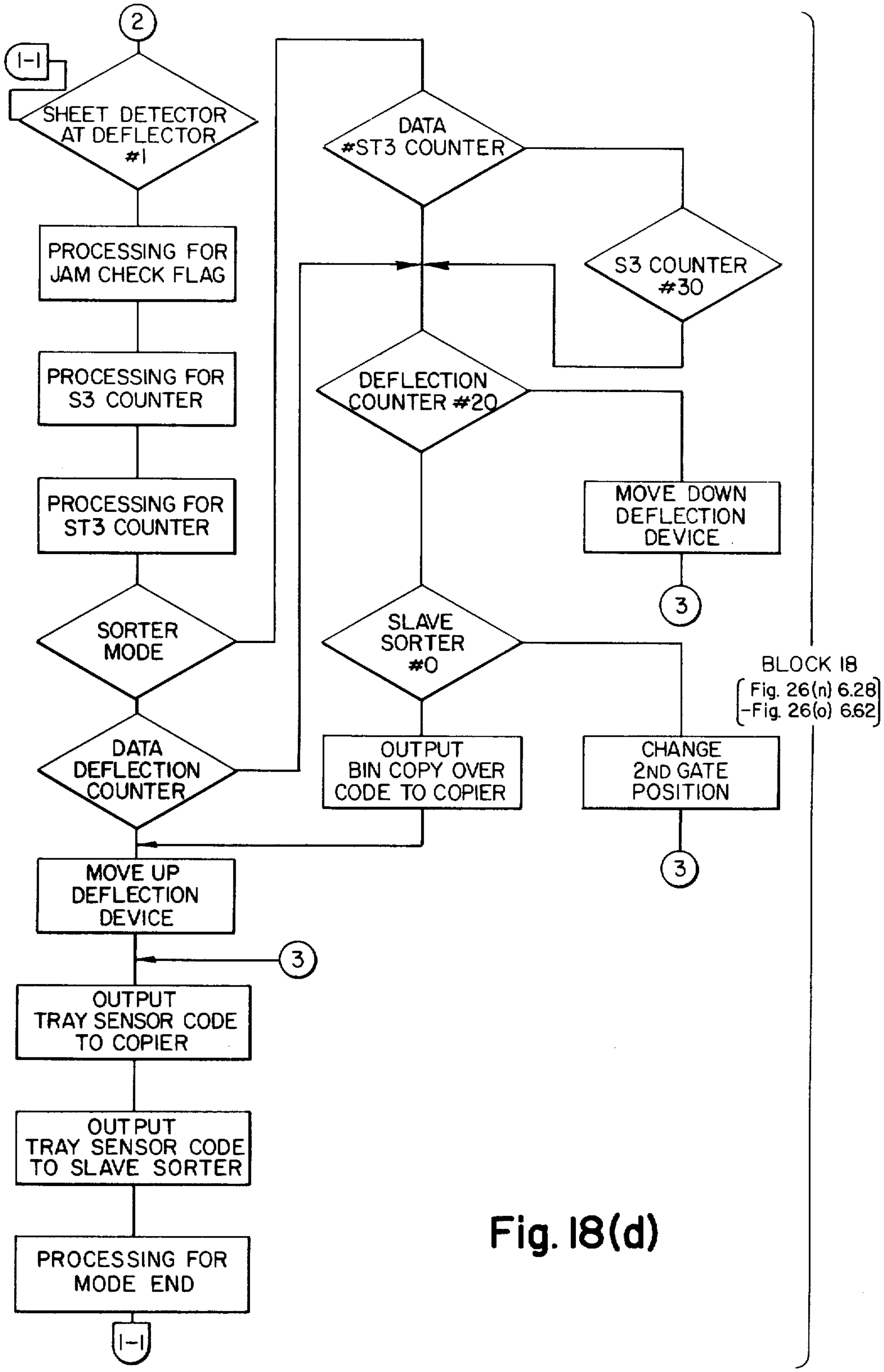

In FIGS. 16 and 17, the definitions of signal codes exchanged between the sorter and the copier are illustrated. FIG. 16(*a*) shows instruction codes (that is, codes in PORT 10) from the copier to the master sorter, and the bit assignment and meanings thereof are indicated in FIG. 16(*b*). FIG. 17(*a*) shows instruction codes (that is, codes in PORT 20) from the master sorter 10 to the copier 1, and the bit assignment and meanings thereof are illustrated in FIG. 17(*b*).

Table 1 shows the definitions for the command of instruction codes at PORT 10. The outputs from the copier to the sorter sides refer to a decimal number and are outputted as lower order bits (5H), (9H) and MSB(DH).

Table 2 shows the definitions on the command of instruction codes at PORT 20.

Operation of the sorter and copier, contents of exchange signals required for the operation thereof and the timing for sending out the signals are explained below depending on the operation modes.

Table 1

| | | Definition on instruction codes at PORT 10 |
|---|---|---|
| Code Name | HEXA | Definitions |
| READ | Ø1H | Confirmation code identifying that the data code from the sorter has been read from PORT 20. When the copier has read the data code from PORT 20, it provides the code (READ) from PORT 10 to the sorter. |
| SORTER START | Ø3H | Code outputted from PORT 10 (under the print green state) when the copy start key 86 at the copier side is depressed. The sorter side initiates the driving of the transfer system by use of this signal. The transfer system is stopped by the control system in the sorter side at the time when the operation of the sorter side is finished. |
| JAM COPY | 43H | Code outputted from PORT 10 when the copier is jammed. With this signal, the sorter side stops the transfer system after collating or sorting all the sheets in the sorter or storing the sheets in the proof treay. |
| MOTOR STOP | 63H | Code outputted at the time of TONER END or when all of sheets in the cassette have been used. With this signal, the sorter side stops the transfer system after collating or sorting all the sheets in the sorter or storing the sheets in the proof tray. |
| JAM MOTOR | 23H | Reset signal for JAMCOPY (43H) and MOTOR STOP (63H) signals. |

Table 1-continued

| Definition on instruction codes at PORT 10 | | |
|---|---|---|
| Code Name | HEXA | Definitions |
| RESET | | The sorter side returns to normal operation. The transfer system is still at a standstill, but driven with SORTER START (ø3H) signal. |
| END SENSOR | 83H | Code outputted at the time the rearward end of sheet is detected by the final sensor 16a provided in the sheet transfer parth of the copier. The sorter uses this signal to detect the jamming of the transfer route between the copier and the sorter. |
| NORMAL MODE (COPY MODE) | 11H | Mode for using the proof tray 27 in modes other than both sort and collate modes. With this signal, the sorter accomodates all the sheets transported from the copier in the proof tray 27. |
| SORT MODE | 31H | Sort mode signal outputted when the sort key 83 in the copier is depressed. The sorter side is placed in its sort mode. |
| COLLATE MODE | 51H | Collate mode signal outputted when the collate key 84 in the copier is depressed. The sorter side is placed in its collate mode. |
| INTER-RUPT | 71H | Signal outputted when the interrupt key 89 in the copier is depressed. The sorter stops after storing the copies supplied from the copier in the desired bins of the proof tray. |
| øSTART | 91H | With this signal, the sorter side starts the program from the ø address. |
| DATA LOW ORDER | [n] 5H | Signal representing data in the lower order digit. [7 6 5 4 3 2 1 0] Data: 0 1 0 1 → 5H, representing lower order digit. → Lower order digit data (n = 0~9) |
| DATA UPPER ORDER | [n] 9H | Signal representing 4 bits in the upper order digit. [7 6 5 4 3 2 1 0] Data: 1 0 0 1 → 9H, representing upper order digit. → Upper order digit data (n = 0~9) |
| DATA MSB | [n] DH | Signal representing 4 bits in the upper order digit. [7 6 5 4 3 2 1 0] Data: 1 1 0 1 → DH, representing MSB digit → MSB digit data (n = 0~9) |
| MODE SHUT OFF | B1H | Signal provided to the sorter side by the copier when it becomes the time of "mode shut off". The sorter side outputs the code of DISABLE SHUT OFF or ENABLE SHUT OFF (Table 2), depending of the presence or absence of sheet in the bins. |
| INTER-RUPT RESET | F1H | Signal provided to the sorter side by the copier when the interrupt key 89 is reset. The sorter side returns to the condition previous to interruption. |
| MODE STOP | D1H | Signal provided to the sorter by the copier when the stop key 87 is depressed during the execution of copy cycle. The sorter side stops after storing the sheets inside the sorter into the specified bins or the proof tray. |

TABLE 2

| Definitions on instruction codes at PORT 2 | | |
|---|---|---|
| Code Name | HEXA | Definitions |
| READ | ø1H | Cofirmation code indentifying that the data code from the copier has been read from PORT 10. When the sorter has read the data code from PORT 10, it provides the code (READ) from PORT 20 to the copier. |
| JAM RESET | B1H | Code outputted to the copier when the sorter side is reset under jamming state. |
| DISABLE SHUT OFF | øBH | Code corresponding to MODE SHUT OFF from the copier, or inhibit signal for forbidding the occurence of MODE SHUT OFF when any sheet is present in the bins. |
| ENABLE SHUT OFF | ø7H | Code corresponding to MODE SHUT OFF from the copier, or signal which does not inhibit MODE SHUT OFF when no sheet is present in the bins. |
| TRAY SENSOR | ø3H | Sheet rear end detection signal from the final sensor (detector 69 for sort and collate modes, and detector 21 for normal mode) disposed at the place where a sheet is ejected. The copier counts this signal and uses the counted signals for jam correction and indication at the time of jamming. |
| MODE CYCLE END | 13H | Signal outputted when the values in the paper ejection counter become equal to the number of sheets set in the set member counter of the copier. |
| JAM COPY | E1H | Jam signal occured in the sorter portion following the first gate 23, under the condition that the sheet from the copier is not ejected into the proof tray. * RESET ouputs a code of JAM RESET (Table 3). |
| SORTER JAM | 81H | Jam signal occured in the sorter portion following the first gate 23, under the condition that the sheet from the copier is ejected into the proof tray. * RESET outputs a code of JAM RESET (TABLE 3). |
| BINS COPY | A1H | Signal outputted in the event that any sheet exists in the bin, at the time of changing modes as below. The copier side displays "sorter confirmation"<br>Formal Mode → New Mode<br>Proof tray use mode → Sort mode<br>Proof tray use mode → Collate mode<br>Sort mode → Collate mode<br>Collate mode → Sort mode<br>* If sheet is taken out, the SORTER READY code is outputted. |
| BIN COPY OVER | C1H | Signal outputted when more than 100 sheets are accommodated in the bin. * If the sheet is taken out, the SORTER READY code is outputted. |
| DOOR SW | F1H | Signal outputted if the door in the side is open. * If the door is closed, the SORTER READY code is generated. |
| MANUAL INSERT | 91H | Signal outputted by the sorter at the time of manual insert operation to forbid the change of mode. * If manual insert operation is complete, the SORTER READY code is outputted. |
| ENTRY OVER | D1H | Signal outputted when data exceeding the sorting capacity determined by the |

TABLE 2-continued

| Definitions on instruction codes at PORT 2 | | |
|---|---|---|
| Code Name | HEXA | Definitions |
| | | number of sorters connected is inputted. The copier displays "set numbers confirm". * To be reset by the SORTER READ code. |
| SORTER READY | 11H | Abnormal signal (the bit of weighted "7" is 1) other than JAM and all of reset signals. |
| JAM COPY | E1H | Jam signal occured in the sorter portion anterior to the first gate 23, under the condition that the sheet from the copier is not ejected into the proof tray. * RESET outputs a code of JAM RESET (Table 3). |

(1) Normal (copy) operation mode

Copy cycle operation of normal mode will be started by placing the main SW 73 in the copier side to ON, setting the set number counter to the number of copies N desired by depressing the ten key SW 88 in the operating unit, depressing the normal mode SW 85, and then depressing the print (copy start) SW 86.

The copier sends out "N" copy sheets to the sorter and the copy sheets are all stacked in into the proof tray 27. With the print SW turned on, SORTER START (ϕ3H) is outputted from the copier. The motor in the sorter starts with this signal.

END SENSOR (83H) is outputted by the falling of the signal from the end sensor 16*a* in the copier. In the sorter, this signal is used as timing signal for detecting any jamming between the sorter and the copier. As a signal representing that the copy has been placed into the proof tray 27 in the master sorter, the sorter provides TRAY SENSOR (ϕ3H) to the copier by use of the falling of the signal from the first sensor 21. The sorter provides MODE CYCLE END (13H) at the time when the set numbers N becomes equal to the number of copies. In the case of normal mode operation, the print green lamp in the copier is lit when the exposure of the last sheet is finished. Subsequent to this time, the copier is placed in a ready state for beginning another copy operation.

(2) Sort operation mode

Copy cycle operation of sort mode will be started by the depression of the print SW 86 after setting the set number counter to N, and then setting to sort mode by means of the sort mode SW 83.

The copier sends out "N" copy sheets to the sorter portion. Then, the sorter provides one copy sheet to the highest bin or 1st bin as the first step. Thereafter, the deflection device descends by one step to permit insertion of the next copy sheet by the sorter into the 2nd bin. This operation will be repeated successively until the lowest bin or Nth bin is supplied with a copy sheet, and then the deflection device returns to the original or highest position. With the print SW 86 turned on, the copier outputs SORTER START (ϕ3H). When the sorter receives this signal, it causes the driving motor in the sorter to start. The copier generates END SENSOR (83H) in synchronism with the falling of the signal obtained when the copy sheet passes through the final sensor 16*a*. This signal is used in the sorter as a timing signal for detecting any jamming between the sorter and the copier. The sorter provides TRAY SENSOR CODE (ϕ3H) to the copier in synchronism with the falling of the signal obtained when a copy sheet passes through the third sensor or sheet detector 63. With this signal, the copier increases the contents of the copied number counter by one digit. The sorter provides MODE CYCLE END (13H) to the copier at the time when the number of sheets copied becomes equal to the set number N. The copier extinguishes the print red lamp and lights the print green lamp at the time of reception of the abovementioned signal. Subsequent to this time, the copier is placed in the ready state for beginning another copying operation.

(3) Collate operation mode

Copy cycle operation of the collate mode will be started by the depression of the print SW 86 after setting the set number counter to N, and then selecting the collate mode by depressing the collate SW 84. The copier sends out "N" copy sheets to the sorter portion, then the sorter starts to placed the paper sheets into the highest or 1st bin. When the number of sheets accommodated in the 1st bin reaches the a predetermined number of sheets "n" which may be a maximum of 100 but, for illustrative purposes, is considered to be 50 in this example, the feeding of copy sheets to the 1st bin is interrupted and the deflection unit descends to the next or 2nd bin. Exchange operation of the signals for the 2nd bin between the sorter and the copier is the same as the case of the sort mode.

(4) Overflow operation in sort mode (When the number of sheets accommodated in each bin exceeds the maximum accommodation capacity A; for example, A = 100)

The sorter provides BIN COPY OVER (C1H) to the copier when the accommodation operation of the 100th copy sheet is finished or when the deflection device has reached the lowest position at the 100th up and down movements and the copy sheet insertion has finished. When the copier receives this signal, it lights the sorter confirmation lamp 91 and forbids the next copy cycle while holding the lighted condition of print red lamp.

(5) Overflow operation in collate mode (When the number of sheets accommodated in the lowest bin exceeds the predetermined values "n", namely, n = 50)

The sorter generates BIN COPY OVER (C1H) at the time when the 50th copy is inserted into the lowest or last bin. When the copier receives this signal, it stops any further operation of the paper feed roller 12 while maintaining the copy cycle operation until the copy sheet inside the copier has been sent into the sorter portion. In parallel with this operation, the copier lights the sorter confirmation lamp 91.

The operation of entire system under such an inhibited state as mentioned above can be restored by manually removing all the copies stored in the bins. When all the bins are cleared, the bin sheet sensor detects such states to cause the sorter to output SORTER READY (11H) to the copier. Thus, the copier extinguishes the sorter confirmation lamp 91 and the print red lamp 95, lights the print green lamp 96, and returns to the ready state for a new copy cycle.

(6) Mode setting by the operating unit in the copier

The copier generates SORT MODE (31H) when the sort mode SW 83 is depressed, and also outputs COLLATE MODE (51H) when the collate mode SW 84 is depressed. In addition, the copier generates NORMAL MODE (11H) when the normal mode SW 85 is depressed. When the sorter reads any one of the mode signals mentioned above, the memory flag therein is set to its mode.

(7) Setting of the set number counter by the operating unit in the copier

With the ten key SW 88 depressed, the contents of the set number counter are separately outputted based on each digit as follows.

| | | |
|---|---|---|
| 1st digit | n5H | (n = 0~9) |
| 2nd digit | n9H | (n = 0~9) |
| 3rd digit | nDH | (n = 0~9) |

Assuming now that the set number is 123, the output is provided in the form of 35H, 29H, 1DH. The sorter memorizes its data by use of the memory contained therein and holds them until new data are provided.

(8) Overlap handling (When sort mode or collate mode is selected by mode changing operation under the state where there is any copy sheet in the bin.)

When SORT MODE or COLLATE MODE is provided, the sorter checks for the presence or absence of sheets by use of the bin sheet sensor 70, and generates BIN COPY (A1H) to the copier provided that there exists a sheet or sheets in a bin. With this signal, the copier lights the sorter confirmation lamp 91 and the print red lamp 95. The copier in such copy inhibit condition can be restored or reset by removing all the copies from the bins, similarly to (5).

(9) Stop action during copy cycle operation

When the stop SW 89 is depressed during the copy cycle operation, the copier ceases to supply new copy sheets, and stops its sheet driving mechanism after placing the copies stored therein into the sorter. When the number of copies accommodated in the sorter portion becomes equal to the number of sheets supplied by the paper feed roller 12, the copier provides STOP (D1H) to the sorter which is brought to a stop by this signal after accommodating the delivered sheets within the sorter.

(10) Interrupt manipulation

With the interrupt SW 89 depressed during the copy cycle operation, the copier performs the same operation as "Stop action" described in (9). The copier generates the following signals at the time when the number of sheets accommodated in the sorter portion becomes equal to the number of sheets supplied.

| | |
|---|---|
| NORMAL MODE | (11H) |
| Entry data N = 1 | (15H, Ø9H, ØDH) |
| INTERRUPT | (71H) |

Concurrently with this operation, the set number counter is set to N=1 in normal mode, the copied number counter is off, the print green lamp lights, and interruption of the copy operation becomes possible. The sorter accommodates its contents into the memory in response to the abovementioned signal and changes to its modes. Upon completion of the abovementioned operation, the entire system is placed in its interrupt mode and operates in such a manner that only the normal mode is possible.

(11) Interrupt recovery manipulation

With the interrupt SW 89 depressed again during the interrupt mode, the copier returns to the mode previous to the interrupt manipulation, set numbers and copied numbers. In addition, the copier provides the mode signal previous to interruption and the set number signal N to the sorter. Then, the sorter reads this signal and returns to the mode previous to interruption.

(12) Oversetting (When the value in the set number counter is set at a number larger than the number of bins (For example, 20 bins) in the sorter under sort mode.)

The sorter judges whether or not the value "N" in the set number counter exceeds the number of bins upon the reception thereof. When the former exceeds the latter, the sorter provides SET NUMBER OVER (ENTRY OVER) (D1H) to the copier. With this signal, the copier lights the set number confirmation lamp and the print red lamp 95 and forbids copying operation. However, in this example, the number of bins in the sorter side varies with the number of sorters connected in such a manner that one sorter offers 20 bins, two sets of sorters offer 40 bins and three sets of sorters offer 60 bins, and the controller in the sorter will determine the total number of bins.

(13) Operation of door SW in the sorter

When the cover in the sorter is opened during operation, the door SW 74 is actuated to disconnect an AC power source in the sorter side and to stop the operation of the sorter portion. At this juncture, the sorter provides DOOR SW (F1H) to the copier. With this signal, the copier interrupts the delivery of new sheets and stops after ejecting all the copies therein to the sorter. In addition, the sorter confirmation lamp and the print red lamp are lit and the copying operation is inhibited. The copy sheets are piled at the transfer portion between the copier and the sorter.

(14) Operation of door SW in the copier

When the cover in the copier is opened during operation, the door SW within the copier is actuated to disconnect an AC power source in the copier and to stop the operation of the copier. At this juncture, the copier provides MOTOR STOP (63H) to the sorter. With this signal, the sorter stops after accomodating the copy sheets therein into the desired bins.

(15) Paper jamming in the copier

If paper jamming occurs in the copier during the copy cycle operation, the jam detection circuit of the control unit in the copier is operated to stop the driving motor in the copier. At the same time, the jam indication lamp 94 and the print red lamp 95 in the copier are lit, and the number of copies accommodated in the bins and counted with TRAY SENSOR (ϕ3H) sent from the sorter side is displayed on the copied number counter. The copier provides JAM COPIER (43H) to the sorter in response to the jam detection. With this signal, the sorter stops after feeding the copy sheets therein into the desired bins or proof tray. The abovementioned jam detection condition will be reset when the jam reset SW 90 in the operating unit within the copier is turned on. Concurrently with the turning on of the jam reset SW, the copier provides JAM MOTOR RESET (23H) to the sorter. When the sorter reads this signal, it resets the jam memory in the copier portion and returns to its operative condition.

(16) Paper jamming in the sorter portion

If paper jamming occurs in the sorter portion during the copy cycle operation, the jam detection circuit in the sorter is operated in response to the timing signals supplied from the first sensor or sheet reception detector 21, the second sensor or intermediate detector 31 and third sensor or deflection-part sheet detector 69 within the sorter as well as the end sensor 16*a* in the copier to stop the driving motor instantly. At the same time, the copier receives SORTER JAM (81H) and ceases to deliver new sheets and stops after ejecting all the copy sheets therein to the sorter. The jam indication lamp 93 and the print red lamp 95 in the sorter portion are lit, and the copied number counter displays the number of sheets accommodated in the bins. The above-mentioned jam detection condition can be reset by turning on the jam reset SW 75 located inside the master sorter. At this stage, the sorter provides JAM RESET (B1H) to the copier. With this signal, the copier extinguishes the jam lam 93 in the sorter portion, and provides SORTER READY (11H) to the copier when the door in the sorter is closed. The print red lamp 95 is extinguished and the print green lamp 96 lights.

(17) Jam recovery manual insertion

If a sheet is inserted from the manual insert portion of the sorter portion after resetting from a jam detection, the jam recovery manual insertion mode will be assigned. When a sheet is inserted from the manual insert entrance, the manual insert sensor or sheet detector 41 detects a signal to cause the sorter to open the manual insert gate 40 to enable the insertion of the sheet. At the same time, the sorter drive motor is started to store the inserted sheet into the desired bin. The deflection device moves in accordance with the mode and the set numbers at that time to insert the sheets supplied in succession into the desired bin. The sorter provides MANUAL INSERT (91H) to the copier at the time the manual insert sensor 41 is operated and the manual insertion mode is established. In addition, the sorter provides TRAY SENSOR (ϕ3H) to the copier with the fall of the output signal of the sensor which detects, by use of the sensor 69 located in the deflection device, the condition that the sheet has been accommodated. After all of the manually inserted sheets have been stored in the desired bin, the sorter generates SORTER READY (11H). In response to the signal MANUAL INSERT, the copier lights the red print lamp, and inhibits the copy cycle operation. On the contrary, in response to the signal SORTER READY, the copier lights the green print lamp and enables the copy cycle operation. In addition, when the copier reads TRAY SENSOR, it causes the bin accommodation counter to count up and also enables the copied number counter to display its contents. Like these, the number of sheets manually inserted at the sorter side can be corrected at the copier side, and the consecutive copy cycle is possible without the need of corrective operation to the counters and others.

(18) Mode shut off

"STANDARD MODE" without disconnecting an AC power source, but not that the AC power source is disconnected as in the case of "AUTO SHUT OFF". The copier provides a MODE SHUT OFF (B1H) to the sorter unless the command for commencing a new copy cycle or for changing the former mode is present within a predetermined time T0 (one minute) after the completion of copying. When the sorter reads this signal, the presence or absence of a sheet is checked by the bin sheet detector 70 in the sorter. If any sheet is present, the sorter provides DISABLE SHUT OFF (ϕBH) to the copier, but if absent, it provides ENABLE SHUT OFF (ϕ7H). If the copier reads ENABLE SHUT OFF, the mode at that time is returned to the specified mode referred to as "Standard mode" denoting the following conditions that the content of the set number counter is 1, the mode corresponds to normal mode as well as to equi-fold copy mode, and the density of copy is standard. If the copier reads DISABLE SHUT OFF, it holds the mode at that instant. Exchange operation of signals after seeing the presence or absence of paper in the bins of the sorter portion is required to enable the mode shut off operation of the entire system.

Explanation heretofore has been concentrated on the relationship between the copier and the sorter. The relationship between the slave sorter 20 and the subslave sorter 30 will be hereinafter explained in detail.

TABLE 3

Definition of instruction codes at PORT 30

| Code Name | HEXA | Definitions |
|---|---|---|
| MOTOR START | A3H | Signal to drive a transfer system in the slave sorter. The transfer system is stopped when the specified mode ends or by the signal "MOTOR STOP" from the master sorter. |
| MASTER SORTER END | 23H | Code provided to the slave sorter when sorting, collation or copy mode of the master sorter has finished (For example, set numbers = ejected numbers) |
| JAM RESET | 43H | Code outputted from the master sorter when the master jam reset key is depressed as the result of jamming in the sorters (including master, slave and subslave sorters) |
| MOTOR STOP | 63H | Code outputted when the master sorter stops the motor in the slave sorter. For examples: In case the door in the master sorter is open; Paper jamming in the master sorter. The slave sorter stops after storing the sheets under delivery into the desired bin. |
| END SENSOR | 83H | Code provided when the 3rd sensor 69 in the master sorter detects the rear end of sheet. The counter (total counter) at the slave sorter side is increased by 1 (+1). |
| COPY MODE | 11H | Same as 11H at PORT 10 |
| SORT MODE | 31H | Same as 31H at PORT 10 |
| COLLATE MODE | 51H | Same as 51H at PORT 10 |
| DATA LOWER ORDER | n5H | Same as PORT 10 |
| DATA UPPER ORDER | n9H | Same as PORT 10 |
| DATA MSB | nDH | Same as PORT 10 |
| JAM RECOVERY MANUAL INSERT | 71H | Code outputted at the slave sorter side when the manual insert switch is turned on for jam recovery. The slave sorter side enters into manual insert operation. |
| SLAVE SORTER USE | 91H | Code for instructing the use of the slave sorter as the result of checking the mode and data by the master sorter. |
| SUBSLAVE SORTER | B1H | Code outputted from the slave sorter to the subslave sorter for notifying that "You are a subslave sorter" This code is used to judge the kind of sorters: slave sorter or subslave sorter. Example: As the result of judgement, the deflection counter sets the numbers of 1st bin to "21" or "41". |
| MANUAL INSERT | F1 | Code outputted by the master sorter when the manual insert switch is turned on at the time of manual insert other than jam recovery |
| MODE CLEAR | C3H | Code outputted when the mode under execution is interrupted before completion and the set numbers or the mode is modified. The slave sorter executes the modified mode or the modified set numbers under the assumption that the mode before interruption has |

TABLE 3-continued

| Definition of instruction codes at PORT 30 | | |
|---|---|---|
| Code Name | HEXA | Definitions |
| | | been finished. |
| ∅ START | E3H | Code outputted by the master sorter when the power supply is connected. With this code, the slave sorter causes the program counter to start with "∅". |

TABLE 4

| Definitions on instruction codes at PORT 40 | | |
|---|---|---|
| Code Name | HEXA | Definitions |
| READ | ∅1H | Confirmation code identifying that the code from the master sorter has been read from PORT 30. When the slave sorter reads this code, it provides this code to the master sorter through PORT 40. |
| TWO MODULE | ∅2H | Code indicating that the slave sorter is connected. The master sorter checks the code output to the slave sorter or the number of sets connected by use of this signal. (Checking of sort information) |
| THREE MODULE | ∅4H | Code provided to the master sorter when the subslave sorter is connected at the time of sort mode. The master sorter checks the number of sets connected. (Checking of sort information) |
| BIN COPY OVER | ∅4H | Code outputted when accommodation of sheet into any of bins has become impossible at the time of collate mode. |
| SLAVE SORTER END | ∅8H | Code outputted when a series of modes in the slave sorter are finished. |
| SLAVE SORTER JAM | 1∅H | Code outputted if there occurs jamming in the sorter. The master sorter puts sheets into the proof tray 27. |
| SLAVE SORTER BIN COPY | 2∅H | Code outputted when any sheet is present in the bin of the slave sorter. |
| SLAVE SORTER DOOR | 4∅H | Code provided whenever the door is open. |
| END SENSOR | 8∅H | Sheet rear end detection signal of the third sensor in the slave sorter. |

Figure 19:
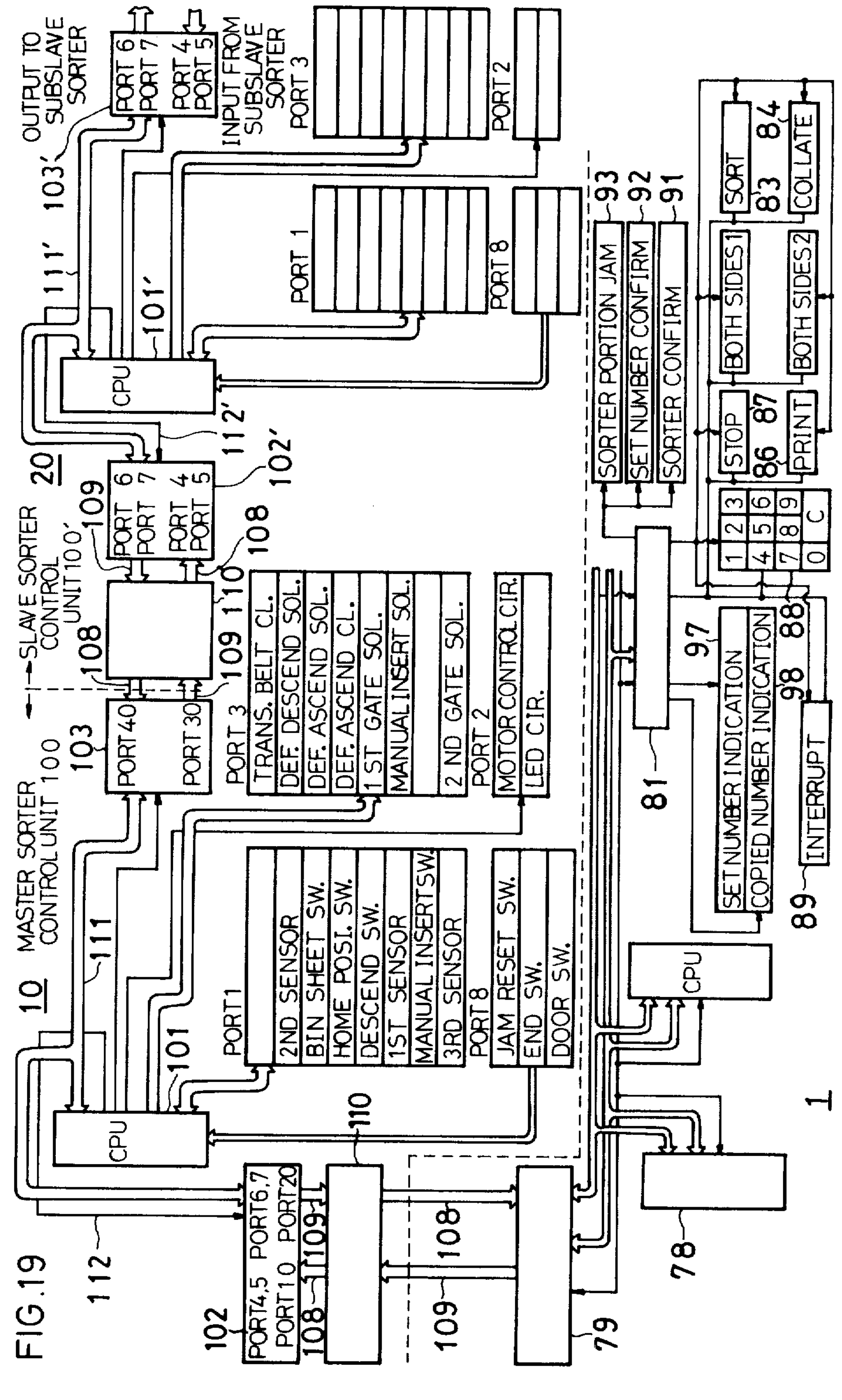
FIG. 19 shows a schematic diagram of a control circuit for the copy production machine.

FIG. 19 is a connection block diagram for the respective control units from the copier 1, master sorter 10 and the slave sorter 20. The CPU used in each control unit of the master sorter 10, slave sorter 20 and subslave sorter 30 comprises a program memory, a timer counter and a I/O port. PORT 1 and PORT 8 are the input devices 106 of sorter or input ports for switches and detectors, and PORT 3 and PORT 2 are the output devices 105 or output ports for sorter driving systems.

I/O devices 102 and 103 of the master sorter are connected to the CPU 101 through a bydirectional static I/O line 111, the I/O device 102 has PORT 10 and PORT 20 for the copier, and the I/O device 103 has PORT 30 and PORT 40 for the slave sorter. 112 shows a chip select line. PORT 10 is a data bus port which receives the code from the copier and comprises PORT 4 and PORT 5 having 4 bits, respectively. PORT 20 is a data bus port which transmits the data from the master sorter to the copier and comprises PORT 6 and PORT 7 having 4 bits, respectively. Data exchange between the copier side and the sorter side is carried out through the interface circuit 110, as described previously. PORT 30 is a port which transmits the code from the master sorter 10 to the slave sorter 20, and PORT 40 is a port which receives the code from the slave sorter and has the same construction with PORT 20 and PORT 10. Data exchange between the master sorter 10 and the slave sorter 20 is carried out through the interface circuit 110'.

Figure 21:
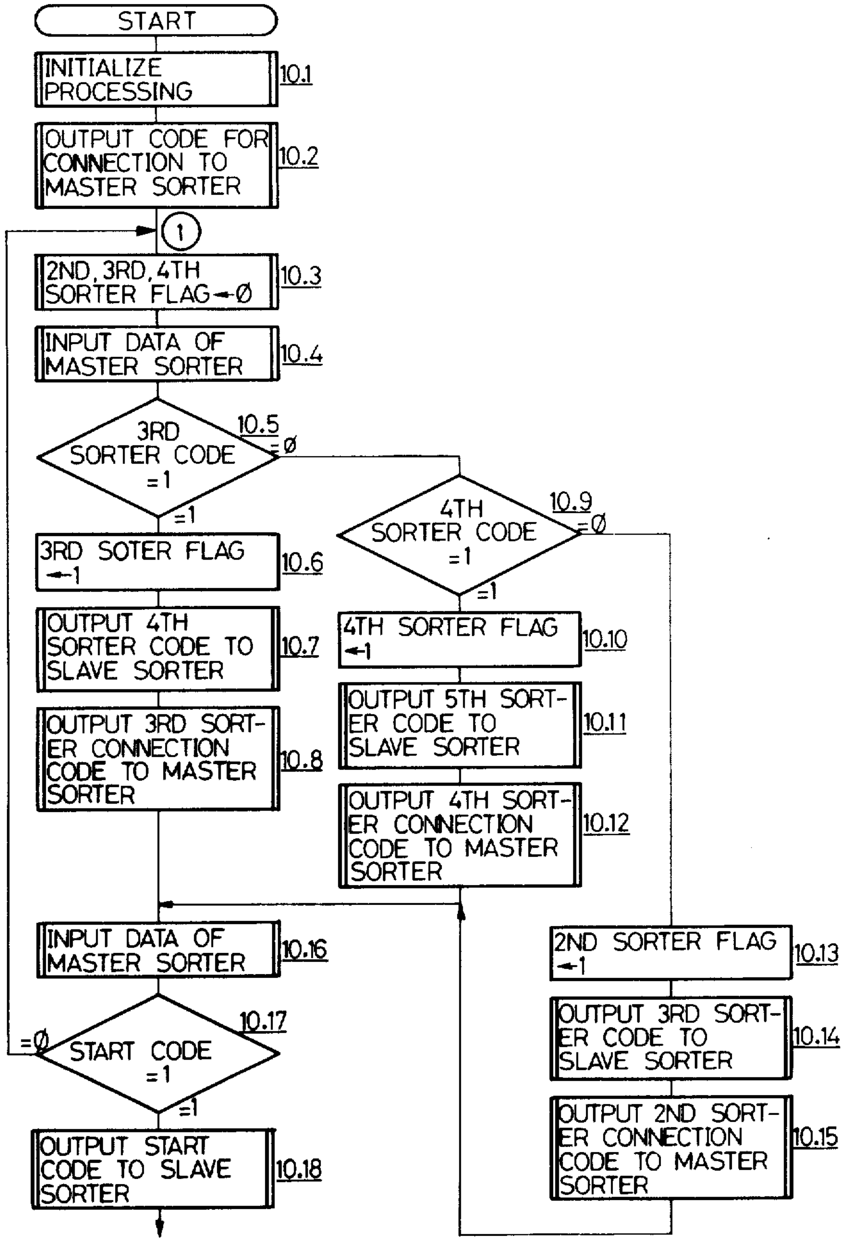
FIG. 21 shows a flow chart by which the sorters other than the master sorter programably identifies the status or order of themselves.

FIG. 20 shows instruction codes (codes at PORT 30) from the master sorter 10 to the slave sorter 20, and FIG. 21 shows instruction codes (codes at PORT 40) from the slave sorter 20 to the master sorter 10. Tables 3 and 4 show the definitions of codes at PORTs 30 and 40, respectively. The codes and definitions with respect to PORT 10 and PORT 20 are the same as illustrated in FIGS. 16 and 17 as well as in Tables 1 and 2. Important points to be noted are that the codes and definitions between the master sorter and the slave sorter not only signify the relationship between the first sorter 10 and the second sorter 20 as specified herein, but also can apply to the case where the number of sets to be connected is further increased. For example, assuming that a third sorter is used, it is sufficient to regard the third sorter as "slave sorter" and the second sorter as "master sorter".

As previously described, one of the features of the copy production device in accordance with the present invention is that the control unit 100 of the same circuit construction is provided to the master sorter 10, slave sorter 20 and subslave sorter 30, respectively, and the sorter control unit 100 has one CPU. As later described in detail, only the master sorter uses an exlusive program, but the slave and subslave sorters use the same program. Since the slave sorter and the subslave sorter are automatically discriminated in accordance with each program assigned thereto, they may be installed in a cascade fashion.

Each of the sorters such as master sorter, slave sorter and subslave sorter must be indentified due to the following reasons. First, it is necessary to known the position of the deflection device. For this purpose, the deflection counter performs counting from the first bin in the first sorter 10 to judge the position of the deflection device. At this juncture, if the total number of bins in one sorter is 20, the first bin in the second sorter 20 corresponds to a 21st bin, and then the first bin in the third sorter 30 corresponds to a 41st bin. Accordingly, the second sorter starts counting with "21" and then "22", "23", "24" . . . in this order. In the case of the third sorter, counting must be made from "41". Secondly, when the second or third sorter is used, a length of delivery route from the copier to the sorter employed is different, so that it is required to change the time interval required to bring the motor to a stop.

FIG. 21 shows a flow chart for programably identifying the status or rank of each sorter. However, all the sorters except the master sorter are regarded as slave sorters.

First of all, all the ports in the slave sorters are set to initial conditions at 10.1. In the next step, the codes connecting the slave sorter to the master sorter are outputted at 10.2. With this signal, the master sorter sets the recognition flags in the second, third and fourth sorters to "$\phi$", which provides signals to slave sorters (10.3). At 10.4, the data in the master sorter are inputted. Then, the status or rank of data code is checked at 10.5 and 10.9.

Since no data input from the master sorter is still present in the first cycle, the second sorter flags in every slave sorter are set at 10.13 and the third sorter code is outputted to the slave sorter (10.14). Next, the code signifying that only one slave sorter is connected will be outputted to the master sorter at 10.15, and then the data of the master sorter is inputted at 10.16. The flow return to ① since the master sorter will not generate a start signal until the slave sorter is ready. In the next step, the data of the master sorter is inputted at 10.4. Since the third sorter code has been already outputted at the step 10.14, if the third sorter and the fourth sorter are connected, the third sorter flag will be first set to "1" at 10.6. The fourth sorter code is outputted to the slave sorter at 10.7. This is a code signifying that the sorter is a fourth sorter. Subsequently, the code signifying that two slave sorters are used will be provided to the master sorter at 10.8. The flow will return to ① if the data from the master sorter is not START code (10.17). Since the fourth sorter code has been already outputted, the fourth sorter flag is set at 10.10, and the fifth sorter code is outputted to the master sorter side at 10.11. The data signifying that three slave sorters are in use will be provided to the master sorter at 10.12. The flow circulates the aforesaid routine until the start signal is supplied from the master sorter to instruct the status or rank of the sorter used, and to check the number of sets connected. The slave sorter starts to operate and enters into a main routine when the START code is provided to the slave sorter from the master sorter at 10.18.

Figure 22:
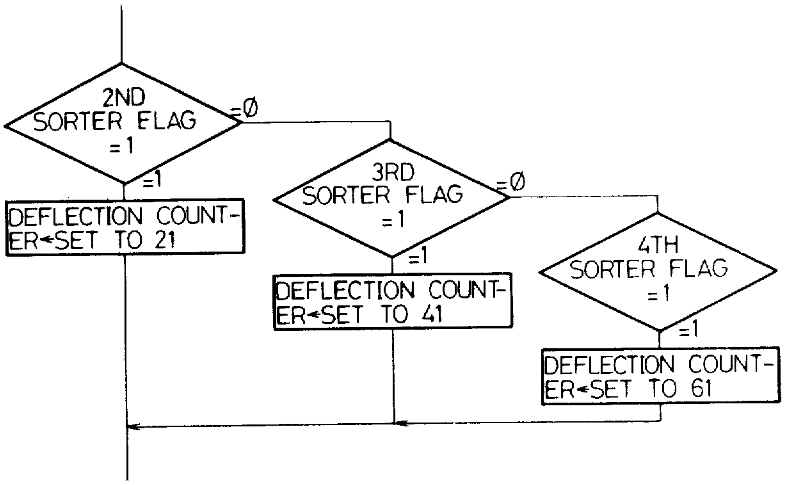
FIG. 22 shows a routine for setting a deflection counter.

Referring now to FIG. 22, there is illustrated a routine in that the set values can be varied depending on the sorter numbers to which the deflection device belong, when the power source is connected or when the deflection device is returned to the first bin.

Figure 23:
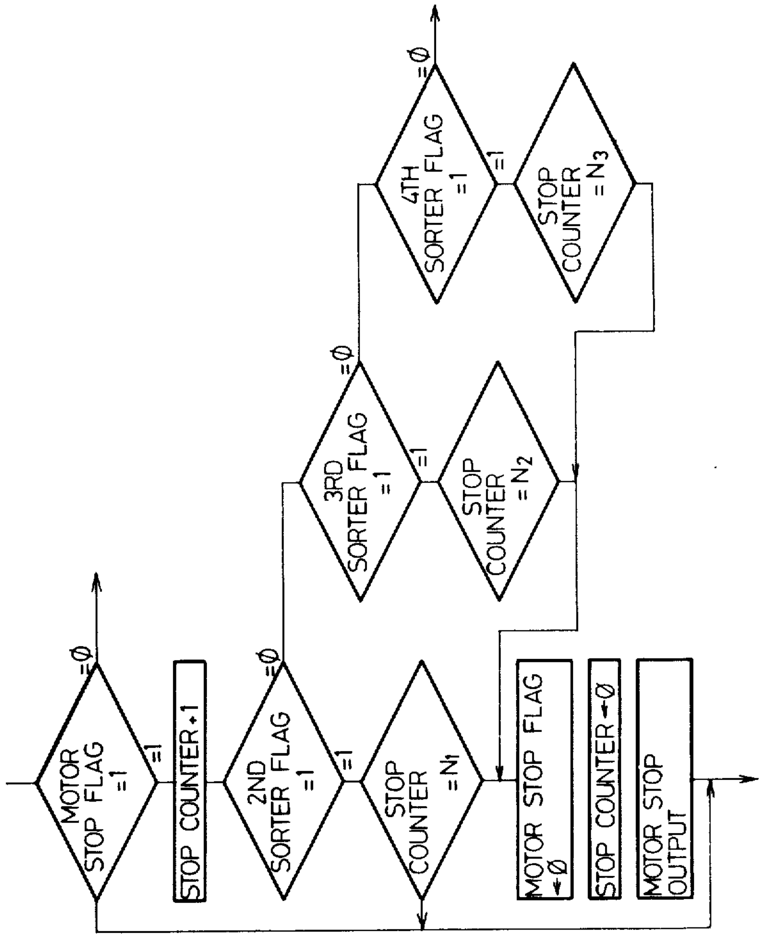
FIG. 23 shows a routine for stopping a motor.

Referring to FIG. 23, there is illustrated a routine wherein a stop interval of the motor can be varied depending on a length of the delivery route or the conditon to which the rank of the sorter belongs.

The master sorter provides the start signal to the slave sorter after finishing the required preparatory operation. In this case, the provision of the start signal from the master sorter to the slave sorter is timed with the operation of a timer to wait for preparation in the slave sorter.

As described above, since all the sorters except the first sorter use the same program and the rank of the third sorter is judged by signals from the second sorter and the rank of the fourth sorter is judged by signals from the third sorter, the respective sorters after the second sorter are exchangeable with each other. As the result, it is not necessary to distinguish a slave sorter from a subslave sorter when such sorters are installed. Sorters equipped with no proof tray 27 are optionally replaceable, so that they are suited to the establishment of more sorters or mass production.

The copy machine in accordance with the present invention will be hereinafter explained in more detail. Assume that the number of sets to be connected is three, namely, master, slave and subslave sorters, the total number of bins per set is 20, and the maximum accommodation number per pin is 100. Thus, in the sort mode operation, one set of sorters will become inoperative for sorting when the deflection device moves up and down one hundred times. On the other hand, in the case of the collate mode, the number of sheets to be inserted into a bin at a time is limited to 25 (n=25), for the purpose of taking the so called "recovery time" required to allow any sheets which have been curled and accommodated in the bin to return to their flattened state.

In this paragraph, several subroutines used in the main routine of FIG. 26 will be explained briefly.

SUBROUTINE "100"~"122"

In FIGS. 24*a* and 24*b*, SUBROUTINE "100" is a routine wherein the codes from PORT 10 are imparted to PORTs 4 and 5 in each for four bits and inputted into an accumulator. "101" is a routine to read codes from the port of a slave sorter, and the control of sign is utilized for compliment processing.

"102" is a routine with which the data is provided to the slave sorter. At 0.5, the state of whether or not any slave sorter is connected will be checked. At 0.6, the state of whether or not the READ signal from the slave sorter is present will be checked. At 0.7, the condition of whether or not the register R3 is "1" will be checked. Code outputs are imparted to PORTs 6 and 7.

"103", "104" and "105" are subroutines with which the deflection device is moved upward. When the deflection device is ascended, the manual insert inhibit timer is increased by 1 (+1), and the deflection counter set flag is set. "106" is a routine with which the deflection device is descended. When the deflection device is descended completely, the deflection counter is increased by 1 (+1). "107" is a motor stop routine, and "108" is a motor start routine.

Figure 24:
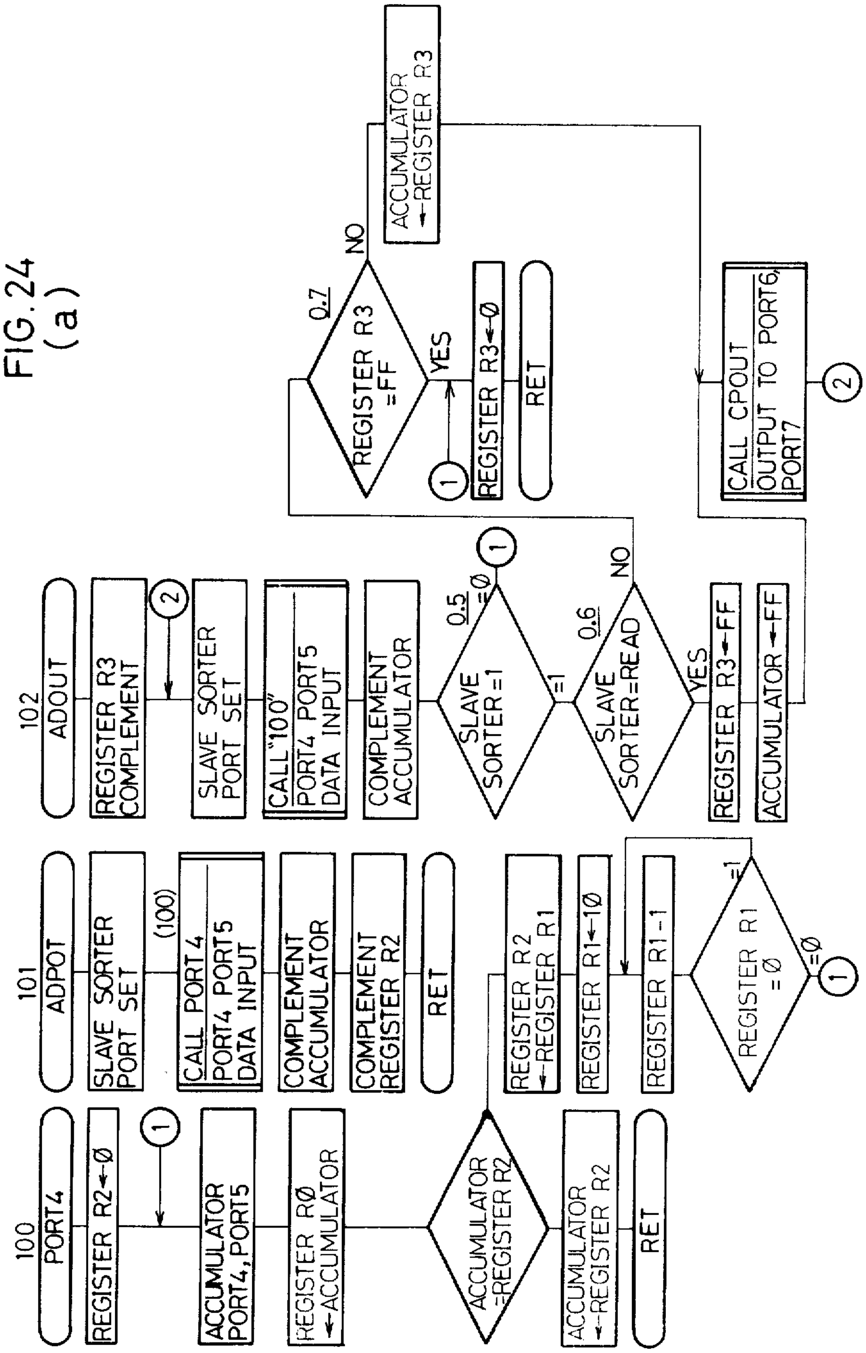
FIGS. 24(*a*) to 24(*e*) and FIGS. 25(*a*) to 25(*e*) show subroutines used in a main routine.
Figure 24:
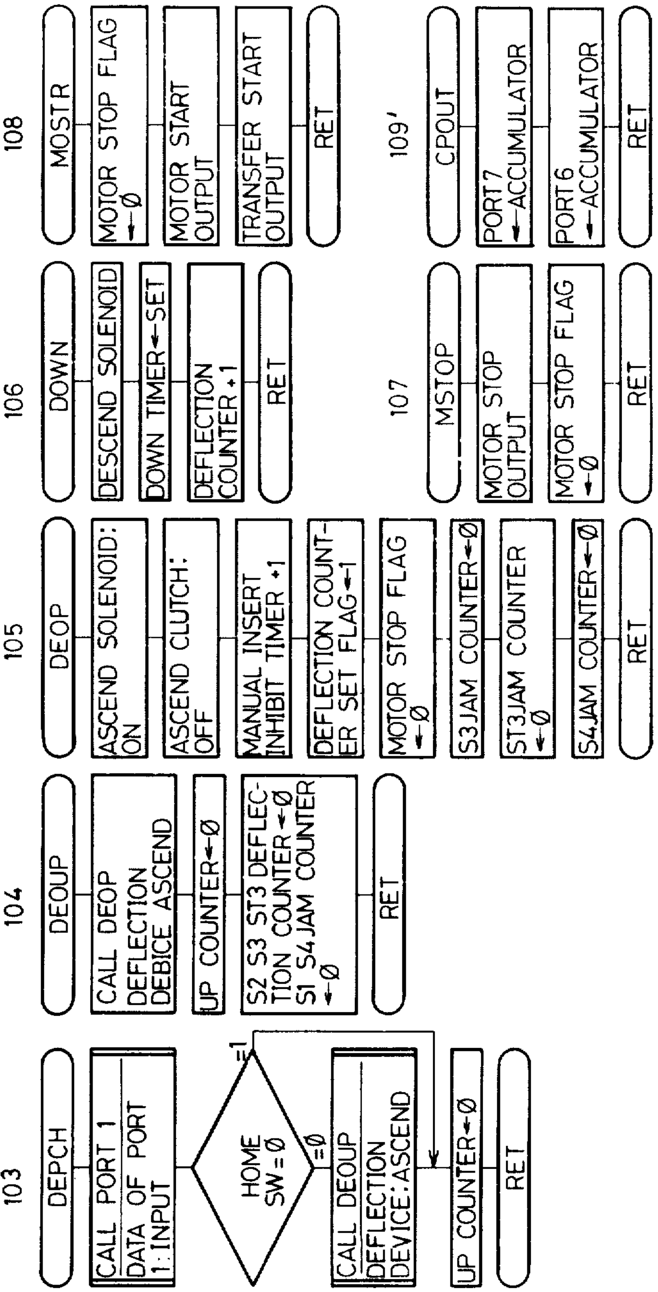
Figure 24:
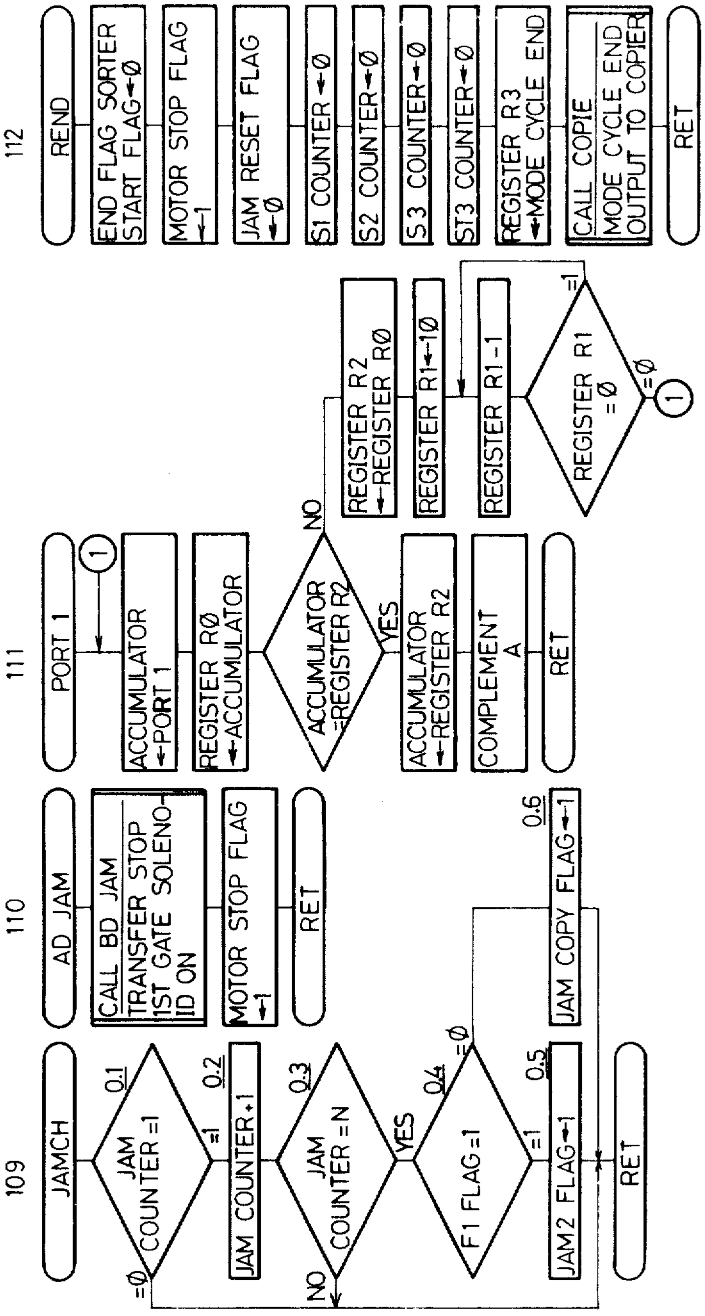
Figure 24:
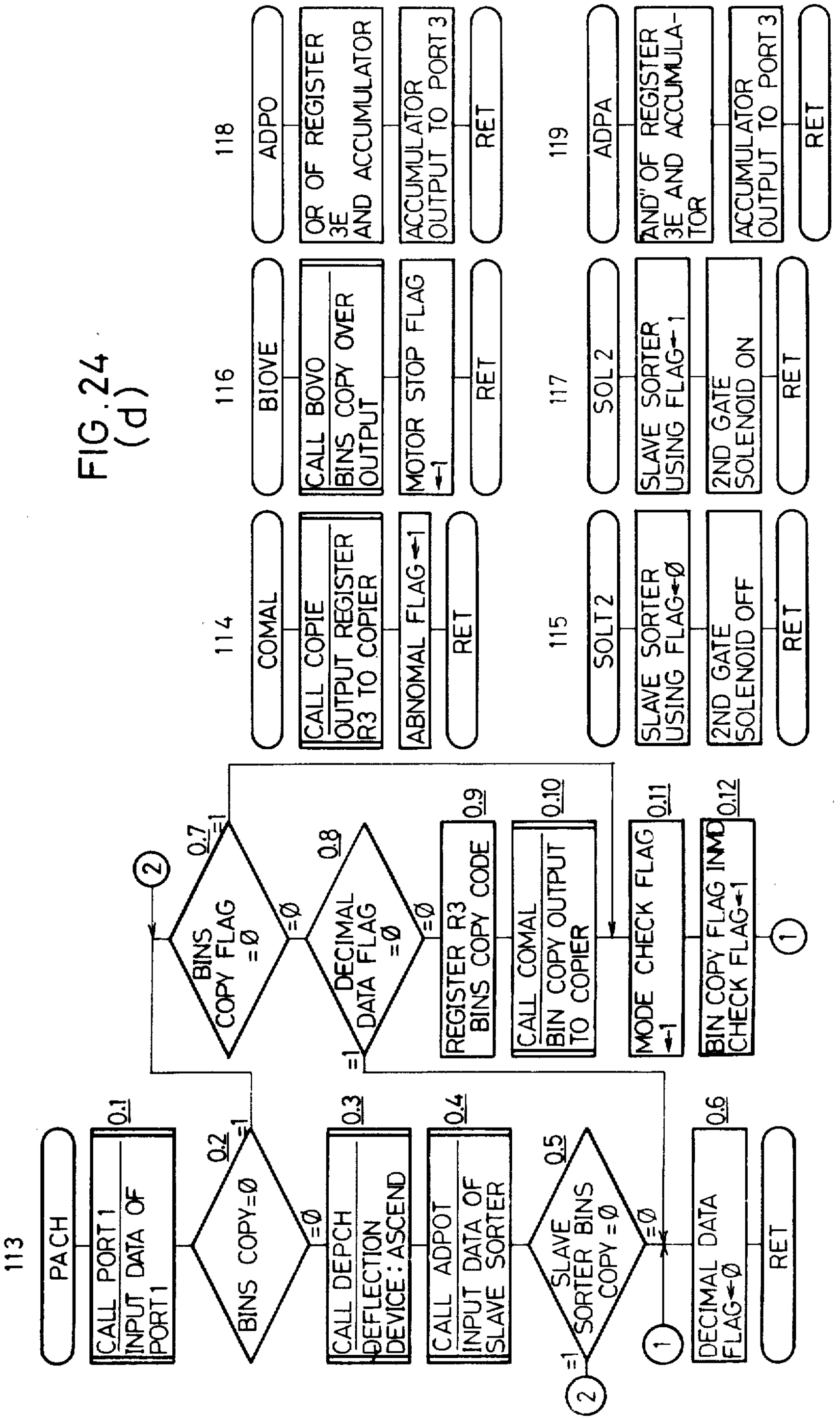
Figure 24:
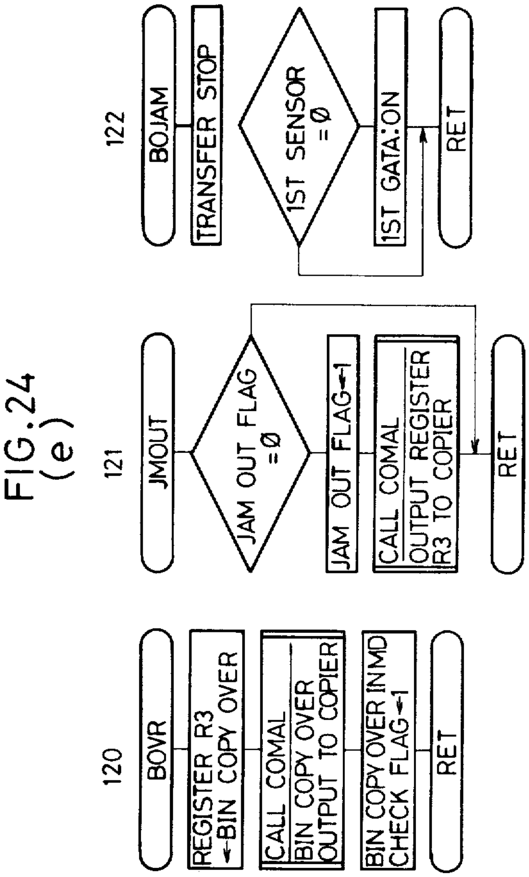

SUBROUTINE "109" in FIG. 24(*c*) is a routine for checking the contents of the jam counter. As the first step, whether or not the jam counter is "1" will be checked. If "100 ", the flow will go to RET (0.1). If "1", the jam counter is increased by 1 (0.2). At 0.3, whether or not the jam counter is "N" will be checked. If NO, the flow goes to RET. If YES, and F1 flag is "1" as the result of checking the contents thereof, JAM 2 flag is set to "1" at 0.5. In the case of "$\phi$", JAM copy flag is set to "1" at 0.6.

"110" is a routine with which a sheet in the copier is entered into the proof tray 27. "111" is a routine with which a data from PORT 1 is inputted, and "112" is a mode end processing routine wherein the mode cycle end signal is provided to the copier.

SUBROUTINE "113" in FIG. 24(*d*) is a routine for checking the presence of a sheet in a bin of the sorter. Firstly, a data is inputted from PORT 1 and then whether or not there is any sheet in the bin will be checked at 0.1 and 0.2. If a sheet is present, the flow goes to 0.7, and if a sheet is absent SUBROUTINE "103" is called to ascend the deflection device (0.3). At 0.4, the data of the slave sorter is inputted. At 0.5, whether or not there is any sheet in the bin of the slave sorter will be checked. If a sheet is present, the flow goes to ②, and if a sheet is absent the decimal data flag is set to "$\phi$" (0.6) and the flow goes to RET.

If any copy sheet is present in the bin, whether or not the bin copy flag is "$\phi$" will be checked (0.7). In the case of "1", the flow goes to 0.11, and in the case of "$\phi$" whether or not the decimal data flag is "$\phi$" will be checked (0.8). In the case of "1", the flow goes to 0.6, and in the case of "$\phi$", BIN COPY code is outputted to the copier at 0.9 and 0.10. The copier displays sorter confirmation.

In the next step, the mode check flag is set to "1" at 0.11. In this stage, the flow goes to ① after setting the bin copy flag and INMD check flag to "1" at 0.12. In short, when the entry or registration is made, the BIN COPY code is not provided even if there is a sheet in the bin. Contrary to this, if no entry is made, the BIN COPY code is outputted provided that there is a sheet in the master sorter or the slave sorter.

SUBROUTINE "114" in FIG. 24(*d*) is an abnormal signal output routine for the copier. "115" is a routine for generating a signal used to deenergize the second gate solenoid. "116" is a routine for providing BINS COPY OVER to the copier and setting the motor stop flag to "1". "117" is a routine for setting the slave sorter using flag to "1" and energizing the second gate solenoid. "118" is a routine for taking "OR" or logical sum of the register 3E and the accumulator. "119" is a routine for taking "AND" or logical product of the register 3E and the accumulator.

SUBROUTINE "120" in FIG. 24(*e*) is a routine for providing BIN COPY OVER to the copier and setting the bin copy over and INMD check flag to "1". "121" is a routine for providing the jamming signal to the copier. "122" is a routine for stopping the transfer operation and energizing the first gate solenoid.

Figure 25:
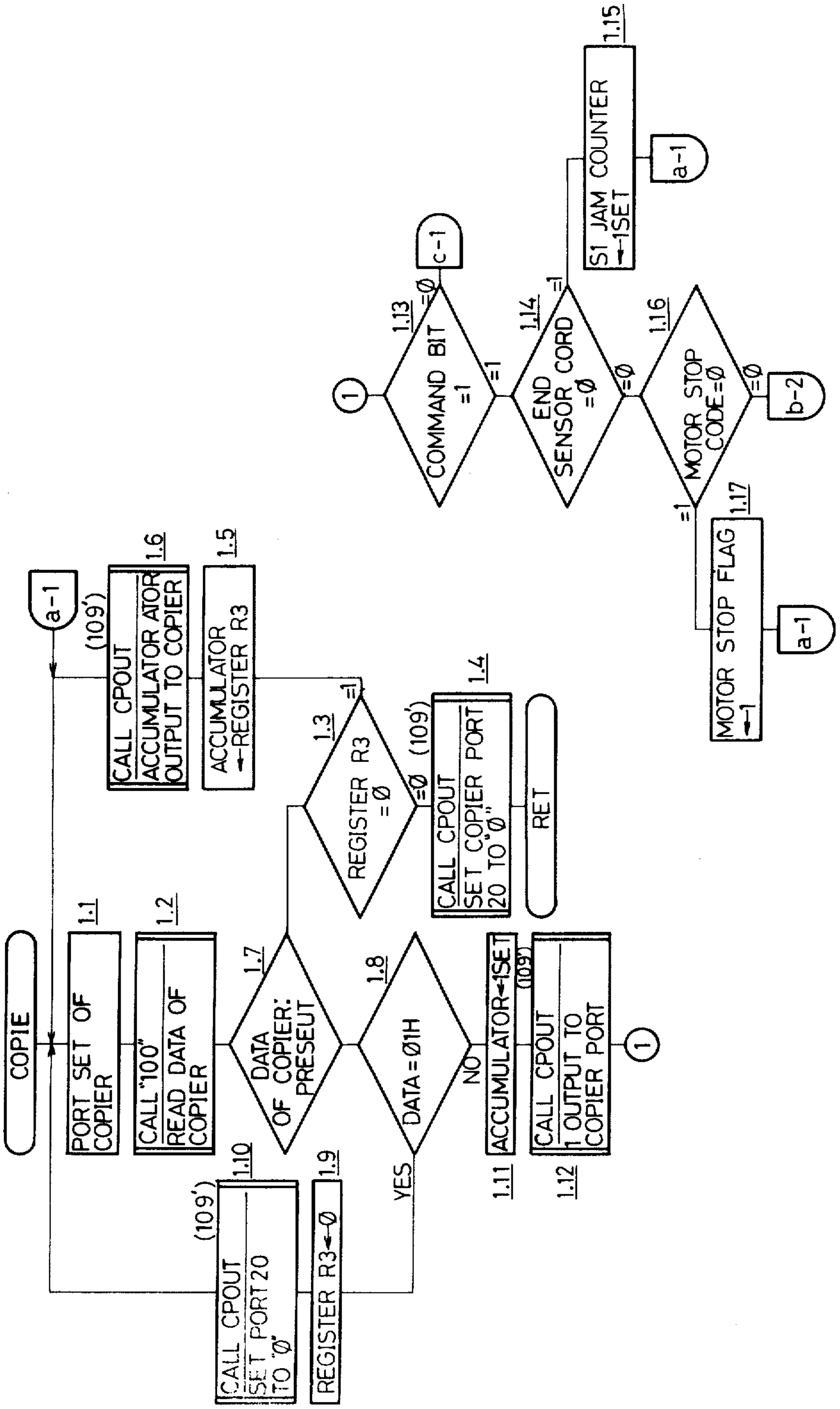
Figure 25:
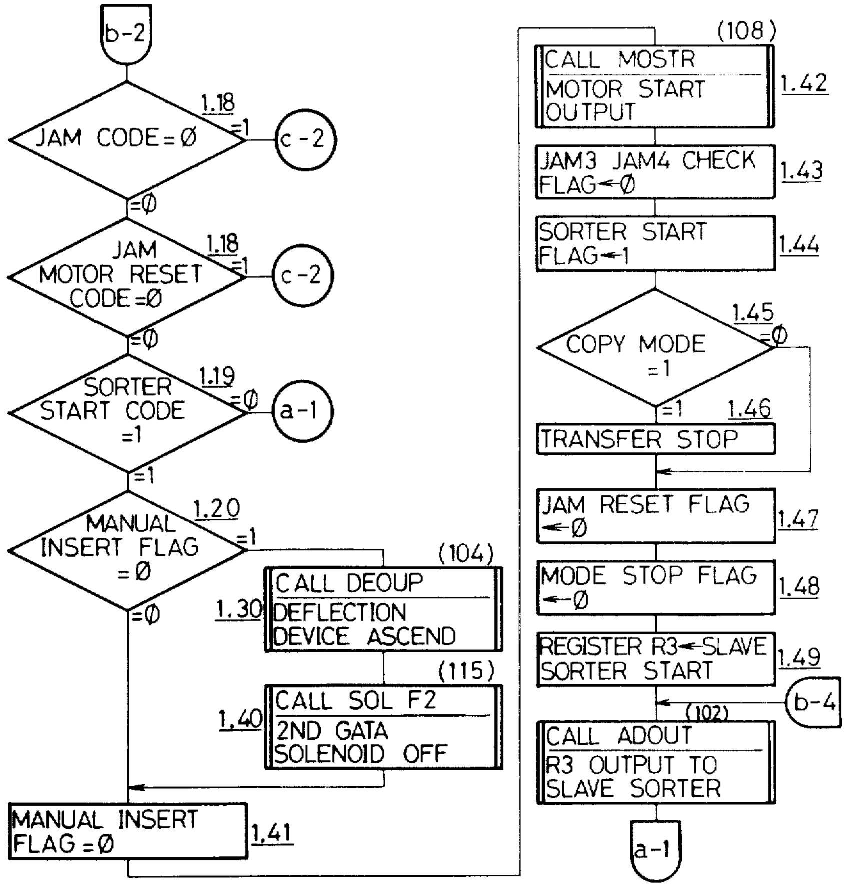
Figure 25:
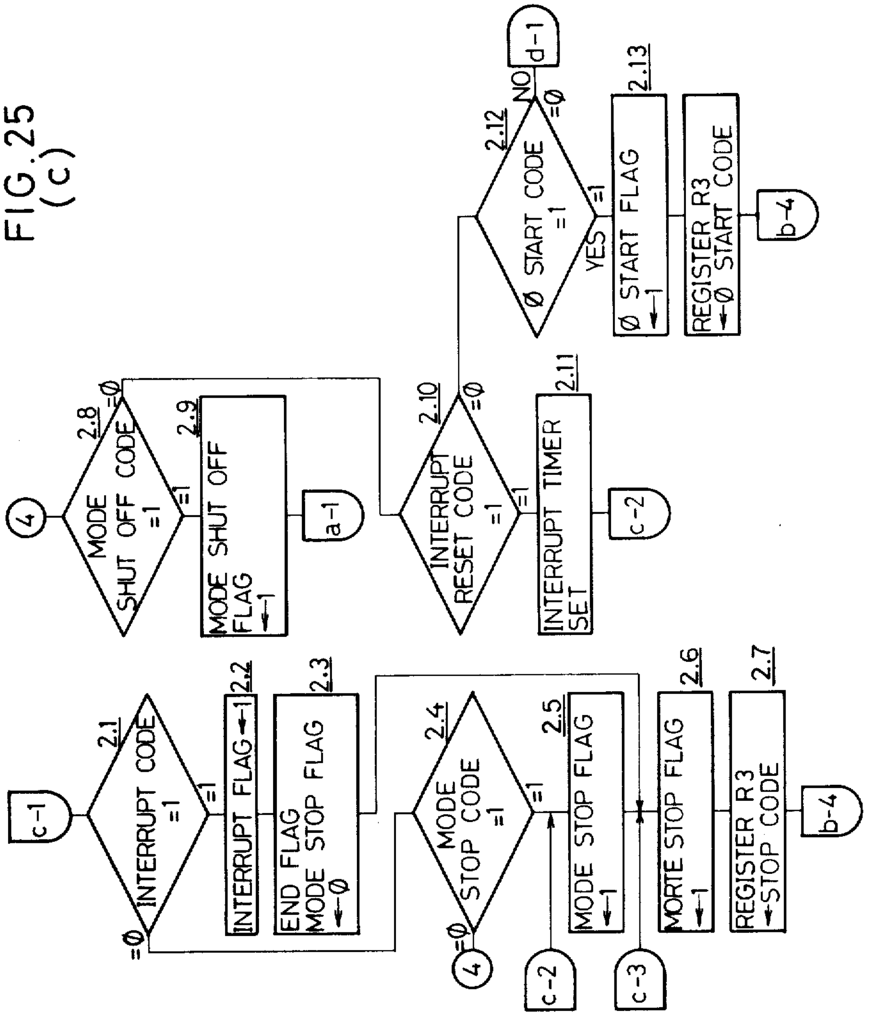
Figure 25:
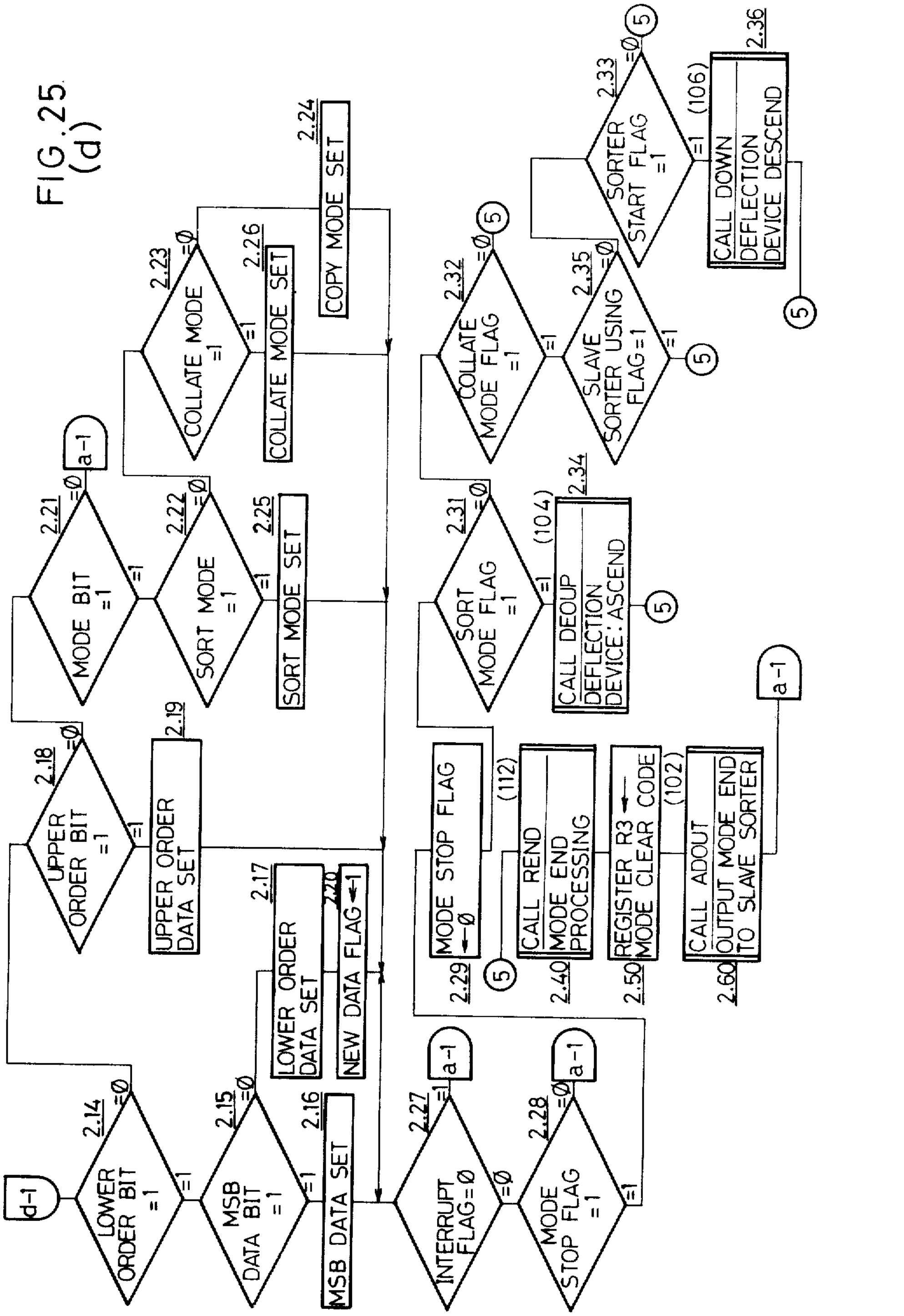

SUBROUTINE "COPIE" (FIGS. 25(*a*) ~25(*d*))

This subroutine is used for providing codes to the CPU in the copier and leading codes from the CPU in the copier. In the drawings, the symbol ▭ shows a node or relaying point to a flow diagram indicated in other drawings. In contrary to this, the circular symbol ○ shows a relaying point which jumps or goes to a flow illustrated in the same drawing.

In FIG. 25(*a*), the selection of device 102, used as input-output gate, for signals between the sorter and the copier, and the setting of PORTs 10 and 20 (In the drawing, the term "PORT of copier" corresponds to a combination of these two PORTs) with respect to the copier are performed at 1.1. Calling of SUBROUTINE "100" and reading of codes from PORT 10 in the copier will be made at 1.2.

In the next step, the judgement on whether or not the code is outputted from the copier will be made at 1.7. At 1.3, the CPU judges whether or not the register R3 is "φ" in the case where the code is not present (φφH). When R3≠φ, the code in the register R3 is transferred to the accumulator, SUBROUTINE "CPOUT" is called, and the contents of the accumulator are provided in four bits to PORT 20 in the copier through PORTs 6 and 7 (1.5, 1.6). If R3=φ, since there is no code to be outputted to the copier, SUBROUTINE "CPOUT" is called and PORT 20 outputted to the copier is set to "φ" at 1.4. After repeating the loop of 1.1 ~ 1.7, the flow goes to 1.8 to provide that the code is outputted from the copier.

The CPU performs the judgement on whether or not the code from the copier is READ (φ1H) at 1.8. When the code from the copier is READ, the register R3 to be outputted is set to "φ", the routine "CPOUT" is called, and the output PORT 20 at the sorter side is set to "φ" (1.9, 1.10). Thereafter, the flow returns to the step 1.1. If it is not READ code, the CPU in the sorter provides the READ (φ1H) code to PORT 20 (1.11, 1.12). In short, the data code from the copier is read at PORT 10 and confirmed.

After outputting READ signal, the CPU in the sorter enters into a routine for processing the codes from the copier.

First of all, the judgement on whether the command bit is 1 or not will be performed at 1.13. If it is not "1", the flow goes to c-1, whereas if it is "1", the judgement on whether END SENSOR code is present or not will be performed at 1.14. The END SENSOR (83H) code is an output of the final sensor **16*a* disposed in the sheet delivery route of the copier and is outputted at the time the rear end of the sheet is detected. In the case of the END SENSOR code, "1" is set to the S1 jam counter (a counter which cooperates with the sheet reception detector 21 as the first sensor) at 1.15. When the S1 jam counter is set, the transfer jam detection between the copier and the sorter is initiated. When it is not the END SENSOR code, the judgement on whether the MOTOR STOP (63H) code is present or not will be performed at 1.16. If YES, the motor stop flag is set to "1" (1.17), and the flow jumps to a-1. If it is not MOTOR STOP, the judgement on whether the JAM COPY (43H) code is present or not will be performed. In the case of YES, the flow proceeds to c-2 (1.18). If NO, the judgement on whether the SORTER START (φ3H) code is present or not will be performed at 1.19. If NO, the flow goes to a-1. In the case of the SORTER START code, whether or not the manual flag to be set at the time of other than the manual insert of jam recovery is "φ" will be judged at 1.20. If it is not "φ", the subroutine DEOUT which provides signals for ascending the deflection device to PORT 3 is called at 1.30. The up counter is increased by 1 (+1) within ROUTINE "104". In the next step, ROUTINE "115" of the subroutine SOLF 2 which provides signals for deenergizing the solenoid of the second gate 32 to PORT 3 is called at 1.40. At 1.41, the manual insert flag is set to "φ". The flow enters into the step 1.41 even when the manual insert flag is "φ" originally. Next, ROUTINE "108**" or the subroutine MOSTR for causing the motor to start is called 1.42. The sorter side initiates the driving of transfer systems.

As previously mentioned, in the case of the SORTER START code, if the copy start is designated after performing the manual insert for less than the set number at the time of the manual insert other than the jam by way of the steps 1.20 ~ 1.42, the sorter causes the deflection number to ascend, and the machine will enter into a sorting operation for the set number from the first bin of the master sorter.

In the next step, the jam check flags JAM3 and JAM 4 for detecting the jamming of sheet between the second sensor (or second gate sheet detector) 31 and the third sensor (or sheet detector) 69 are set to "φ" at 1.43. At 1.44, the sorter start flag is set to "1". This flag is used to cause the sorter to start, but the judgement on whether the copy mode is present or not will be performed at 1.45. In the case of copy mode, the transfer motion subsequent to the first gate 23 is ceased, that is, the electromagnetic clutch for the transfer belt is deenergized at 1.46. At 1.47, the jam reset flag to be set at the time of jam resetting is set to "φ". At 1.48, the mode stop flag to be set when the mode is interrupted halfway is set to "φ". At 1.49 and 1.50, SLAVE SORTER START is inputted into the register R3, ROUTINE "102" is called and the MOTOR START signal is provided to the slave sorter, and then the flow will jump to a-1.

In the case of other than the interruption, if the modification of mode or entry is encountered after breaking the mode execution halfway, the interrupted mode is assumed to be ended at that time, and the machine executes the operation for a new mode and data. This operation will be explained by reference to FIGS. 25(*b*) and 25(*d*).

In FIG. 25(*b*), with the interrupt key depressed, the copier stops the delivery of new sheets, and provides the INTERRUPT (71H) code to the sorter after confirming that the last sheet of the copier has been accommodated. Indication of the copier is turned to green.

In the case of the interrupt code, the CPU is placed under the condition capable of receiving the interrupt mode after setting the interrupt flag to "1", the end flag to "φ" and the mode stop flag to "φ" (2.1, 2.2 and 2.3), and then the flow will jump to [c-3].

When the interrupt code is not present, the judgement on whether the MODE STOP (D1H) code is present or not will be performed at 2.4. If the MODE STOP code is not present, the flow jumps to ④, whereas if present, the mode stop flag (it will be set if the mode stops during execution) is set to "1" at 2.4 and 2.5.

With the stop key depressed in the event that the copier outputs the MODE STOP code during the execution of copy cycle, the delivery of new sheets is ceased and signals are outputted after confirming that the last sheet of the copier has been accommodated into the sorter side. Accordingly, the copier becomes green indication at this point. The same applies to the case of interruption.

Then, the flow goes to [c-3] and the motor stop flag is set to "1" at 2.6. This flag is used to stop the transfer operation after doing it for a predetermined time interval. Next, the MOTOR STOP code is entered into the register R3 at 2.7, the flow jumps to [b-4] and the MOTOR STOP code is provided to the sorter at 1.50.

When it is judged at the step 2.4 that the MODE STOP code is not present, the flow proceeds to 2.8, and the judgement on whether the MODE SHUT OFF (B1H) code is present or not will be performed at 2.8. If the MODE SHUT OFF code is present, the mode shut off flag is set to "1" at 2.9, and the flow jumps to [a-1]. This signal is outputted by the copier after finishing a series of copying and then after a predetermined time has elapsed.

If the MODE SHUT code is not present, the judgement on whether the INTERRUPT RESET (F1H) code is present or not will be performed at 2.10. In the case of the INTERRUPT RESET code, "1" is set to the interrupt timer at 2.11, and then the flow will jump to [c-2]. The copier generates its output signals at the time when the number of sheets ejected at the sorter side becomes equal to the set number. When the INTERRUPT RESET code is not present, the judgement on whether the φ START code is present or not will be performed at 2.12. If YES, the φ start flag is set to "1" (2.13). In the next step, the φ START code is entered into the register R3 to provide the φ START code to the slave sorter, and then the flow will jump to [b-4].

When the φ START code is not present, the judgement on whether new data is present or not will be made at 2.14, 2.15 and 2.18. When new data is present, the new data is entered into the buffer data register at 2.16, 2.17 and 2.19, the new data flag is set to "1" at 2.20, and then the flow proceeds to a check routine of interrupt flag (2.27).

When no new data is present, the judgement on whether new mode is assigned or not will be made at 2.21. When new mode is provided, the flow jumps to [a-1]. If there is new mode, the kind thereof is judged at 2.22 and 2.23 and entered into the buffer mode register at 2.24~2.26, and then the flow proceeds to a check routine of interrupt flag (2.27).

In the next step 2.27, the judgement on whether or not the interrupt flag is "φ" will be performed. If NO, the flow jumps to [a-1]. If YES, the judgement on whether the mode stop flag representing that the mode has interrupted halfway is "1" or not will be performed at 2.28.

When this flag is "φ", the flow jumps to [a-1], while in the case of "1", the mode stop flag is set to "φ" at 2.29.

Next, the judgement on whether it is the sort mode or collate mode will be made at 2.31 and 2.32. When it is neither mode, the flow will go to step 2.40 as normal mode. At the step 2.40, ROUTINE "112" or the subroutine REND for the mode end processing is called. This means that the interrupted mode has been finished at this point. At 2.50 and 2.60, the MODE CLEAR (C3H) code is provided to the slave sorter due to the register R3 and SUBROUTINE "102". In the case of sort mode, SUBROUTINE "104" used for ascending the deflection device is called (2.34), and then the flow jumps to the step 2.40. In the case of collate mode, the judgement on whether or not the slave sorter using flag is "1" will be performed at 2.35. In the case of "1", the flow jumps to the step 2.40, while in the case of "φ" the judgement on whether or not the sorter start flag is "1" will be performed at 2.33. When the sorter is still at a standstill, the flow will jump to the step 2.40. If started, SUBROUTINE "106" or the subroutine DOWN for descending the deflection device is called at 2.36, and then the flow jumps to the step 2.40.

Figure 26:
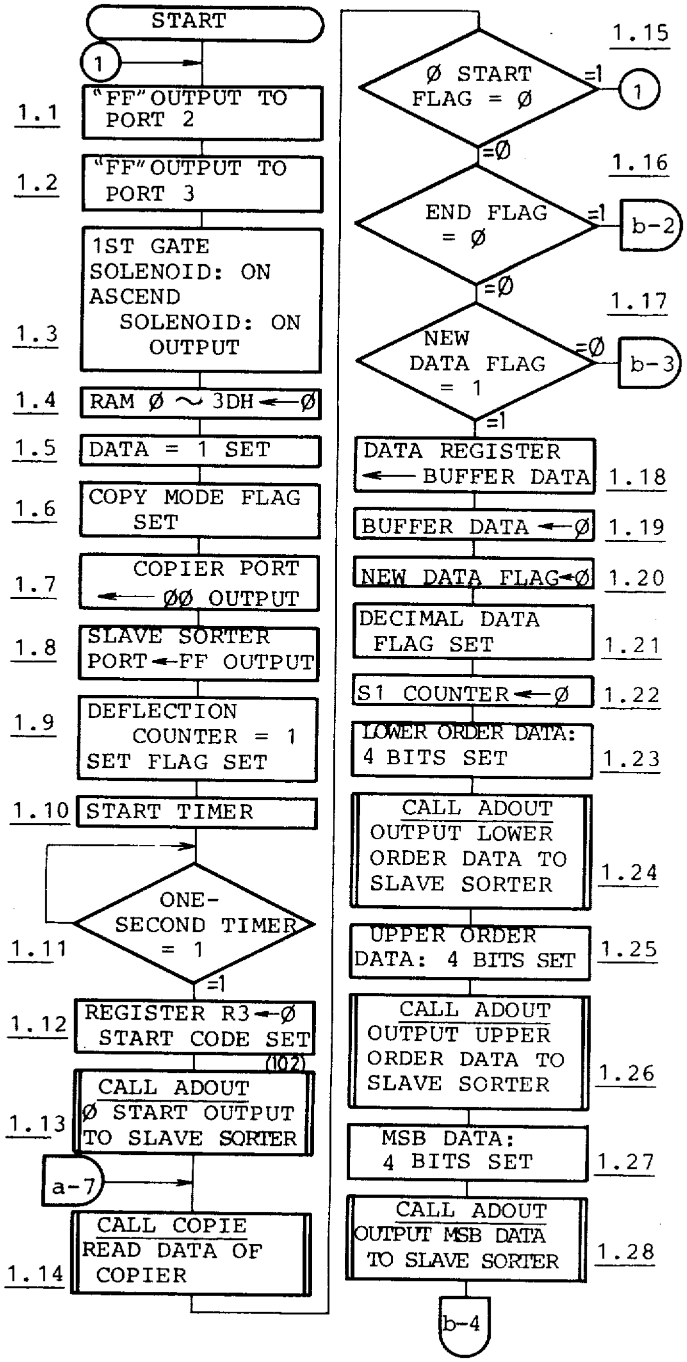
FIGS. 26(*a*) to 26(*o*) are flowcharts showing details of the main routine of the master sorter as shown in general form in FIG. 18(*a*) and FIG. 18(*b*)
Figure 26:
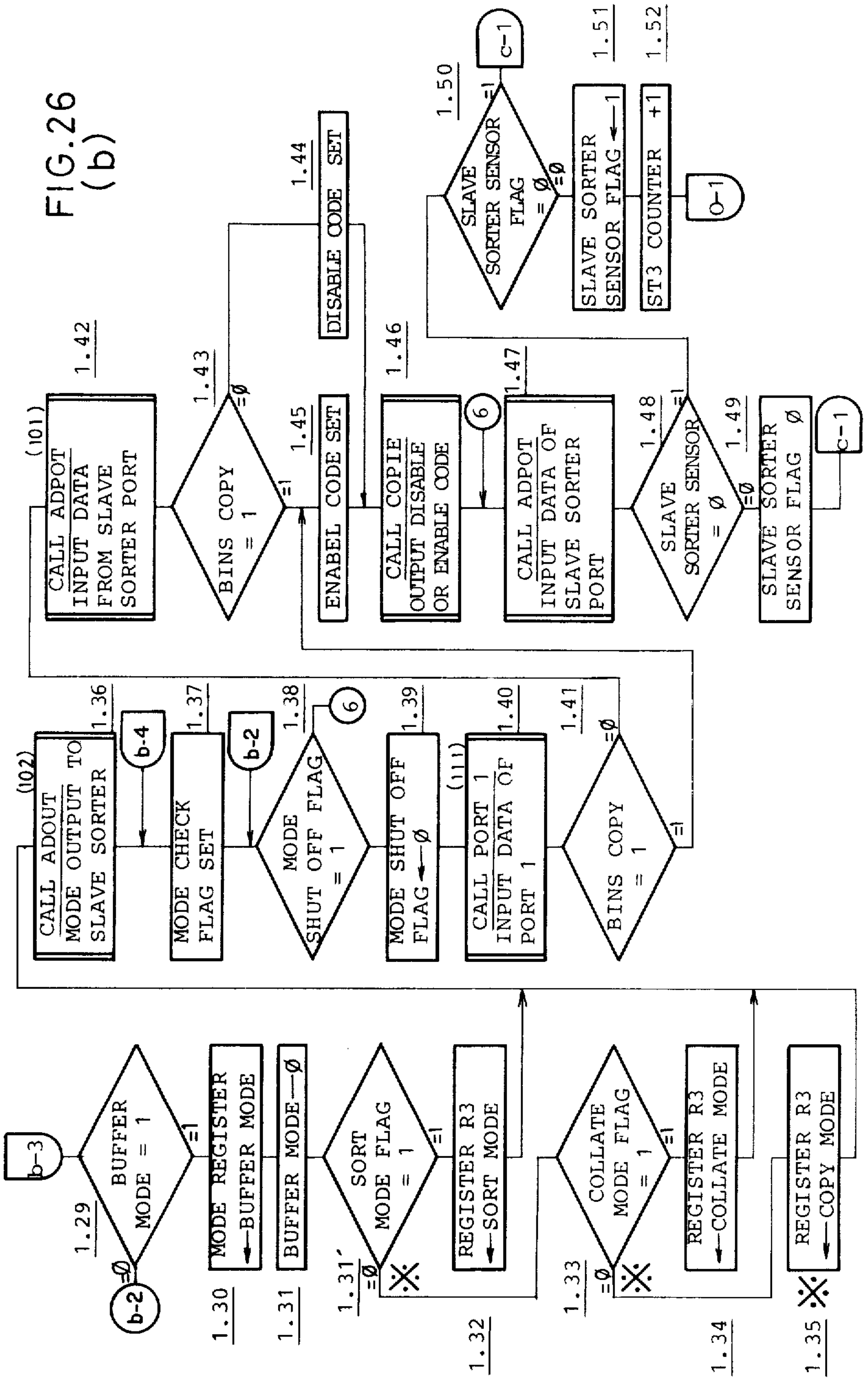
Figure 26:
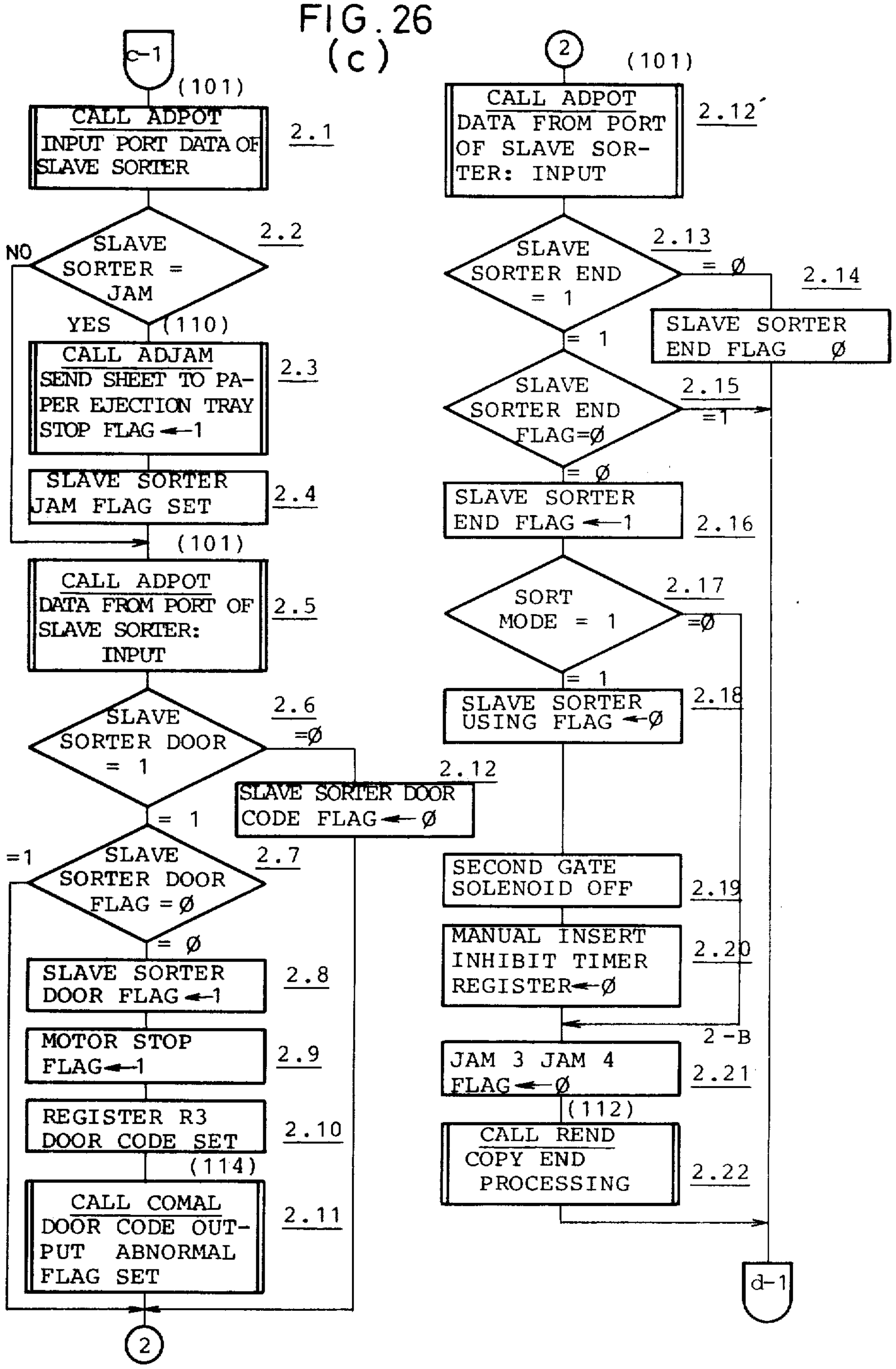
Figure 26:
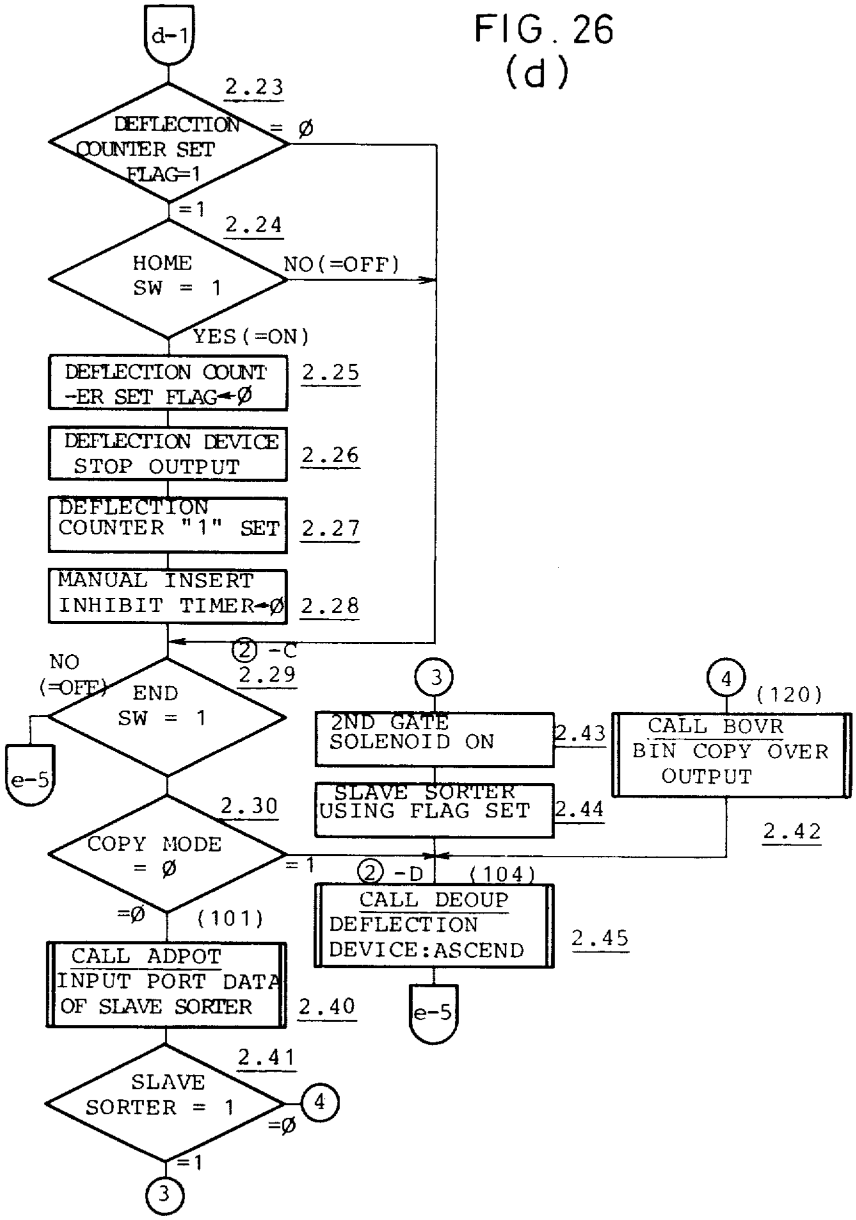
Figure 26:
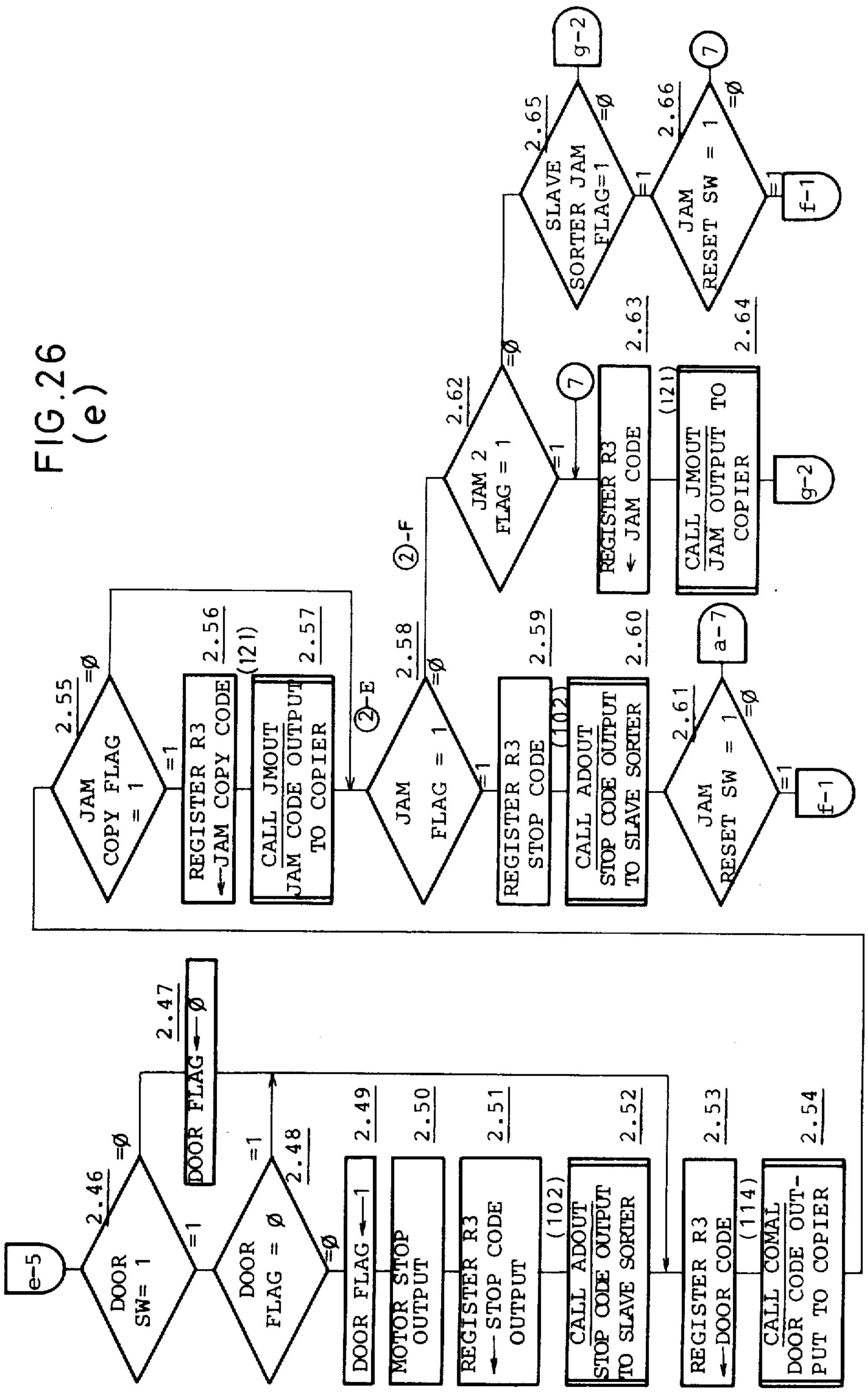
Figure 26:
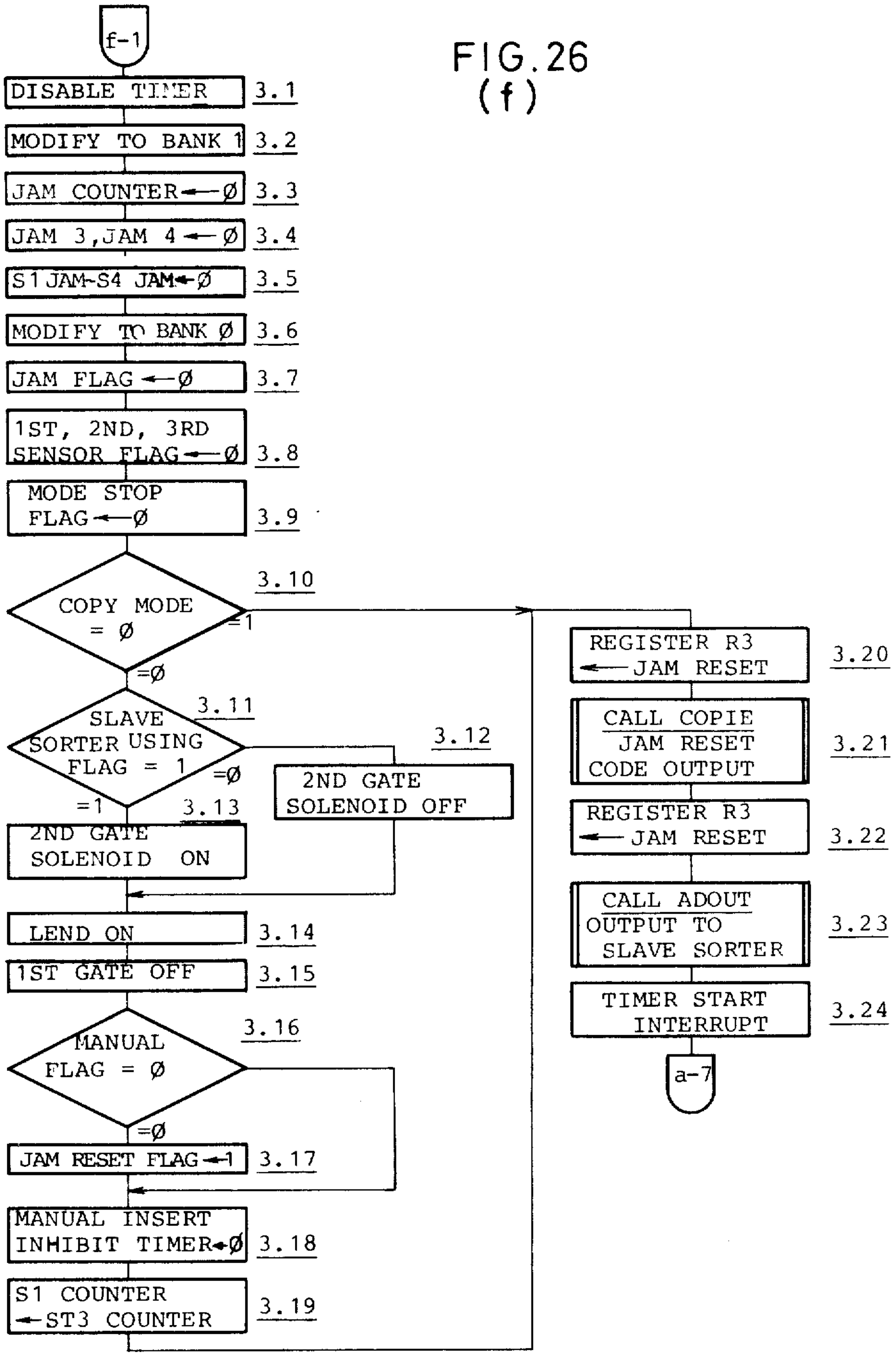
Figure 26:
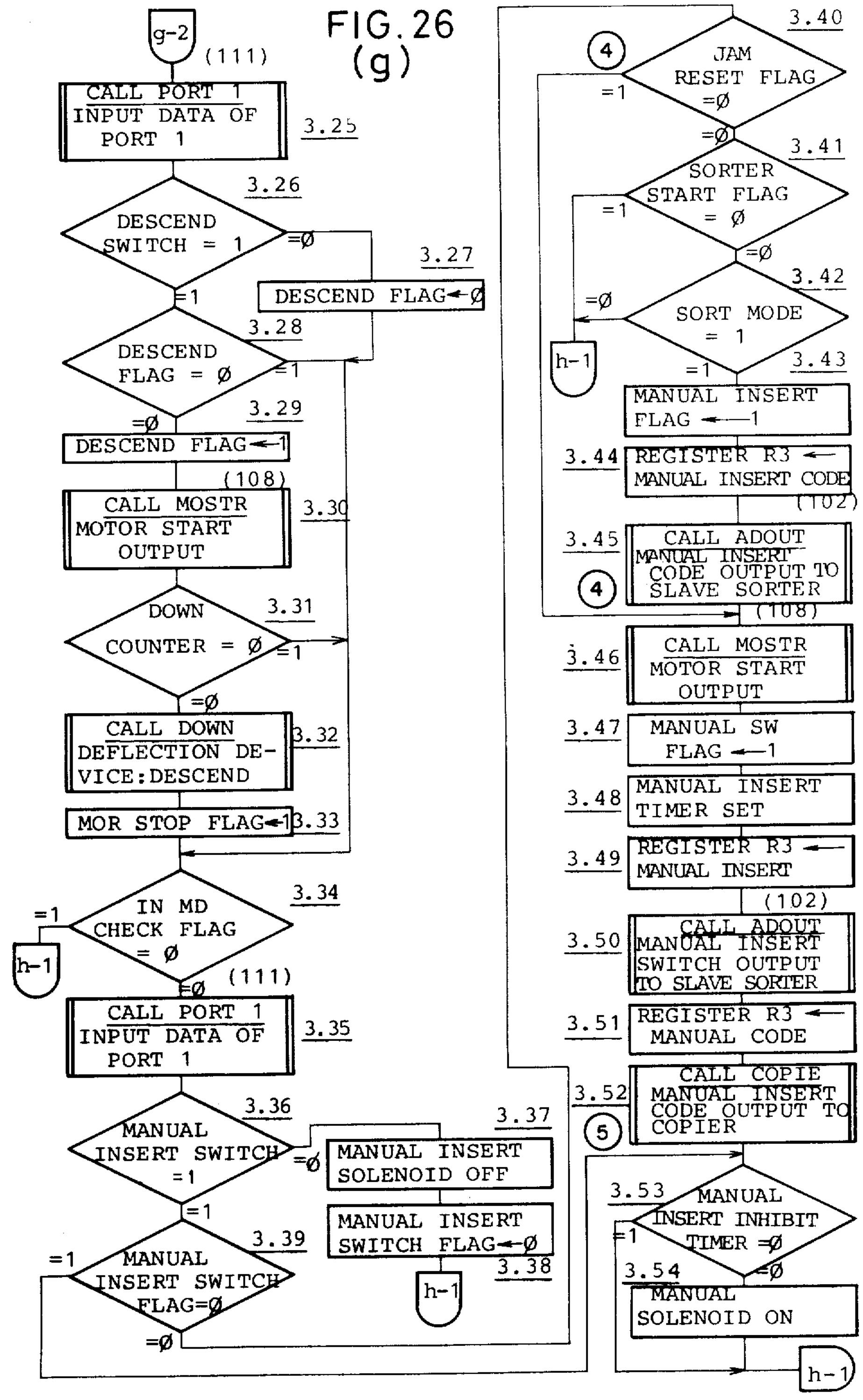
Figure 26:
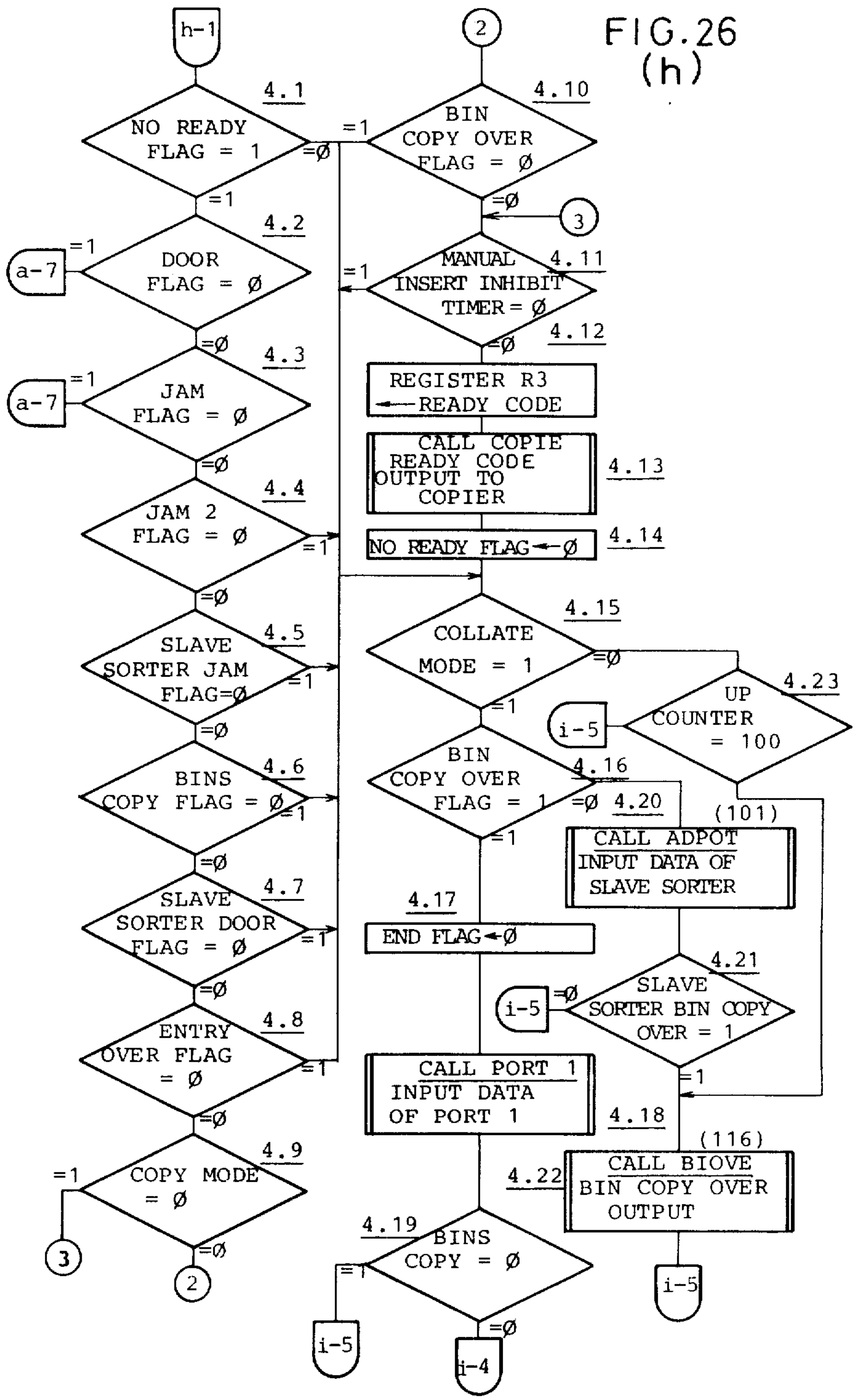
Figure 26:
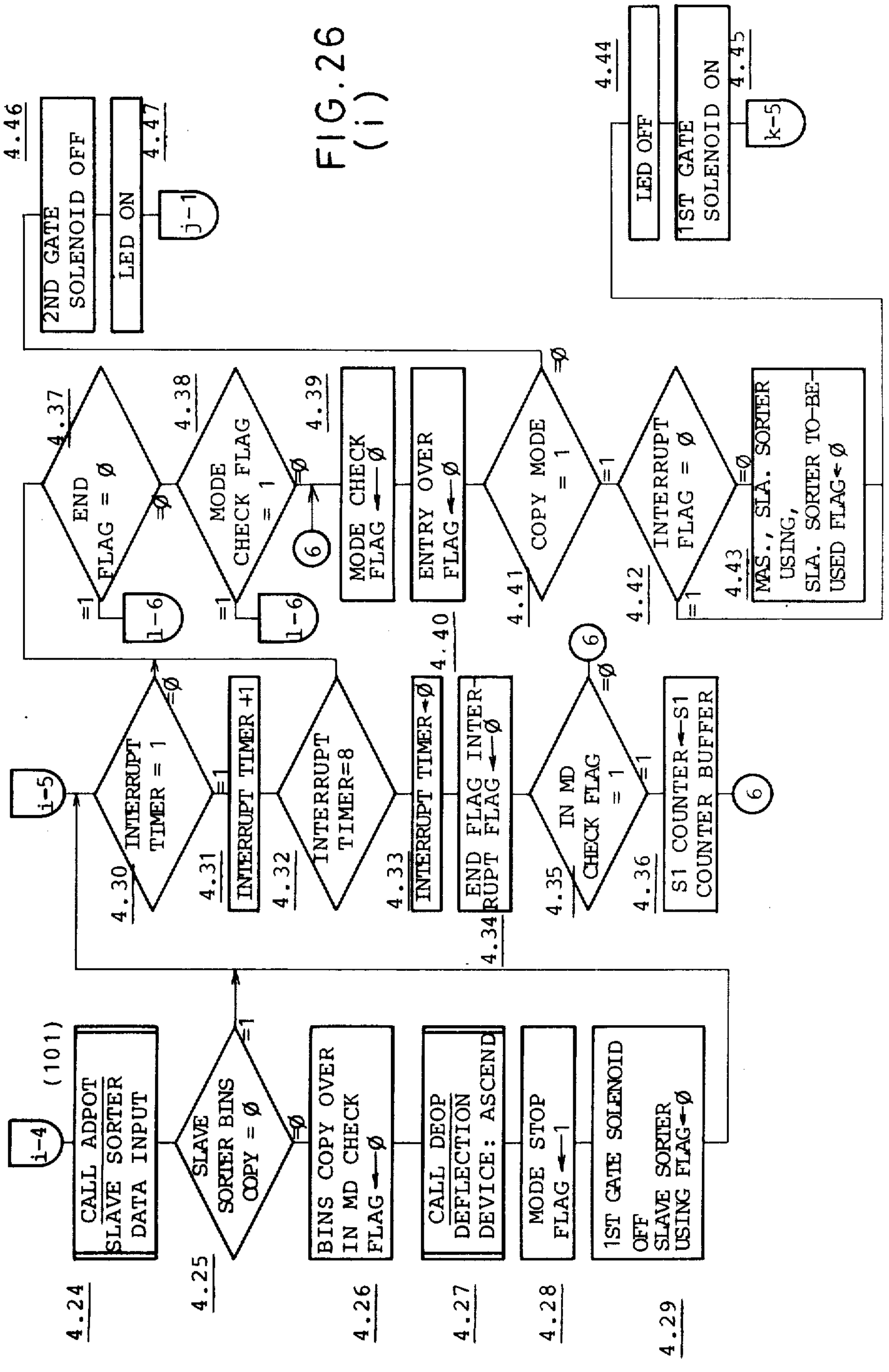
Figure 26:
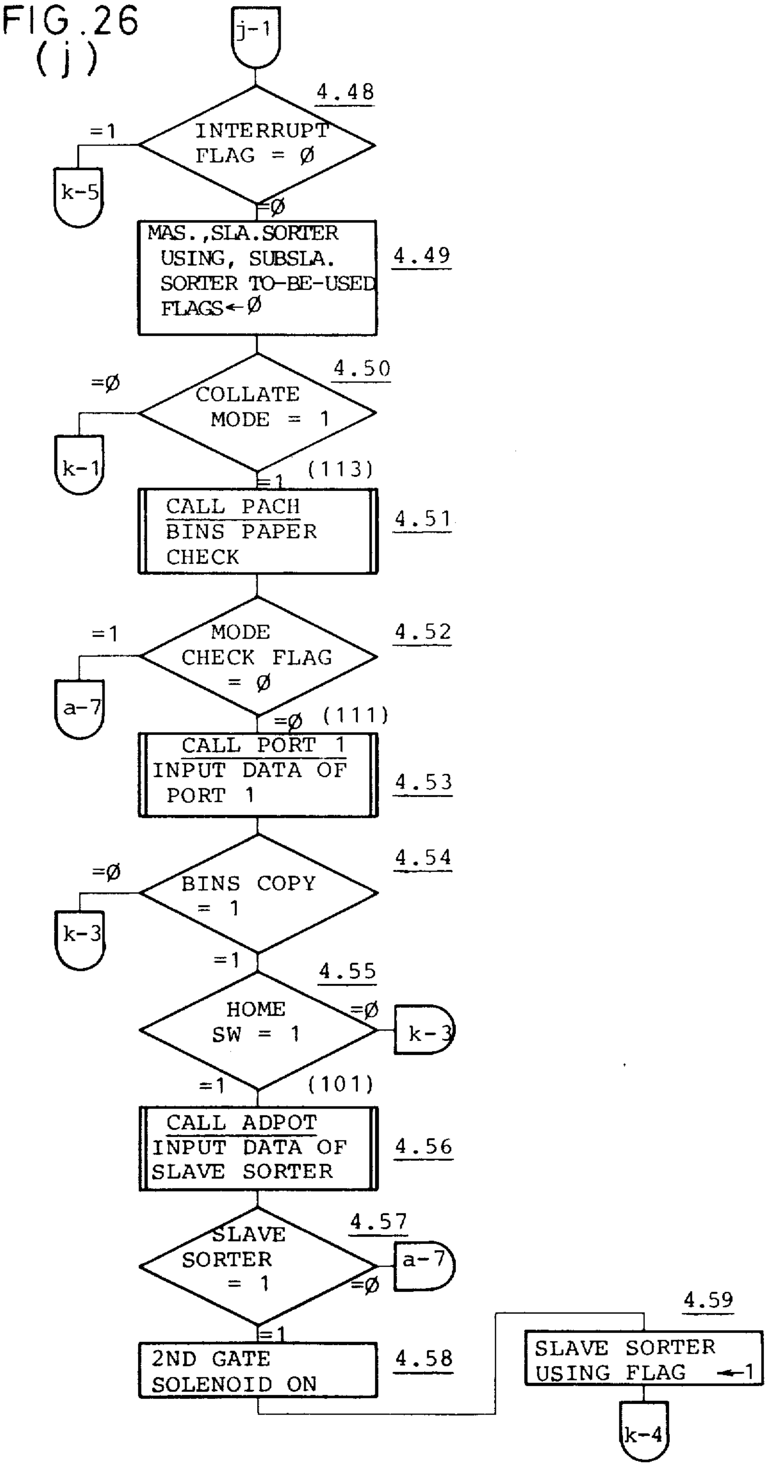
Figure 26:
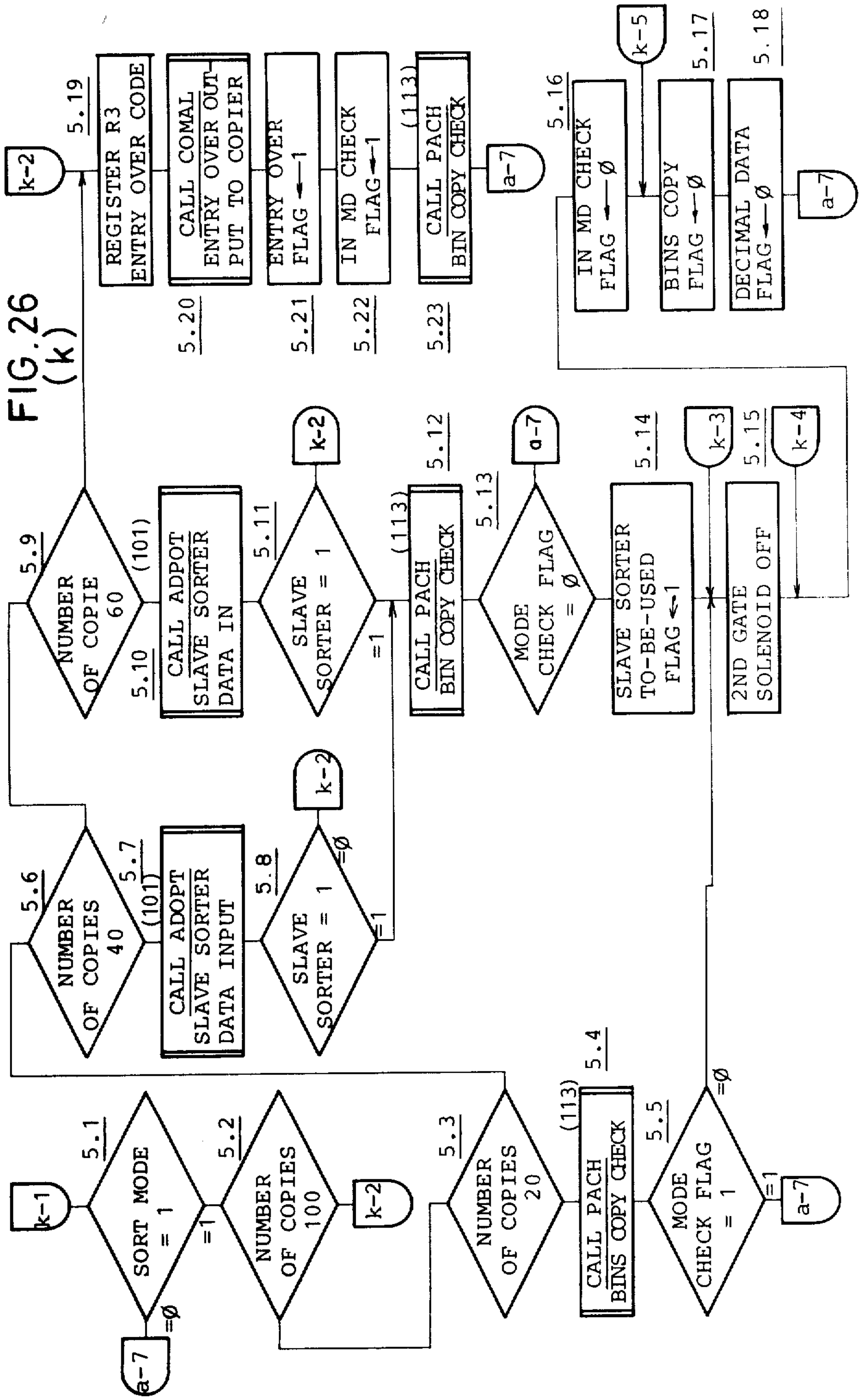
Figure 26:
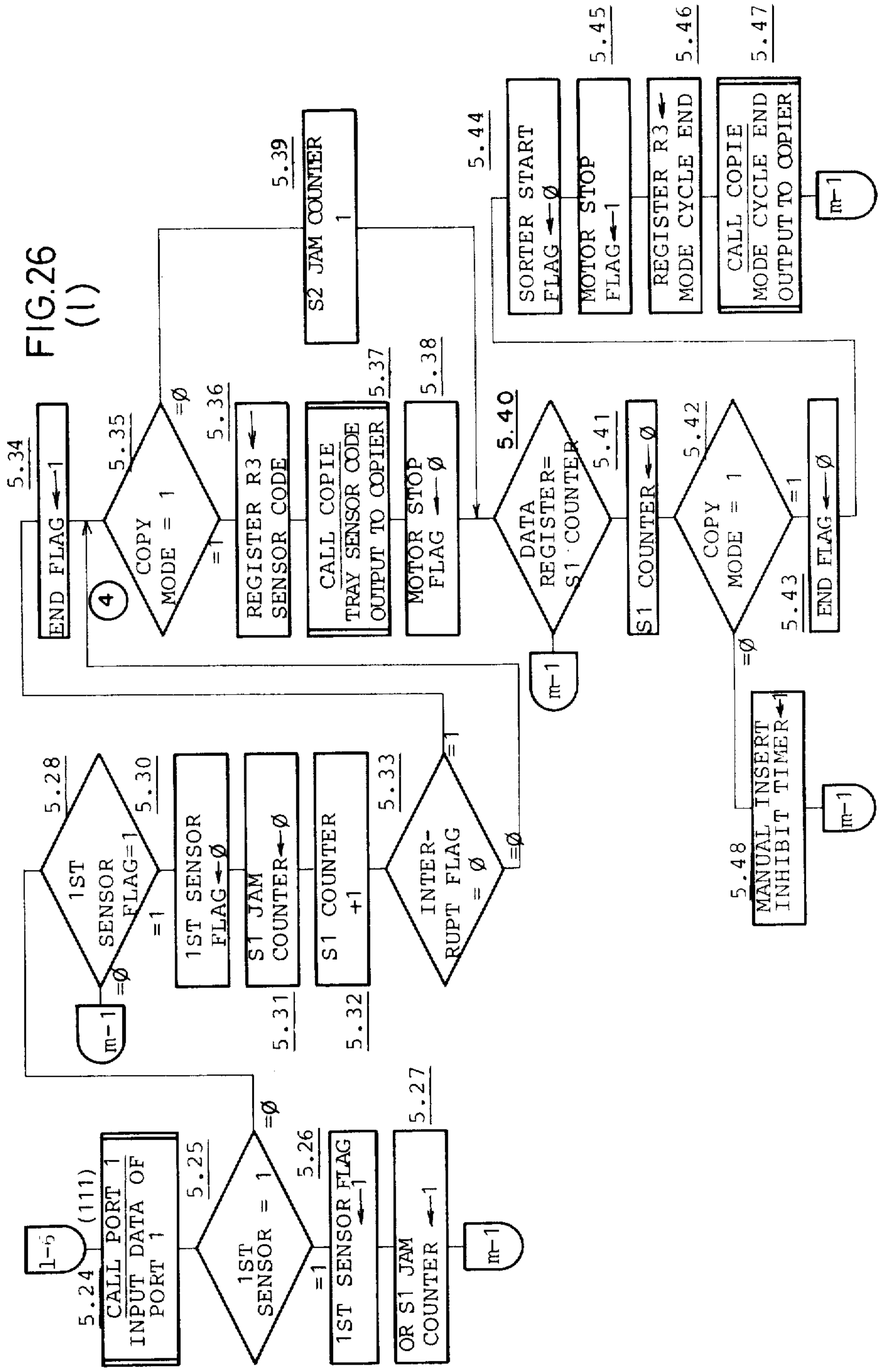
Figure 26:
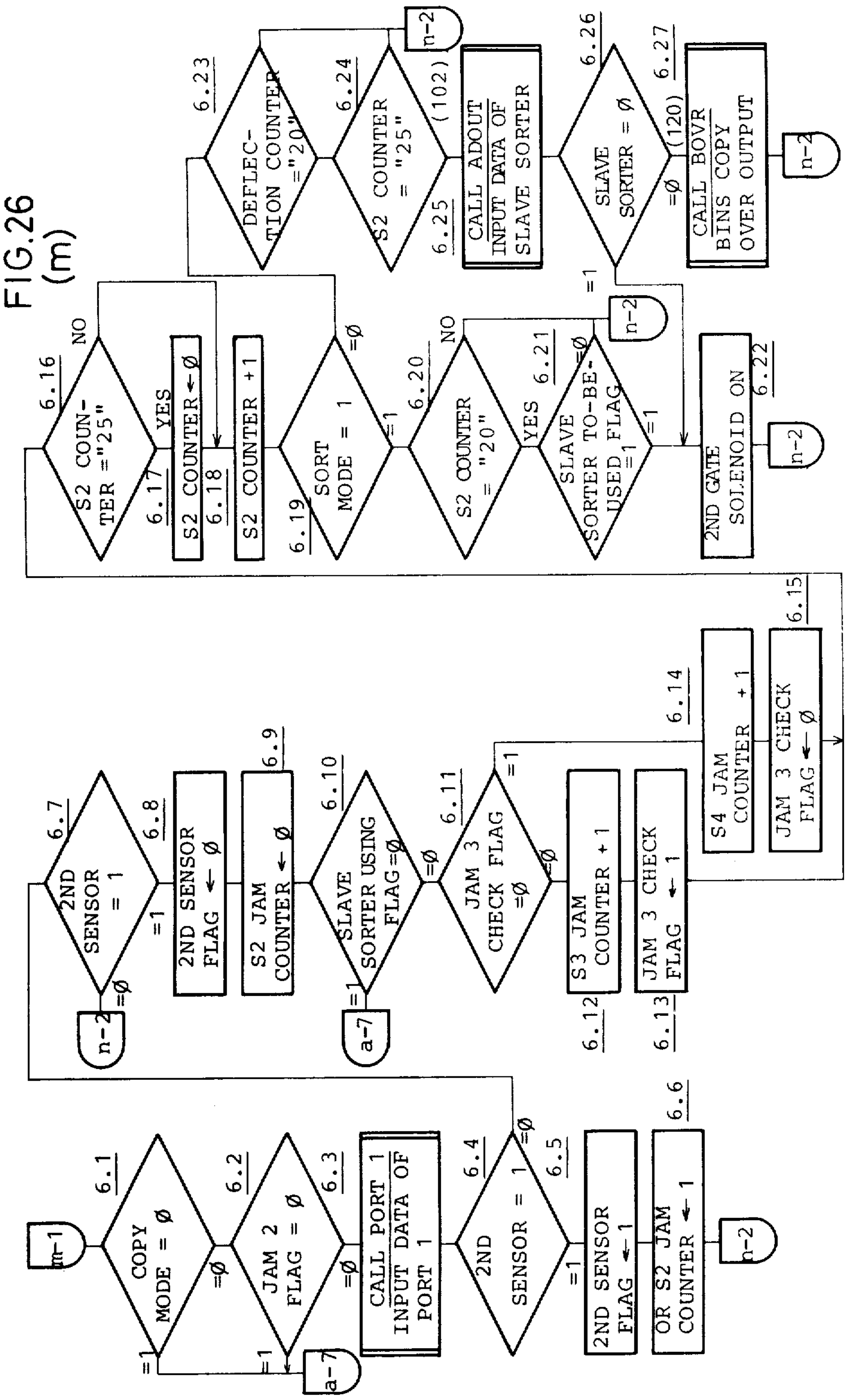
Figure 26:
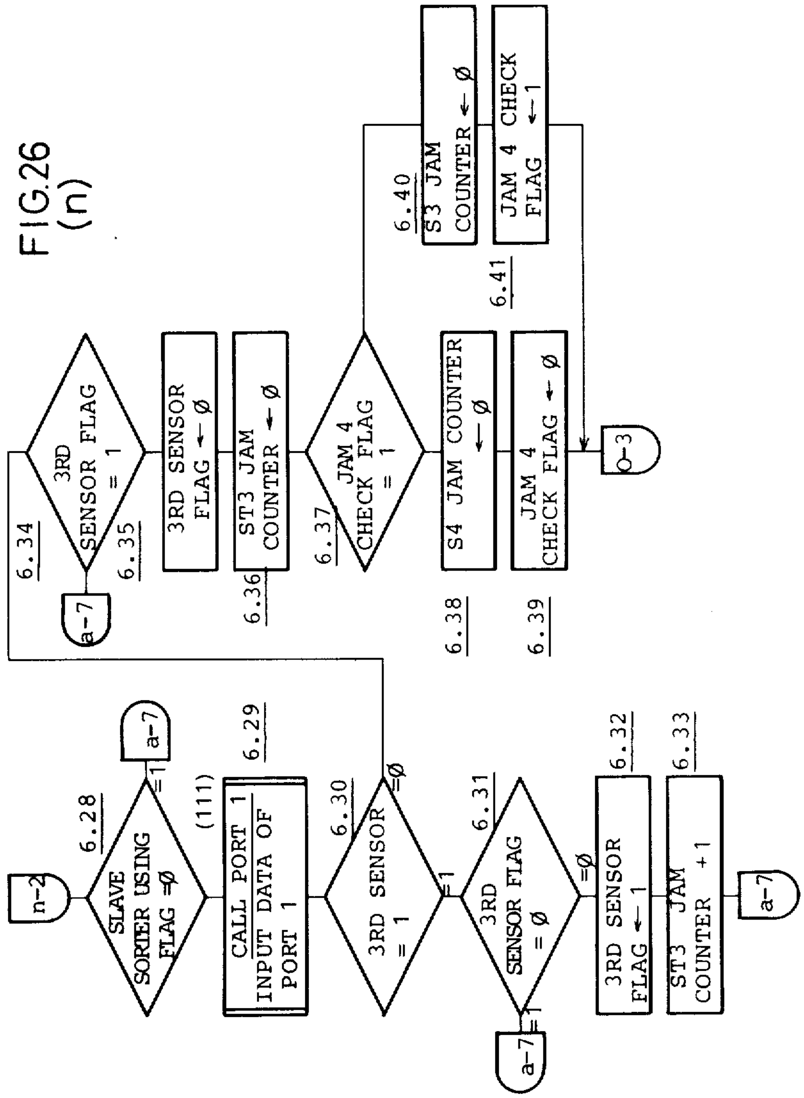
Figure 26:
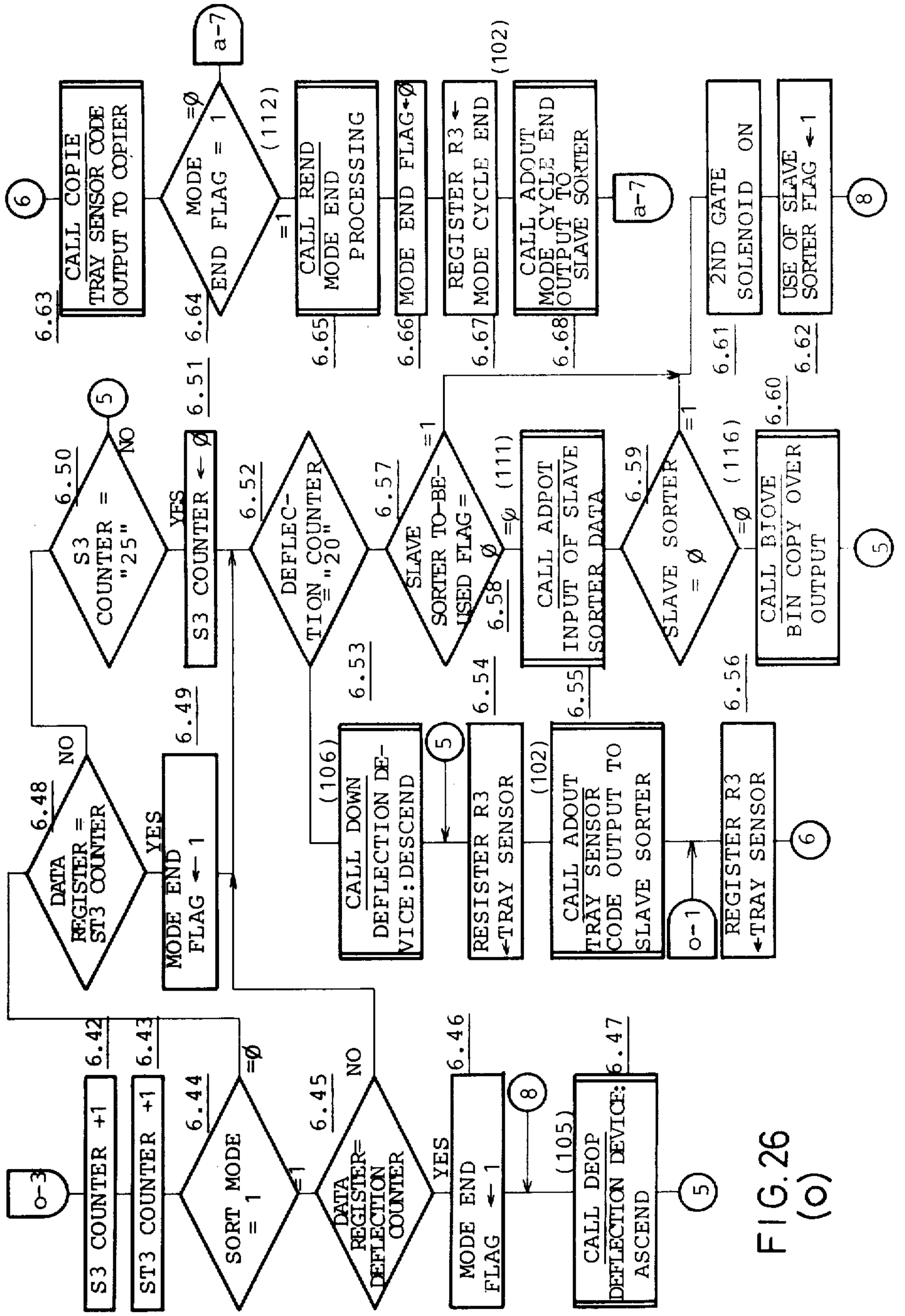

Explanation on sorter flow (FIG. 26)

The program counter in the CPU starts with "0" after the power supply is placed on and the reset circuit in the CPU is operated.

(1) Block 1 of FIG. 18(*a*)

The CPU sets PORT 23 at its initial state at 1.1 and 1.2. Next, in order to place the sorter operation under its initial condition, the first gate solenoid 24 is energized to open the gate and drive the ascending solenoid 50. The master sorter is placed in the state where it provides the sheet to the tray 27 (1.3). At 1.4, the sorter places RAM under the state "0". At 1.5 and 1.6, "1" is set to the data register and the mode flag is set to copy mode. At the next steps 1.7 and 1.8, the interface PORTs 10 and 20 with respect to the copier as well as the interface PORTs 30 and 40 with respect to the slave sorter are all set to "0".

At 1.9, the CPU sets the flag to "1", with which the deflection counter (counter which counts the number of sheets entering into the bin in cooperation with the detector 69) is set to "1" at the time of "Deflection counter set flag" or when the deflection device is keeping the home position switch 52 on. With the home position switch ON, the deflection device performs sorting or collation of sheets to the first bin. At the next step 1.10, the CPU causes the timer circuit contained therein to start. This timer circuit performs counting by use of fundamental clocks for operating the CPU, and generates an interruption signal when it reached a predetermined count to jump the flow to the timer operation flow (corresponding to the jam and timer flow, to be described later). Then, the CPU waits for a predetermined time until the slave sorter is ready (1.11).

Thereafter, the CPU puts the φ START code into the register R3, calls SUBROUTINE "102" and provides the φ START code to the slave sorter (1.12 and 1.13). With this code, the slave sorter operates according to the flow illustrated in FIG. 21.

In the above paragraph, there has been explained the operation of CPU at the instant that the power source is activated.

MAIN ROUTINE [a-7]

The CPU will input the codes of the copier at 1.14. This subroutine is used when the copier outputs the codes, or when the codes (information) from the copier are read (see the SUBROUTINE "COPIE"). When the code from the copier is the φ START code, the CPU jumps to ① to cause the program counter to start with "φ" since the φ start flag is retained within its subroutine (1.15). This signal will be outputted by the copier when the power is applied to the copier itself or disconnected therefrom instantly, or when the CPU in the copier is required to start with "0", thereby preventing such contradiction that the CPU in the copier is at its initial state and the CPU in the sorter side is in operation. This function also assures that the CPU in the slave sorter starts with "φ" since the φ START code is also provided to the slave sorter in a subroutine wherein the φ start flag is set.

At the step 1.16, the judgement on whether or not the end flag is "φ" will be performed. In the case of "1", the flow proceeds to [b-2] The end flag is a flag to be set when the first sensor 21 detects a sheet, and will be reset when a series of modes such as copy mode and collate mode, or when the mode is interrupted halfway.

(2) Block 2 of FIG. 18(*a*)

The judgement on whether the new data flag is "1" or not will be made at 1.17. If "φ", the flow enters into [b-3] The new data flag is a flag to be set in the subroutine "COPIE" when the data of sorting, collation or copying is inputted.

At 1.18, the CPU provides the mode data set in the buffer data register in the subroutine "COPIE" to the data register. At 1.19 and 1.20, the buffer data register and the new data flag are set to "φ". The entry data flag is set at 1.21.

When the first sensor detects a sheet, the S1 counter which performs the counting of +1 is set to "φ" at 1.22. At 1.23~1.28, the data is outputted to the slave sorter.

(3) Block 3 of FIG. 18(*a*)

Flow of [b-3] (FIG. 26(*b*))

At the step 1.29, the CPU makes the judgement on whether or not the buffer register in the mode set in the subroutine "COPIE" is "1". In the case of "φ", the flow goes to [b-2], whereas in the case of "1" the mode register is set to a new mode and the buffer mode register is set to "φ" at 1.30 and 1.31. The new mode (sort, collate or copy mode) is outputted to the slave sorter at 1.31'~1.36. Finally, the mode check flag used for checking the sorter for whether it is placed under the mode executable condition or not will be set at 1.37.

(4) Block 4 of FIG. 18(*a*)

Flow of [b-2]

At 1.38, the CPU will check for whether the mode shut off flag set in the subroutine "COPIE" is "1" or not. In the case of "φ", the flow jumps to ⑥. In the case of "1", the mode shut off flag is set to "φ" at 1.39. At 1.40 and 1.41, SUBROUTINE "111" is called to input the data at PORT 1, and the judgement on whether or not there is a sheet in the bin will be made. In the case of "φ" (no sheet), SUBROUTINE "101" is called to check for whether any sheet is present in the bin of the slave sorter or not (1.42, 1.43). When there is no sheet in the bin, the DISABLE SHUT OFF code is outputted to the copier. If a sheet is present in the bin belonging to either the master sorter or the slave sorter (including the subslave sorter), the ENABLE SHUT OFF code is outputted to the copier (1.43~1.46).

(5) Block 5 of FIG. 18(*a*)

At 1.47, the data is inputted from PORT of the slave sorter. When the slave sensor bit is "φ", the slave sorter sensor flag is set to "φ" at 1.48 and 1.49. And then, the flow will jump to [c-1]. When the slave sorter sensor bit is "1", the judgement on whether or not the slave sorter sensor flag is "φ" will be performed. If "1", the flow goes to [c-1] (1.50). If "φ", the slave sorter sensor flag is set to "1", and then the flow jumps to [o-1] after increasing the ST3 counter by one (1.51, 1.52). ST3 counter is a counter for counting a total number of sheets transported to the bin in coorperation with the third sensor or sheet detector 69.

Flow of [c-1] (FIG. 26(*c*))

The data at PORT of the slave sorter is inputted. When the slave sorter jam bit is "1", SUBROUTINE "110" or the subroutine ADJAM for ejecting sheets in the copier into the paper ejection tray 27 is called. Then, slave sorter jam flag is set to "1" (2.1, 2.2, 2.3, 2.4).

At 2.5, the data is inputted from PORT of the slave sorter. If the door bit of the slave sorter is "φ", the door code flag of the slave sorter is set to "φ", and the flow goes to ② (2.6, 2.12). When it is "1", the judgement on whether or not the slave sorter door flag is "φ" will be performed at 2.7. In the case of "1", the flow proceeds to ②. While in the case of "φ", the slave sorter door flag is set to "1", and the motor stop flag is set to "1". In the next step, SUBROUTINE "114" on the subroutine COMAL for outputting the DOOR code to the copier is called (2.8, 2.9, 2.10, 2.11).

Flow of ②

At 2.12', the data is inputted from PORT of the slave sorter. When the slave sorter end bit is "φ", the slave sorter end flag is set to "φ". Then, the flow proceeds to [d-1] (② -A) (2.13, 2.14). If the slave sorter end bit is "1", the judgement on whether or not the slave sorter end flag is "φ" will be made. In the case of "1", the flow goes to ② -A. Whereas in the case of "φ", the slave sorter end flag is set to "1" (2.15, 2.16). At 2.17, the judgement on whether it is a sort mode or not will be performed. When it is not a sort mode, the flow proceeds to ② -B. While it is so, the slave sorter using flag is set to "φ" assuming that the number of sheets to be sorted by use of the slave sorter has been processed, and then the second gate solenoid is deenergized (2.18, 2.19). At 2.20, the manual insert inhibit timer register is set to "φ".

Flow of ② -B

At 2.21, JAM 3 and JAM 4 flags are set to "φ". And then, SUBROUTINE "112" or the subroutine REND in the mode end processing routine is called at 2.22.

(6) Block 6 of FIG. 18(*a*)

Flow of ② -A (FIG. 26(*d*))

Judgement will be made on whether the deflection counter set flag to be set in the deflection device ascend ROUTINE "104" is "1" or not. If "ϕ", the flow goes to ② -c (2.23). In the case of "1", the data of PORT 1 is inputted, and the checking for whether or not the home position switch is ON. In the case of "ϕ" or OFF, the flow goes to ② -c (2.24). In the case of ON, the deflection counter flag is set to "ϕ" (2.25). At 2.26, the output for stopping the deflection device is provided. At 2.27, the deflection counter is set to "1". At this stage, the deflection device is stopped at the first bin and held thereat.

At 2.28, the manual insert inhibit timer is set to "ϕ". Accordingly, when the deflection device is ascending, the manual insert is inhibited. However, the manual insert will become possible when the deflection device enters a home position.

(7) Block 7 of FIG. 18(*a*)

Flow of ② -c

The checking for whether or not the end detection switch 53 is ON will be made at 2.29. In the case of OFF, the flow goes to ⑤ , whereas in the case of ON whether or not the copy mode flag is "ϕ" will be checked. When the flag is "1", flow goes to ② -D, whereas in the case of "ϕ" the checking for whether the slave sorter is connected or not will be made (2.30, 2.40, 2.41). If connected, SUBROUTINE "120" or the subroutine BOVR for outputting the bin copy over is called at 2.42. If connected, the solenoid of second gate 32 is energized, and the slave sorter using flag is set to "1" (2.43, 2.44).

In the next step, SUBROUTINE "104" for ascending the deflection device is called at 2.45. The abovementioned flow operation will occur when the entry is modified after the manipulation for stoppage during the execution of collate mode.

(8) Block 8 of FIG. 18(*a*)

Flow of [e-5) (FIG. 26(*e*))

The flow represented by the steps 2.46～2.54 is a processing routine used whenever the doors in the master sorter are open.

The master sorter stops the moter in itself and provides the MOTOR STOP code to the slave sorter and the DOOR code to the copier. When the machine is placed under copy cycle operation, the copier stops the delivery of sheets, causes the print button to light "red" and forbids its manipulation mode. In short, the copier is placed under such condition as the key entry is not effective. When it is not a copy cycle operation, the print button is lit "red" and its key input is made ineffective.

(9) Block 9 of FIG. 18(*a*)

At 2.55, 2.58, 2.62 and 2.65, the jam flags to be set in the jam check ROUTINE "109" are checked. At 2.55, the checking for whether the jam copy flag is "1" or not will be made. In the case of "0", the flow goes to ② -E, while in the case of "1" the JAMCOPY is provided to the copier at 2.56 and 2.57.

In the next step, the checking for whether the jam flag is "1" or not will be made at 2.58. In the case of "ϕ", the flow goes to ② -F, while in the case of "1" the STOP code is provided to the slave sorter at 2.59 and 2.60. At 2.61, the checking for whether the jam reset switch is ON or not will be made. If ON, the flow goes to the jam reset routine [f-1) . And if OFF, the flow jumps to [a-7) .

The checking for whether the JAM 2 flag is "1" or not will be made at 2.62. In the case of "ϕ", the flow goes to the step 2.65, while in the case of "1" the SORTER JAM code is outputted to the copier, and then the flow jumps to [g-2) (2.63, 2.64). At the step 2.65, the checking for whether or not the slave sorter jam flag is "1" will be performed. In the case of "ϕ", the flow jumps to [g-2) , whereas in the case of "1" the checking for whether the jam reset key 75 is ON or not will be made at 2.66, and then the flow proceeds to the jam reset routine [f-1) . The jam reset key 75 is also used for the case of jamming in the slave sorter.

When the JAM code is outputted from the sorter side, the copier sends only sheets under delivery to the sorter side, stops the feeding of paper and inhibits all of key inputs while putting the print button to "red".

Jam reset routine (FIGS. 26(*d*) and 26(*g*))

Firstly, the timer counter in the CPU is stopped at 3.1. At 3.2～3.8, the timer counter flags for jam detection are all reset. At 3.9, the mode stop flag is set to "1" in order to make possible the modification of mode after jam reset.

At the step 3.10, the checking for whether the copy mode flag is "ϕ" or not will be made. In the case of "1", the flow goes to the step 3.20, while in the case of "ϕ" the checking for whether the slave sorter using flag is "1" or not will be made at 3.11. In the case of "ϕ", the second gate solenoid is deenergized at 3.12, while in the case of "1" the second gate solenoid is energized at 3.13. At 3.14, the LED lamp (FIG. 1) is lighted. Next, the first gate solenoid is deenergized at 3.15, and the checking for whether the manual insert flag is "0" or not will be made at 3.16. In the case of "ϕ", the jam reset flag is set to "1" at 3.17. This means that it is "jamming" during the copy cycle. At the step 3.18, the manual insert inhibit timer is set to "ϕ".

At the step 3.19, the contents of the ST3 counter is entered into the S1 counter. This step is performed for jam compensation.

At 3.20 and 3.21, the JAMRESET code is outputted to the copier. With this signal, the copier will cancel the jamming in the sorter. At 3.22 and 3.23, the JAMRESET code is outputted to the slave sorter. Jamming in the slave sorter or subslave sorter is also cancelled with this signal.

At 3.24, the timer in the CPU is started, and thereafter the flow jumps to [a-7) .

(10) Block 10 of FIG. 18(*a*)

The flow represented by the steps 3.25～3.33 is a routine for descending the deflection device by one step (one bin), but the explanation thereof will be abridged.

(11) Block 11 of FIG. 18(*a*)

At the step 3.34, the checking for whether the IN MD check flag, namely a flag to be set when BINCOPY, BINCOPY OVER or ENTRYOVER is outputted to the copier, is "ϕ" or not will be made. In the case of "ϕ", the flow goes to a routine of the manual insert switch check, while in the case of "1" the flow jumps to [h-1) to inhibit the manual insert.

Flow of manual insert (FIG. 26(*g*))

At 3.35 and 3.36, the CPU receives the data from PORT 1 and the checking for whether the manual switch is ON or not will be performed. In the case of the switch being ON, the manual insert solenoid (solenoid of the manual insert gate 40) is deenergized and the manual insert switch flag is set to "φ" at 3.37 and 3.38. In the case of the switch being ON, the checking for whether the manual insert switch flag is "φ" or not will be made at 3.39. In the case of "1", the flow goes to ⑤, while in the case of "φ" the checking for whether the jam reset flag is "φ" or not will be made at 3.40. If "1", it corresponds to the manual insert due to jam recovery, so that the flow will jump to ④. In the case of φ, the checking for whether the sorter start flag is "φ" or not will be made at 3.41. When the flag is "1", it corresponds to the copy cycle operation, so that the manual insert is not required, and the flow will jump to [h-1]. When the sorter start flag is "φ", the checking for whether the sorter mode flag is "1" or not will be made at 3.42. When the sorter mode flag is "φ", the manual insert is not required and the flow goes to [h-1], while in the case of "1" the manual insert flag is set at 3.43. At 3.44 and 3.45, the manual insert code is outputted to the slave sorter. Finally, the motor in the slave sorter is started and the flow will enter into the manual insert routine.

Routine of ④

At the step 3.46, the CPU calls SUBROUTINE "108" (subroutine MOSTR) for allowing the motor to start. At 3.47, the manual insert switch flag is set to "1". At 3.48, the manual insert timer is set to "1". In this stage, the copier makes the print button "red" and forbids its copy start and key entry on the control panel. At 3.49 and 3.50, the manual switch code is outputted to the slave sorter. At 3.51 and 3.52, the manual insert code is outputted to the copier. When the manual insert code is outputted from the sorter side, the copier makes the print button "red" and inhibits its copy start for a desired period of time determined by the abovementioned timer. The print button will turn to "green" when the READY code is outputted from the sorter side.

In the next step, the checking for whether the manual insert inhibit timer is "φ" or not will be performed. In the case of "1", it corresponds to the state where the deflection device is ascending or the number of sheets inserted manually has become equal to the set numbers, so that the manual insert is inhibitted and the flow goes to [h-1]. In the case of "φ", the manual insert solenoid is energized (3.53, 3.54).

(12) Block 12 of FIG. 18(*a*)

Abnormal flag check routine (FIG. 26(*h*))

The flow represented by the steps 4.1~4.14 is a routine for checking an abnormal flag to decide whether the sorter is under the state capable of executing any mode or not and outputting SORTER READY to the copier. In this routine, the judgement on whether or not the NO READY flag representative of an abnormal signal to be outputted to the copier is "1" or not will be performed. In the case of "φ", the flow will jump to 4.15 since no abnormal signal is present (4.1). In the case of "1", the checking for whether the door flag is "φ" or not will be performed. In the case of "1", the flow goes to [a-7], while in the case of "φ" the checking for various abnormal flags will be performed. In short, the checking for JAM2 flag, slave sorter jam flag, bin copy flag, slave sorter door flag and entry over flag will be made. If any one of the abovementioned flags is "1", the SORTER READY code is not provided to the copier (4.4~4.8). When ascertained to be "φ" for all, the checking for whether or not the copy mode flag is "φ" will be made at 4.9. In the case of "1", the flow goes to ③, while in the case of "φ" the checking for whether or not the copy over flag is "φ" will be made at 4.10. In the case of "1", the flow proceeds to the step 4.15 since no READY code is outputted, while in the case of "φ" the checking for whether or not the manual insert inhibit timer is "0" will be made at 4.11. If "1", the flow goes to 4.15, while in the case of "φ" the SORTER READY code is provided to the copier at 4.12 and 4.13. Next, the NO READY flag is set to "φ" at 4.14. In the aforesaid description, it has been explained that the SORTER READY code at the time of copy mode can be outputted without checking the bin copy over flag. It should be noted that this function makes possible the operation of copy mode even in the case of a full bin since the paper ejection tray 27 is placed in a usable condition in any case.

(13) Block 13 of FIG. 18(*a*)

A check routine for a full bin is represented by the steps 4.15~4.22. Firstly, the judgement on whether the collate mode is present or not will be made. If NO, the checking for whether the up counter is equal to 100 or not will be made In the case of NO, the flow goes to the step 4.30, while in the case of YES, SUBROUTINE "116" for outputting BIN COPY OVER is called (4.15, 4.23, 4.22). The contents of the up counter becomes 100 when 100 sheets are entered into the bin under collate mode. When the bin copy over flag is "φ" under collate mode, the checking for whether or not the bin copy over bit of the sorter is "1" will be made (4.16, 4.20, 4.21). In the case of "φ", the flow proceeds to 4.30, while in the case of "1", BIN COPY OVER is outputted at 4.22.

When the bin copy over flag is "1", the end flag is set to "φ", and the checking for whether any sheet is present in the bin of master sorter or slave sorter (including subslave sorters) or not will be made at 4.17, 4.18, 4.19, 4.24 and 4.25. If present, the flow proceeds to the step 4.30. If absent, the bin copy over flag and the IM MD check flag are set to "φ" at 4.26.

Next, SUBROUTINE "105" for ascending the deflection device is called at 4.27. At 2.28, the mode stop flag is set to "1". At 2.92, the first gate solenoid is deenrgized and the slave sorter using flag is set to "φ". Accordingly, the sorter operation after the release of bin copy over will return to the first bin of the master sorter even when the slave sorter is used, and the accommodation of the remaining sheets will be initiated from the first bin of the master sorter. When the bin copy over code is outputted from the sorter, the copier stops the delivery of new sheets and sends out the sheets on the transfer route to the sorter side. In addition, at the time of bin copy over, the copier inhibits the key inputs other than the interrupt key and the copy mode key.

(14) Block 14 of FIG. 18(*a*)

The flow represented by the steps 4.30~4.36 is a routine for setting the interrupt flag to "φ". At 4.30, the checking for whether the interrupt timer for setting the interrupt flag to "φ" is "1" or not will be made. In the case of "φ", the flow goes to 4.37, while in the case of "1" the interrupt timer is increased by 1 (+1), and then the checking for whether the interrupt timer has become equal to 8 or not will be made at 4.31 and 4.32. If NO, the flow goes to 4.37. If YES, the interrupt timer is set to "φ" at 4.33. At 4.34, the end flag and the interrupt flag are set to "φ". Next, the checking for whether the IN MD check flag is "1" or not will be made at 4.35. In the case of "φ", the flow goes directly to ⑥, while in the case of "1" the S1 counter buffer is entered into the S1 counter, and thereafter the flow proceeds to ⑥ (4.36). At the step 4.37, the flow will enter into the mode check routine, namely, a routine wherein preparation is made in accordance with the inputted mode. At 4.37, the checking for whether the end flag is "φ" or not will be made. In the case of "1", the flow will go to [1-6] since it is under mode execution, whereas in the case of "φ" the checking for whether the mode check flag is "φ" or not will be made at 4.38. In the case of "φ", the flow goes to [1-6], while in the case of "1" the mode check flag and the entry over flag are set to "φ" at 4.39 and 4.40.

In the next step, the checking for whether or not the copy mode flag is "1" will be made at 4.41. In the case of "φ", the flow goes to 4.46, and in the case of "1" the checking for whether the interrupt flag is "φ" or not will be made at 4.42. In the case of "1", the flow goes to 4.44. While in the case of "φ", the master sorter, slave sorter and subslave sorter to-be-used flags are all set to "φ" at 4.43.

The LED is turned off at 4.44. Next, the first gate solenoid is energized at 4.45, and the flow will jump to [k-5]. When judged at 4.41 that it is not a copy mode, the second gate solenoid is deenergized and the LED is turned on at 4.46 and 4.47. At 4.48, the checking for whether the interrupt flag is "φ" or not will be made. In the case of "1", the flow goes to [k-5], but in the case of "φ", the master sorter using flag, slave sorter using flag and subslave sorter to-be-used flag are all set to "φ" at 4.49. At 4.50, the checking for whether the collate mode flag is "1" or not will be performed. In the case of "1", the flow goes to [k-1], but in the case of "1" the bin sheet check SUBROUTINE "113" (PACH) is called at 4.51. At 4.52, the checking for whether the mode check flag is "φ" or not will be made. In the case of "1", the flow will jump to [a-7].

In the next step, the data of PORT 1 is inputted, and the checking for whether any sheet is present in the bin or not will be performed (4.53, 4.54). When no sheet is present in the bin, the flow goes to [k-3], but if present the checking for whether the home position is "ON" or not will be made at 4.55. When it is not "ON", the flow proceeds to [k-3]. On the contrary, when it is "ON", the checking for whether the sorter is connected or not will be made at 4.56 and 4.57. When the slave sorter is not connected, the flow goes to [a-7]. When connected, the second gate solenoid is energized, and the slave sorter using flag is set to "1" (4.58, 4.59).

The flow for preparation for the case where the collate mode is inputted will be outlined as follows. When any sheet is present in the bin under the state wherein the collate mode has been selected, BIN COPY is outputted to the copier. Cancellation thereof will be executed when the sheet has been removed from the bin by an operator for the machine. In the event that only the entry is inputted under collate mode, if the deflection device is at its home position and a sheet is present in the bin of the master sorter, but not present in the bin of the slave sorter, the slave sorter will be used provided that it is connected. The information inputted by means of the entry keys correspond to the number of copies for sorting which corresponds to the number of sheets copied about the same page in the case of sort mode, whereas in the case of collate mode, it corresponds the total number of sheets copied regardless of whether the original is changed or not.

(15) Block 15 of FIG. 18(*a*)

In this paragraph, the preparatory flow for sort mode will be explained in detail in conjunction with FIG. 26(*k*). The conditions at a time when the sorter can be used in the sort mode are as follows. First, the desired number of copies is not more than the total number of bins of the connected sorters, for example, assuming now that one sorter has 20 bins and when two sorters are connected, the number of copies is less than "40" including "40". And, in the case of three sorters, it is less than "60" including "60", as the result of checking for the number of copies set for sorting. Secondly, there should be no sheet in any of the bins in the sorters used for sorting. However, if there has been any entry modification during operation, the sorters can be used even if a sheet or sheets are present in the bins so long as the new entry is less than the total number of bins. Details will be explained according to the flow illustrated.

First of all, the CPU checks the sort mode flag for whether it is "1" or not (5.1). In the case of "φ", the flow goes to [a-7], while in the case of "1" the checking for whether or not the number of copies is more than "100" will be made. When it exceeds "100", the flow will jump to [k-2] and enter into a routine of bin copy over.

At 5.3, the checking for whether the number of copies is less than "20" including "20" or not will be made. If NO, the flow goes to 5.6. If YES, SUBROUTINE "113", namely, the subroutine PACH of bin copy sheet check is called at 5.4. Next, the checking for whether the mode check flag is "1" or not will be made at 5.5. In the case of "1", the flow will go to [a-7] because the BIN COPY has already been outputted to the copier. While in the case of "φ", the flow proceeds to [k-3]. When the number of copies is not less than "20" including "20" the checking for whether the number of copies is less than "40" including "40" or not will be made at 5.6. If NO, the flow goes to ②. If YES, the checking for whether the slave sorter is connected or not will be made at 5.7 and 5.8. When the slave sorter is not connected, the flow goes to [k-2]. When connected, the flow goes to ③.

When the number of copies is not less than "40" including "40", the checking for whether it is less than "60" including "60" or not will be made at 5.9. When it is not less than "60" including "60", the flow goes to [k-2]. When less than "60" including "60", the checking for whether or not the subslave sorter is connected will be made at 5.10 and 5.11. When not connected, the flow goes to [k-2]. When connected, SUBROUTINE "113" for checking all the sheets in all the bins is called (5.12). When no sheet is present, the slave sorter using flag is set to "1", but if present, the flow will jump to [a-7] (5.13, 5.14). At 5.15, the second gate solenoid is deenergized. At 5.16, the IN MD check flag is set to "φ". Next, the bin copy flag is set to "φ" at 5.17. In the next step, the entry data flag is set to "φ", and the flow jumps to [a-7] (5.18).

When the entry of more than the sorting capacity determined by the number of sets connected is inputted, the ENTRY OVER code is outputted to the copier at 5.19 and 5.20. At 5.21, the entry over flag is set to "1". At 5.22, the IN MD check flag is set to "1". In the next step, SUBROUTINE "113" for checking sheets in the bins is called at 5.23. Then, the flow jumps to [a-7]. (16) Block 16 of FIG. 18(*a*)

1st sensor check routine [1-6] (FIG. 26(1))

At the step 5.24, the data from PORT 1 is inputted. At 5.25, the checking for whether or not the sheet is detected by the first sensor will be made. When any sheet is present, the first sensor flag is set to "1" at 5.26. In the next step, the logical sum "OR" is taken for the S1 jam counter and "1" and the flow jumps to [m-1] (5.27). The logical sum "OR" between the jam counter and "1" is exemplified below.

| | | |
|---|---|---|
| Example 1. | S1 | jam counter = 0000 0000 |
| | | 1 |
| | | Logical sum = 1 |
| Example 2. | S1 | jam counter = 0010 1101 |
| | | 1 |
| | | Logical sum = 0010 1101 |
| Example 3. | S1 | jam counter = 0010 1100 |
| | | 1 |
| | | Logical sum = 0010 1101 |

When the first sensor is not "1", the checking for whether the first sensor flag is "1" or not will be made at 5.28. In the case of "φ", the flow goes to [m-1], while in the case of "1" the first sensor flag is set to "φ" at 5.30. Next, the S1 jam counter (a jam detection counter located between the final sensor 16*a* in the copier and the first sensor 21 in the master sorter) is set to "φ" at 5.31. At 5.32, the S1 counter is increased by 1.

Next, the checking for whether the interrupt flag is "φ" or not will be made at 5.33. In the case of "φ", the flow goes to (4), while in the case of "1" the end flag is set to "1" at 5.34. At 5.35, the checking for whether or not the copy mode is "1" will be made. In the case of copy mode, the TRY SENSOR (03H) code is outputted to the copier at 5.36, 5.37. When this code is outputted from the sorter side, the copier performs counting by use of the internal counter of the control unit and uses this counts for displaying the copied numbers at the time of jamming. Next, the motor stop flag is set to "φ", and the flow proceeds to 5.40 (5.38). When it is not a copy mode, the S2 jam counter (a jam detection counter located between the first sensor 21 and the second sensor 31) is increased by 1 at 5.39, and the flow goes to 5.40. Next, the checking for whether or not the contents of the data register (In the case of sort mode, it corresponds to the number of copies, while in the case of copy mode and collate mode, it corresponds to the sheet numbers to be produced from the copier) is equal to the contents of the S1 counter will be made at 5.40. When it is not equal, the flow goes to [m-1]. When equal, the S1 counter is set to "φ" at 5.41. Next, the checking for whether the copy mode flag is "1" or not will be made at 5.42. In the case of "φ", the flow goes to 5.48. In the case of "1", the end flag is set to "φ" at 5.43. At 5.44, the sorter start flag is set to "φ". At 5.45, the motor start flag is set to "1". In the next step, the MODE CYCLE END (13H) code is outputted to the copier at 5.46 and 5.47. It will be understood that the abovementioned flow corresponds to a chain of copy mode cycles.

In other words, the number of the manually inserted sheets is counted by the S1 counter at the step 5.32 and the comparison between the number of sheets to be manually inserted is a set in the counter and the number of sheets actually inserted manually is made at the step 5.40. When both numbers are found identical, the timer for inhibiting manual insertion will be set at the step 5.48 and the manual insert gate 40 will be closed.

(17) Block 17 of FIG. 18(*a*)

Counting operation for sheets by the first sensor is also performed when the operation due to the manual insert is executed, so that the operation therefor becomes similar to the flows mentioned above.

2nd sensor flow [m-1] (FIG. 26(*m*))

This is a change-over routine for the set-reset of jam flag and the solenoid of second gate 32.

At 6.1, checking will be made for whether or not the copy mode flag is "1". In the case of "1", the flow goes to [a-7], while in the case of "φ" the checking will be made for whether or not the JAM 2 flag is "φ" at 6.2. In the case of "1", the flow goes to [a-7]. Like these, the reason why the flow is returned to [a-7] when the copy mode and the JAM 2 flag are equal to 1 is that the routine for the second sensor 31 and the third sensor 69 become irrelevant. In the next step, the data of PORT 1 is inputted, and the checking will be made for whether or not the second sensor 31 is detecting any sheet or not (6.3, 6.4). When it is not detecting, the flow goes to 6.7, while in the case of "to be detecting" the second sensor flag is set to "1" at 6.5. At 6.6, the logical sum "OR" is taken for the S2 jam counter and "1". Thereafter, the flow proceeds to [n-2].

When no sheet is detected by the second sensor 31, the checking will be made for whether the second sensor flag is "1" or not (6.7). In the case of "φ", the flow goes to [n-2], while in the case of "1" the second sensor flag is set to "φ" at 6.8. At 6.9, the S2 jam counter is set to "φ". In the next step, the checking will be made for whether the slave sorter using flag is "φ" or not. In the case of "1", the flow goes to [a-7] (6.10). The reason for this is that, when the slave sorter is employed, any sheet will not be detected by the third sensor. When the slave sorter using flag is "φ", the checking will be made for whether the JAM 3 check flag is "φ" or not (6.11). In the case of "1", the flow goes to 6.14, while in the case of "φ" the S3 jam counter is increased by one (+1), and then the JAM 3 check flag is set to "1" at 6.12 and 6.13. When the JAM 3 check flag is "1", "1" is set to the S4 jam counter. In the next step, the JAM 3 check flag is set to "φ" (6.14, 6.15). At 6.16, the checking will be made for whether the S2 counter is "25" or not. This "S2 counter" is a counter for switching the second gate 32 to the slave sorter side. When the S2 counter is not "25", the flow goes to 6.18, while in the case of "25" the S2 counter is set to "φ" at 6.17. At 6.18, "1" is added to the S2 counter. At 6.19, the checking will be made for whether the sort mode flag is "1" or not. In the case of "φ", the flow proceeds to 6.23.

When the sort mode flag is "1", the checking for whether the S2 counter "20" or not will be made at 6.20. If NO, the flow goes to [n-2] representing the third sensor routine. If YES, the checking for whether the slave sorter to-be-used flag is "1" or not will be made at 6.21 because it indicates that the No. 20th sheet in sorting has passed. In the case of "φ", the flow goes to [n-2] since the number of copies is less than "20"

including "20", while in the case of "1" the second gate solenoid is energized at 6.22 since this operation corresponds to the sorting for the number of sheets of more than "21" including "21". And then, the flow goes to [n-2). When judged at 6.19 that the mode is not a sort mode, the checking will be made for whether the deflection counter is "20" or not (6.23). If NO, the flow goes to [n-2), while in the case of YES, the checking will be made for whether the S2 counter is "25" or not (6.24). If NO, the flow goes to [n-2). While in the case of YES, the checking will be made for whether or not the slave sorter is connected, since it can be assumed that "25" sheets have already been accommodated in the 20th bin provided that the deflection counter is positioned at the 20th bin (6.25, 6.26). When the slave sorter is not connected, SUBROUTINE "120" is called at 6.27 to output BIN COPY OVER. Thereafter, the flow goes to [n-2). When the slave sorter is connected, the flow goes to 6.22 in order to use the slave sorter, and the second gate solenoid is energized. Then, the flow goes to [n-2).

(18) Block 18 of FIG. 18(*a*)

3rd sensor routine (FIGS. 26(*n*) and (*o*))

At 6.28, the checking will be made for whether the slave sorter using flag is "φ" or not. In the case of "1", the flow returns to [a-7). In the case of "φ", the data of PORT 1 is inputted and the checking will be made for whether any sheet is detected by the third sensor 69 or not (6.29, 6.30). When the third sensor is not detecting a sheet, the flow goes to 6.34. On the contrary, when the sensor is detecting a sheet, the checking for whether the third sensor flag is "φ" or not will be made at 6.31. In the case of "1", the flow goes to [a-7), while in the case of "φ" the third sensor flag is set to "1" at 6.32. At 6.33, +1 is performed in the ST3 jam counter (6.33). Then, the flow goes to [a-7). When no sheet is detected by the third sensor at 6.30, the checking for whether the third sensor flag is "1" or not will be made at 6.34. In the case of "φ", the flow goes to [a-7), whereas in the case of "1" the third sensor flag is set to "φ" at 6.35. At 6.36, the ST3 jam counter is set to "φ".

At 6.37, the checking will be made for whether or not the JAM 4 check flag is "1". In the case of "φ", the flow goes to 6.40, whereas in the case of "1", the S4 jam counter is set to "φ" at 6.38. At 6.39, the JAM 4 check flag is set to "φ". Then, the flow goes to [o-3).

When the JAM 4 check flag is "φ", the S3 jam counter is set to "φ" at 6.40. At 6.41, the JAM 4 check flag is set to "1". Then, the flow goes to [o-3). At 6.42, 1 is added to the S3 counter, At 6.43, 1 is added to the ST3 counter. At 6.44, the checking will be made for whether the sort mode flag is "1" or not. In the case of "φ", the flow goes to ④, whereas in the case of sort mode ("1") the checking will be made for whether the content of the data register is equal to that of the deflection counter or not (6.45). When "not equal", the flow goes to 6.52, while in the case of "equal" the mode end flag will be set to "1" at 6.46 because it can be assumed that the sorting operation has been finished. At the step 6.47, SUBROUTINE "105" for ascending the deflection device is called. Then, the flow goes to ⑤. When judged at 6.44 that the mode is not a sort mode, the checking for whether the content of the data register is equal to that of the ST3 counter or not will be made at 6.48. If NO, the flow goes to 6.50. If YES, the mode end flag is set to "1" at 6.52 because it can be assumed that the collate mode has been finished. Thereafter the flow goes to 6.49. When the content of the data register is not equal to that of the ST3 counter, the checking will be made for whether the bin has already accommodated 25 sheets or not (6.50). If NO, the flow goes to ⑤. If YES, the S3 counter is set to "φ" at 6.51. At the next step 6.52, the checking will be made for whether the deflection counter is "20" or not. If YES, the flow goes to 6.57. If NOT (Less than "20"), SUBROUTINE "106" for descending the deflection device is called at 6.53. Next, the TRAY SENSOR (03H) code is outputted to the slave sorter at 6.54 and 6.55. Then, the TRAY SENSOR code is outputted to the copier at 6.56 and 6.63.

The copier counts this codes and uses the counted values for displaying the copied numbers at the time of jam compensation and jamming. When the deflection counter is "20" at step 6.52, the checking will be made for whether the slave sorter to-be-used flag is "φ" or not (6.57). In the case of "1", the flow goes to 6.61, while in the case of "φ" the checking will be made for whether the slave sorter is connected or not (6.58, 6.59). When the slave sorter is not connected, SUBROUTINE "116" for outputting BIN COPY OVER is called at 6.60. Then, the flow goes to ⑤. When the slave sorter is connected, the second gate solenoid is energized and the slave sorter using flag is set to "1" at 6.61 and 6.62. Then, the flow goes to ⑧. At 6.64, the checking will be made for whether the mode end flag is "1" or not. In the case of "φ", the flow proceeds to [a-7), while in the case of "1", SUBROUTINE "112" representing the end of mode cycle is called at 6.65. At 6.66, the mode end flag is set to "φ". At 6.68, the MODE CYCLE END code is outputted to the slave sorter. Then, the flow goes to [a-7).

Briefly, the subsequent copy start operation under sort or collate mode will be permitted by the copier in response to the MODE CYCLE END code outputted during SUBROUTINE "112".

The abovementioned third sensor routine can be summarized as follows: setting and resetting the jam check flag between the second sensor 21 and the third sensor 31; checking for the end of sort mode operation at the time of sort mode; descending and ascending the deflection device (to be ascend at the end of mode); checking for the completion of collate mode operation at the time of collate mode; checking for the number of sheets accommodated in the bin; checking for bin copy over; and switching to the slave sorter.

Figure 27:
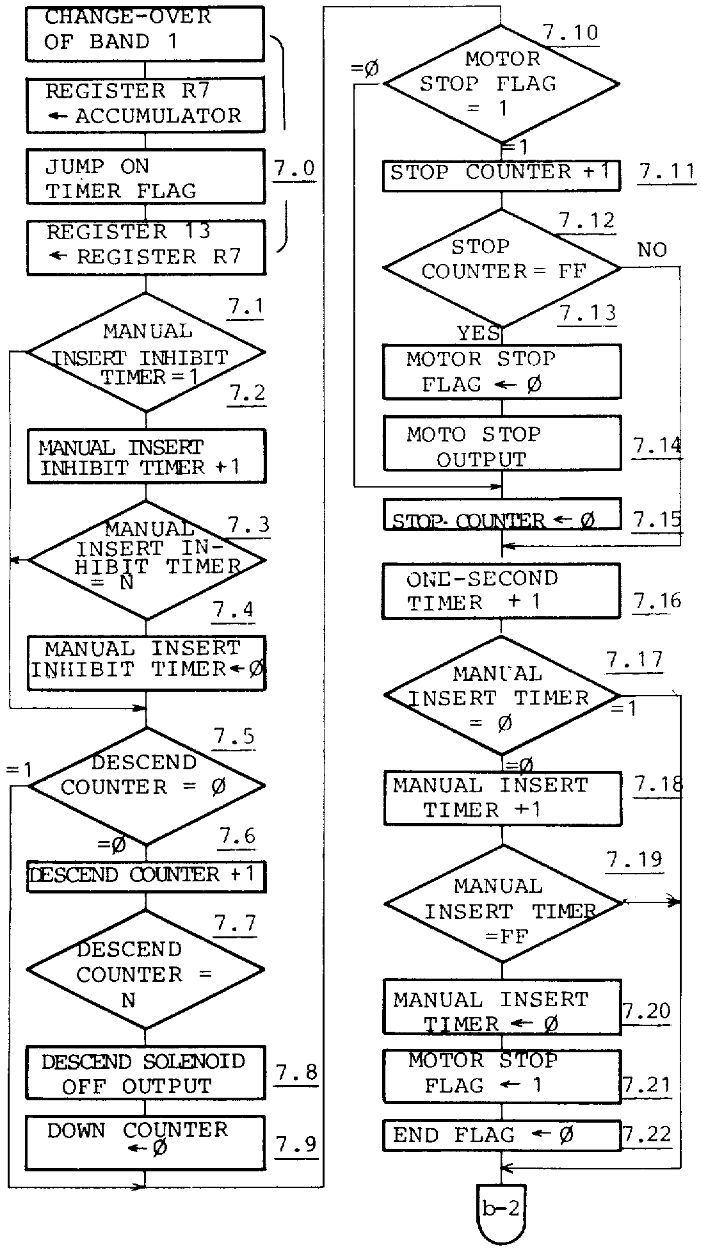
FIGS. 27(*a*) to 27(*c*) show flow charts illustrating a jam and timer routine.
Figure 27:
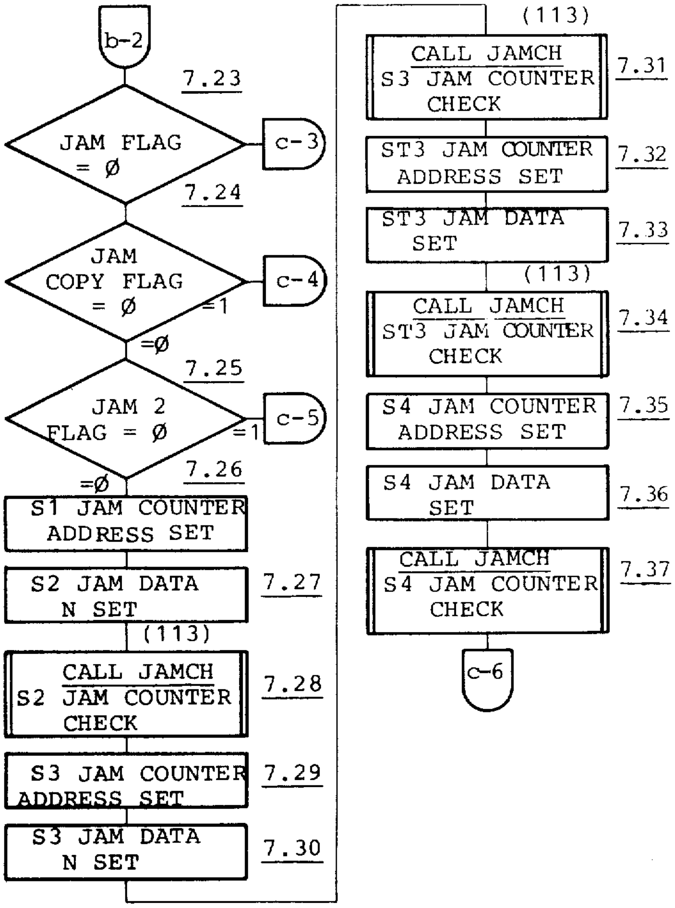
Figure 27:
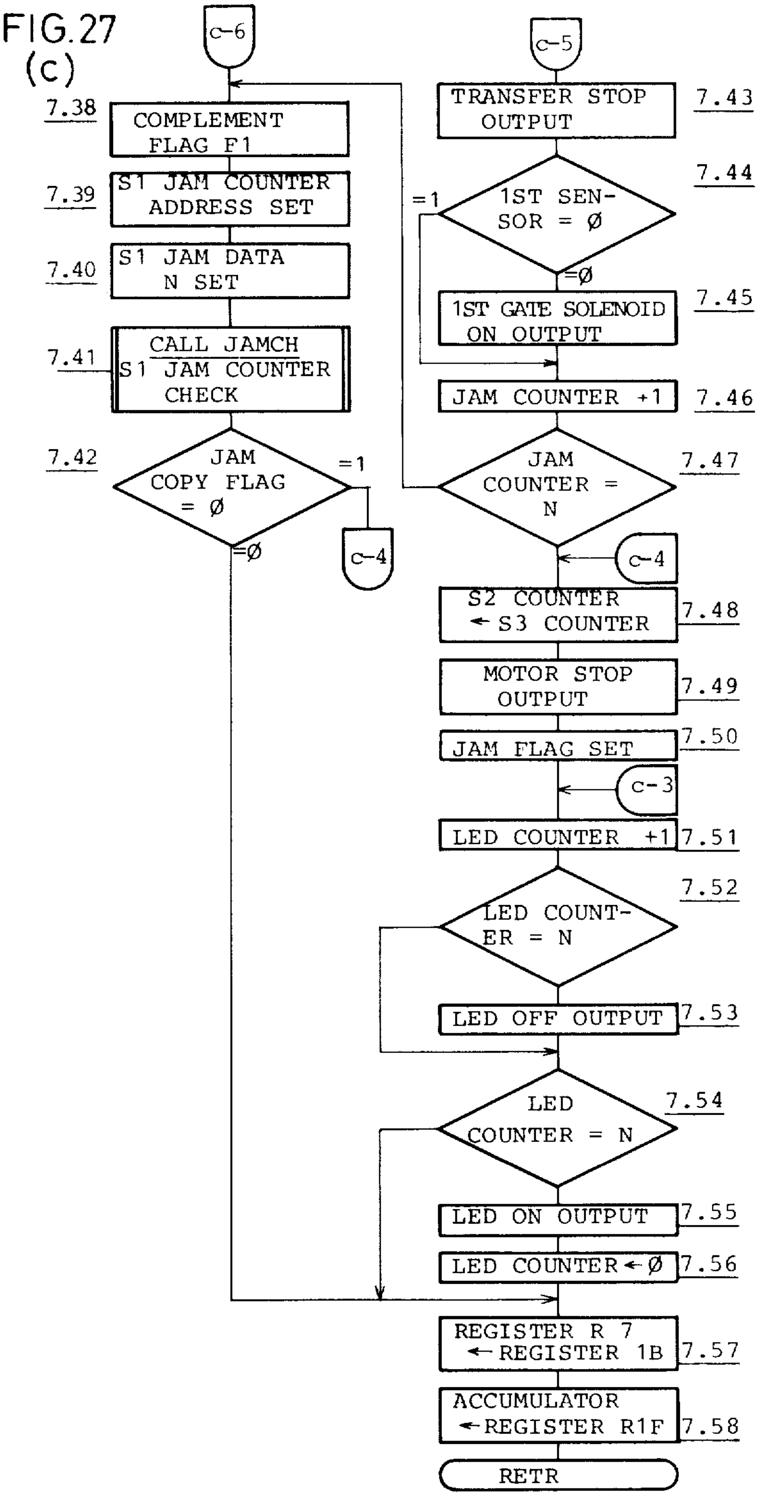

Jam and timer routine (FIG. 27)

The CPU includes various counters for counting internal clocks, and each of the counters will execute its corresponding routine when the content thereof reaches a predetermined value. In short, the routine shown in FIG. 27 is a routine for controlling the operation of various timer counters used as detectors for jamming and as checkers for the contents thereof.

First of all, the register is temporarily shunted before entering into the routine (7.0).

At 7.1, the checking will be made for whether the manual insert inhibit timer is "1" (to be in operation) or not. In the case of "φ", the flow goes to 7.5, while in the case of "1" the manual insert inhibit timer is increased by 1 (7.2). At 7.3, the checking will be made for whether or not the manual insert timer has become equal to the predetermined number "N". If NO, the flow goes to 7.5. If YES, the manual insert inhibit timer is returned to "φ" at 7.4. The manual insert inhibition due to the manual insert gate 40 is thereby cancelled. Next, the flow enters into a routine represented by the steps 7.5~7.9, namely, a timer routine for producing a solenoid operation period used for descending the deflection device. At 7.5, a checking will be made to determine whether or not the down counter is "φ" (non-operative). In the case of "φ", the flow goes to 7.10, whereas in the case of "1" the down counter is increased by 1 at 7.6. At the step 7.7, a checking will be made to determine whether the content of the down counter has reached "N" or not. If it is not "N", the flow goes to 7.10. If it is "N", the descending solenoid is deenergized and the down counter is returned to "φ" (7.8, 7.9).

As the next step, the flow proceeds to a timer routine represented by the steps 7.10~7.15, wherein the motor starts and stops after performing a predetermined count by means of a stop counter and then a predetermined period of time has elased. First of all, a checking will be made to determine whether the motor stop flag is "1" or not (7.10). In the case of "φ", the flow goes to (1), while in the case of "1" the stop counter is increased by one (7.11). At 7.12, the checking will be made for whether the stop counter has become the given value "FF" or not. If it is not "FF", the flow goes to 7.16. If "FF", the motor stop flag is set to "φ", and a signal for stopping the motor is outputted (7.13, 7.14). And then, the stop counter is set to "φ" at 7.15.

Next, +1 is performed for the one-second timer used at the instant the power is put (7.16).

At this stage, the flow goes to a timer routine represented by the steps 7.17~7.22, namely, a routine for forbidding the operation of the copier for a predetermined time period at the time of manual insert. First of all, the checking for whether the manual insert timer is "φ" (non-operative) or not will be made at 7.17. In the case of "φ", the flow goes to [b-2), while in the case of "1" the manual insert timer is increased by one (+1) at 7.18. At the steps 7.18 and 7.19, the checking will be made for whether the content of the manual insert timer has reached the given value "FF" or not. When it is not "FF", the flow goes to [b-2). If "FF", the manual insert timer is returned to "φ" at 7.20. And then, the motor stop flag is set to "1" and the end flag is set to "φ" (7.21, 7.22).

Then, the flow goes to a jam flag check routine represented by the steps 7.23~7.25. When the JAM flag is "1", the flow jumps to [c-3). When the JAM COPY flag is "1", the flow jumps to [c-4). And, when the JAM 2 flag is "1", the flow jumps to [c-5).

When all the JAM flags are all under the state of "φ", the flow goes to a jam counter check routine represented by the steps 7.26~7.42. At 7.26, the address of the S1 jam counter is set in the internal register. At 7.27, the S2 jam data "N" is set. Then, SUBROUTINE "109" for checking the contents of the S2 jam counter is called at 7.28. SUBROUTINE "109" is used as a routine for setting the jam flag when the counted numbers of the S1 jam counter become equal to the count numbers of the S2 jam data "N". The S3 jam counter steps (7.29~7.31), ST3 jam counter steps (7.32~7.34), S4 jam counter steps (7.35~7.37) and S1 jam counter steps (7.38~7.41) operate in a similar fashion as mentioned above. Thereafter, if the jam copy flag is "φ", the flow jumps to 7.57 of (7), while in the case of "1", the flow jumps to [c-4) (7.42)

When judged at 7.25 that the JAM 2 flag is "1", the transfer operation is interrupted because it corresponds to the jamming behind the first gate 23 (7.43). At 7.44, the checking will be made for whether the first sensor 21 is detecting any sheet or not. If YES, the flow goes to 7.46. If NO, the first gate solenoid is energized to eject all the sheets delivered from the copier into the proof tray 27 (7.45). At 7.46, the jam counter is increased by on (+1). At 7.47, the checking will be made for whether the jam counter has become "N" or not. If NO, the flow is returned to [c-6). If YES, the content of the S3 counter is moved into the S2 counter at 7.48, and the jam compensation for the number of sheets is thereby performed. Finally, the motor is stopped and the jam flag is set (7.49, 7.50).

Then, the flow goes to a warning routine represented by the steps 7.51~7.56 wherein the LED is flashed to indicate its jamming position (bin position) to the operator.

As final steps, the register which has been shunted ever since the beginning of jam and timer routine is restored (7.57, 7.58).

Figure 28:
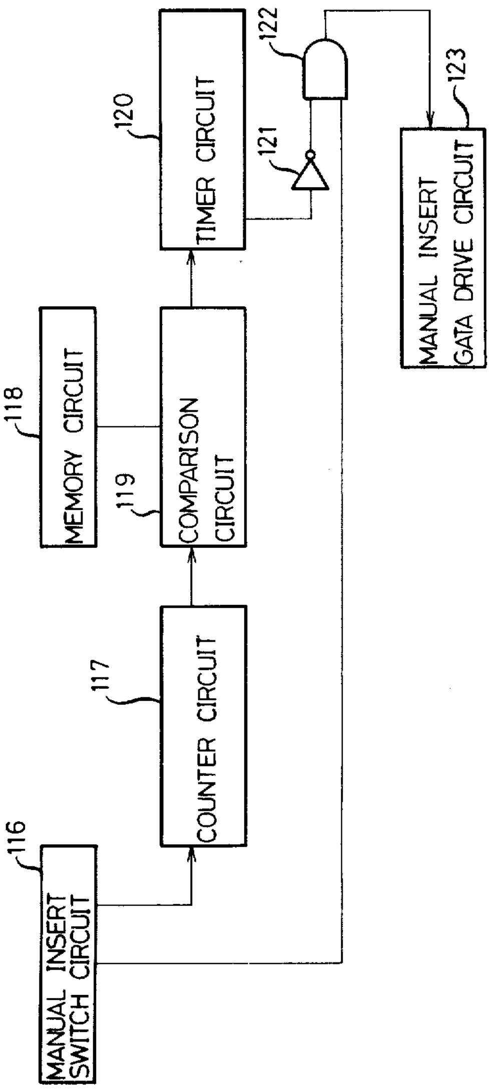
FIG. 28 is a block diagram of a control for the opening and closing of the manual insert gate for collating covers or partitions by use of the manual insert portion, to show more particularly a part of the operation of the sorter as shown in FIG. 26.

FIG. 28 is a block diagram of the portion related to control for opening and closing the manual insert gate 40 for collating the covers or partitions by use of the manual insert portion, and more particularly, shows a part of the operation of the master sorter as explained with reference to FIG. 26. The manual insert switch circuit 116 represents the above explained detector for the manually inserted sheet and the detector (the first sensor) 21 for the sheet reception. The counter circuit 117 represents the S1 counter as explained with reference to the step 5.32 in FIG. 26 (*l*) and said circuit 117 is added with +1 in counting by having received the detection signal from the first sensor 21 of the circuit 116 for the rear end of the sheet. Memory circuit 118 represents the memorized location of the particular address of a RAM incorporated in the data register (step 5.40) or the CPU 101' (FIG. 19) of the master sorter. The comparison circuit 119 represents said step 5.40 which is adapted to make a comparison between the counted figure in the counter circuit 117 or S1 counter and the set number of sheets, or the number of sheets to be collated as stored in the memory circuit 118. The comparison circuit 119 is adapted to provide an identity signal when the counted figure in S1 counter becomes equal to the number of sheets to be collated and restores S1 counter to zero. The timer circuit 120 represents said manual insert inhibit timer (step 5.48) which is set in accordance with said identity signal provided by said comparison circuit. Said manual insert inhibit timer provides set output for a predetermined period of time as shown by the steps 7.1-7.4 in FIG. 27(*a*). The manual insert gate drive circuit 128 represents PORT 3 (the sixth step) of the manual insert SOL as described on page 7, lines 13, FIG. 19. The inverter 121 and AND gate 122 represent the steps 3.53, 3.54 in FIG. 26(*g*). Since one input end of AND gate 122 is added with logic "0" through the inverter 121 while the manual insert inhibit timer is being set, there is no generation of output in AND gate 122. For this reason, the manual insert SOL will be OFF whereby the manual gate 40 will be closed. After the lapse of a predetermined time, the output of the timer will be logic "0" while the one input end of AND gate 122 will be changed from logic "0" to logic "1", whereby the manual insert SOL will be ON and the manual insert gate 40 will be opened again. The other input end of AND gate 122 is connected to the detector 41 for manually inserted sheets in the circuit 116 and represents the steps 3.36–3.38 in FIG 26(*g*).

By the way, the present invention may be practiced without a microprocessor. It is made possible for example in FIG. 28, that a register adapted to work upon receipt of the rear end of the signal for detection of the sheet (the width of a pluse corresponding to one sheet) of the first sensor 21 will be used for the counter circuit 117, a register having an equivalent number of bits to that of said register will be used for the memory circuit 118 and a comparsion circuit adapted to generate an identity signal when the numbers (each digit) of both registers have become equal after comparison will be used for the comparison circuit 119.

What is claimed is:

1. A sorter for a copy machine to sort or collate a series of copied sheets delivered in series from said copy machine, said sorter having a row of sheet storing bins and a deflector means adapted to move by steps along said row of bins and return to the position of the first bin when it has reached the position of the bin for the sheet corresponding to the number of sheets to be stored or of the last bin, said sorter including;

a detector (21,116) for sheet reception provided at the inlet of said sorter;

a manual insert means (B) having a manual insert opening for sheets serving as covers or partitions for the copied sheets, said means including a channel extending from said insert opening to said sorter for passage of a sheet, a manual insert gate (40) adapted to close said channel, a transfer roller (42) adapted to transfer the sheets fed into said channel through said manual insert gate to said inlet of the sorter and a driving means adapted to open or close said manual insert gate;

means including a counting device (S1 counter, steps 5,32; 117) serving to provide a count at the end of the copying cycle of the actual number of manually inserted sheets detected at said detector (21, 116) for sheet reception;

means including a memory (DATA register; 118) retaining signals corresponding to the number of sheets to be collated;

a comparsion means (steps 5,40; 119) for providing an identity signal when the number of sheets counted in said counter reaches the figure corresponding to the signals retained by said memory; and means including timers (steps 5, 48; 7.1-7-4; 120) set at the timer when the identity signal has been produced by said comparison means and reset after the lapse of a predetermined time period;

said timers while they are being set closing said manual insert gate by means of said driving means for said manual insert gate.

* * * * *